(12) United States Patent (10) Patent No.: US 8,467,354 B1
Jerkunica et al. (45) Date of Patent: Jun. 18, 2013

(54) SYSTEMS AND METHODS FOR SOFTWARE-IMPLEMENTED TELEPHONY DEVICES IN A VOICE OVER INTERNET PROTOCOL (VOIP) SYSTEM

(75) Inventors: Boris Jerkunica, Atlanta, GA (US); Jayachandran Ramadorai, Walpole, MA (US)

(73) Assignee: Vocalocity, Inc., Atlanta, GA (US)

( * ) Notice: Subject to any disclaimer, the term of this patent is extended or adjusted under 35 U.S.C. 154(b) by 1103 days.

(21) Appl. No.: 12/199,650

(22) Filed: Aug. 27, 2008

(51) Int. Cl.
 *H04W 4/00* (2009.01)
(52) U.S. Cl.
 USPC .......................................... 370/338; 370/352
(58) Field of Classification Search
 USPC ........................... 370/352, 356, 338; 455/411
 See application file for complete search history.

(56) References Cited

U.S. PATENT DOCUMENTS

| 7,251,254 B2 | 7/2007 | Bond et al. |
| 7,602,899 B1 * | 10/2009 | Thenthiruperai ........ 379/265.02 |
| 2004/0180646 A1 * | 9/2004 | Donley et al. ................. 455/411 |
| 2007/0047534 A1 * | 3/2007 | Hakusui ........................ 370/356 |

OTHER PUBLICATIONS

What is ECharts for SIP Servlets?, http://echarts.org, Oct. 29, 2007, pp. 1-2.
Information Related to the ECharts for SIP Servlets (E4SS) development framework and the SIP Servlet Application Router, http://echarts.org, 2006-2009, pp. 1-2.
Bond, Gregory W., et al., ECharts for SIP Servlets User Manual, AT&T Labs-Research, Apr. 9, 2009, pp. 1-31, http://echarts.org.

* cited by examiner

*Primary Examiner* — Gary Mui
(74) *Attorney, Agent, or Firm* — Morris, Manning & Martin, LLP; John R. Harris

(57) ABSTRACT

Systems and methods for providing configurable, reusable software-implemented telephony devices for use in a voice over Internet protocol (VoIP) system. A device platform data store associates account owners with information identifying at least one instance of a telephony device provided on behalf of the account owner. The instances are implemented via a computer program component which comprises (a) reusable device logic (in a CCXML document) defining the behavior of the telephony device and (b) configuration information (also in a CCXML document) comprising specific device properties for the telephony device. In response to an incoming communication, a processor accesses the device platform data store to identify the device logic of a telephony device that is to be activated, and (b) executes the device logic in accordance with the configuration information to provide the specific telephony function of the telephony device for a communication session on behalf of the account owner.

203 Claims, 59 Drawing Sheets

| CCXML Event Handler | When Required | Description |
| --- | --- | --- |
| hdap.receivecall | Always | Begin any setup processing necessary for the device before it can take control of the call. This handler ends with sending the parent device a hdap.ready event. |
| hdap.start | Always | Signals the device to take control of the call. The event will have two attributes, connectionid and conferenceid. One of them will be undefined and the other will be the value of an object already moved into the device's CCXML session. This object is connected to the user. |
| hdap.initalized | If device has child devices | Signals that the child device has been initialized and its session is ready to receive events |
| hdap.ready | If device has child devices | Signals that the child device is ready to take control. The event includes the session id of the child session. |
| ccxml.exit | If device has child devices | Called when the child device has completed. At this point the parent device can exit itself or continue with other device-specific processing. |
| ccxml.kill | Always | Called when the session has been requested to exit. This handler should kill any and all child sessions; attempt to move the connection object, if any, to its parent session, and exit. |
| hdap.makecall | If device allows outbound calls to pass through it | Called when a parent device wants to place an outbound call. Should be implemented by Switch, PBX, SIP Handset and Filter devices. Others can use it but probably shouldn't implement it or implement it to return an error. |
| ccxml.disconnected | Always | If the incoming call has been disconnected then exit. NOTE: It might be possible for this to not be applicable to some devices that need to continue processing for a period of time (like submitting voice mail to server) and so the exit might be delayed, but it must eventually happen. |

FIG. 10

| Attribute Name | Required | Type | Details |
|---|---|---|---|
| Name | True | String | hdap.receivecall |
| Parentid | True | String | The identifier of the session that is launching the current session |
| Connectionlocal | False | String | For the call that initiated this session, the value of connection.local |
| Connectionremote | False | String | For the call that initiated this session, the value of connection.remote |
| Connectionid | True | String | For the call that initiated this session, the value of connection.id |
| Invocation_reason | True | String | Indicates why a device is started. Possible values are first, busy, rna (for Ring No Answer), error, and other. If other, then an additional field may be added to the event invocation_reason_desc |
| Invocation_reason_desc | True | String | If invocation_reason is other then this field can be used to provide other indicators. |

FIG. 11

| Attribute Name | Required | Type | Details |
|---|---|---|---|
| Name | True | String | hdap.ready |
| Childid | True | String | The identifier of the session that is indicating it is now ready to begin |

| Attribute Name | Required | Type | Details |
|---|---|---|---|
| Name | True | String | hdap.initialized |
| Childid | True | String | The identifier of the session that is indicating it is now initialized |

| Attribute Name | Required | Type | Details |
|---|---|---|---|
| Name | True | String | hdap.start |
| Connectionid | False | String | Identifier of the connection id that the caller is now attached to. This object has been moved into the scope of this session prior to this event being called.<br>Either this field or conferenceid must be specified, but not both |
| Conferenceid | False | String | Identifier of the conference that the caller is now attached to. This object has NOT been moved into the scope of this session prior to this event being called. It is only necessary to execute a createconference if the conference join/unjoin events are needed.<br>Either this field or connectionid must be specified, but not both. |

FIG. 14

| Attribute Name | Required | Type | Description |
|---|---|---|---|
| Name | True | String | hdap.makecall |
| Dialdigits | True | String | The "digits" to dial. This can be any string that the parent, dialing device wishes to present the child device with. The child device will pass this information along. These characters will not be modified before being presented to the termination service. |
| CallerIdDigits | True | String | The caller id digits to show this call as originating from |
| CallerIdName | True | String | The caller id name to show this call as originating from |
| SupressCallerId | True | Boolean | If true, then the caller id information should not be passed outside the HDAP system. NOTE: This value should be ignored when calls are being sent to 911. |

| Event Handlers | Behavior |
|---|---|
| connection.alerting | Create a special URL request to the application server that isn't formatted in the normal device syntax, but instead specifies the connection.local and connection.remote values. Create a new CCXML session using this URL. |
| ccxml.created | Execute a send element to the child session sending a hdap.receivecall event |
| hdap.ready | Execute an accept element on the connection. Move connection object to child session. Send hdap.start event to child device. |
| ccxml.done | Exit. |
| ccxml.kill | Send ccxml.kill to child session |
| connection.connected | Execute a send element to the parent session with data of hdap.ready |
| hdap.start | Join outgoing connection to the object passed in |
| connection.disconnect | Kill child session. (This should be a rare case, once we move the connection in the hdap event handler we won't receive connection events any more |

FIG. 19

```xml
<?xml version="1.0" encoding="UTF-8"?>
<!--
  This code is PROPRIETARY AND CONFIDENTIAL to Vocalocity, Inc.
  ** DO NOT RE-DISTRIBUTE THIS SOURCE CODE WITHOUT EXPRESS
PERMISSION. **

This source code is Copyright (c) 2006 by Vocalocity, Inc.
  All Rights Reserved.

The source code for this program is not published or
  otherwise divested of its trade secrets, irrespective
  of what has been deposited with the US Copyright Office.
-->

<ccxml version="1.0" xmlns="http://www.w3.org/2002/09/ccxml">

<script><![CDATA[
    var trid = session.id % 100000000;
    var name = 'HDAP::HDAP t='+trid;

var appserver_path = 'appserver/hdap/ccxml/devices/hdap';
    var appserverurl;
    var childid;
    var sendid;
    var connectionid;
    var connectionlocal;
    var connectionremote;
    var connectionaai;
    var acceptedCall = false;
    var state = 'initial';
  ]]></script>
  <script src="js/utilities.js" />

<eventprocessor statevariable="state">

<transition event="error.move" name="evt">
      <log expr="name+' ERROR: '+evt.name+', reason='+evt.reason+', disconnecting and killing child'" />
      <disconnect connectionid="connectionid"/>
      <if cond="childid != undefined">
        <send target="childid" data="'ccxml.kill'"/>
      </if>
      <exit/>
    </transition>
```

FIG. 29A – HDAP CCXML Document

```xml
<transition event="error.notallowed" name="evt">
  <log expr="name+' ERROR: '+evt.name+', reason='+evt.reason" />
</transition>

<transition event="error.*" name="evt">
  <log expr="name+' ERROR: '+evt.name+', reason='+evt.reason" />
  <exit/>
</transition>

<transition event="ccxml.loaded" name="evt">

<script>
    <![CDATA[
    // get the server address from session.uri
      var pathStr = session.uri.substr(0, session.uri.indexOf("appserver"));
      appserverurl = pathStr + appserver_path;
    ]]>
  </script>

<log expr="name+' ccxml.loaded, session.uri='+session.uri+' appserverurl='+appserverurl+', sessionid='+evt.sessionid"/>
</transition>

<transition event="ccxml.created" name="evt">
</transition>

<transition event="ccxml.exit" name="evt">
  <log expr="name+' ccxml.exit, sessionid='+session.id+', exiting ... '" />

<if cond="acceptedCall == false">
    <log expr="name+' acceptedCall is false, so rejecting or redirecting the call. Exit_reason = ' + evt.exit_reason" />
    <!--Now to check if the exit reason was busy here, if so, then set it as busy else decline-->
    <if cond="evt.exit_reason != undefined && -1 != evt.exit_reason.indexOf('beta')">
      <script><![CDATA[
        // get the beta address
        var betaAddress = evt.exit_reason.substring(4, evt.exit_reason.length);
      ]]></script>
```

FIG. 29B – HDAP CCXML Document

```
        <log expr="name+' Redirecting to ' + betaAddress"/>
        <redirect connectionid="connectionid" dest="betaAddress" reason="'Beta'" />
      <elseif cond="evt.exit_reason == 'busy'"/>
        <log expr="name+' Sending Busy here'"/>
        <reject connectionid="connectionid" reason="'Busy Here'" />
      <else/>
        <log expr="name+' Sending decline'"/>
        <reject connectionid="connectionid" />
      </if>
    <else/>
      <log expr="name+' acceptedCall is true, doing nothing...'" />
    </if>
    <!-- PEN 2125 -->
    <exit/>
  </transition>

<transition event="ccxml.kill" name="evt">
    <log expr="name+' ccxml.kill, sending ccxml.kill to child='+childid" />
    <send target="childid" data="'ccxml.kill'"/>
    <exit/>
  </transition>

<transition state="initial" event="connection.alerting" name="evt">

<assign name="state" expr="'active'"/>
    <assign name="connectionid" expr="evt.connectionid"/>
    <assign name="connectionlocal" expr="evt.connection.local" />
    <assign name="connectionremote" expr="evt.connection.remote" />
    <assign name="connectionaai" expr="evt.connection.aai" />
    <var name="aai" expr="evt.connection.aai" />

<log expr="name+' state=initial, connection.alerting,
sessionid='+session.id+', creating ccxml, appserverurl='+appserverurl+',
local='+connectionlocal+', remote='+connectionremote+',
connectionid='+connectionid+',connectionaai='+connectionaai+',
callid='+evt.connection.callid" />
```

FIG. 29C – HDAP CCXML Document

```xml
      <send target="session.id" data="failed.ready" delay="'150s'" sendid="sendid"/>
      <alert connectionid="connectionid" code="180" reasonphrase="'Ringing'" />
      <createccxml next="appserverurl" namelist="connectionlocal connectionremote aai" sessionid="childid"/>
    </transition>

<transition state="active" event="connection.alerting" name="evt">
      <log expr="name+' WARN state=active, connection.alerting, callid='+evt.connection.callid" />
      <alert connectionid="connectionid" code="180" reasonphrase="'Ringing'" />
    </transition>

<transition event="connection.failed" name="evt">
      <log expr="name+' connection.failed evt.connectionid='+evt.connectionid+', connectionid='+connectionid+', callid='+evt.connection.callid" />
      <if cond="connectionid != undefined">
        <disconnect connectionid="connectionid"/>
      </if>
    </transition>

<transition event="connection.disconnected" name="evt">
      <log expr="name+' connection.disconnected, connectionid='+evt.connectionid+', sessionid='+session.id+', sending ccxml.kill to child='+childid+', callid='+evt.connection.callid" />
      <send target="childid" data="'ccxml.kill'"/>
      <exit/>
    </transition>

<transition event="connection.connected" name="evt">
      <log expr="name+' connection.connected, sessionid='+session.id+', moving connection to childid='+childid+', connectionid='+connectionid+', callid='+evt.connection.callid" />
      <if cond="sendid != undefined">
        <cancel sendid="sendid"/>
      </if>
      <move source="connectionid" sessionid="childid"/>
    </transition>

<transition event="hdap.ready" name="evt">
      <assign name="childid" expr="evt.childid"/>
      <if cond="sendid != undefined">
        <cancel sendid="sendid"/>
      </if>
      <log expr="name+' hdap.ready, from child='+evt.childid+', sessionid='+session.id+', accepting connection connectionid='+connectionid" />
```

FIG. 29D – HDAP CCXML Document

```xml
    <accept connectionid="connectionid"
mediaconnectionid="evt.data.mediaconnectionid"
mediasessionid="evt.data.mediasessionid" />
    <assign name="acceptedCall" expr="true"/>
    <send target="session.id" data="'failed.signaling'" delay="'10s'" sendid="sendid"/>
  </transition>

<transition event="hdap.alert" name="evt">
    <log expr="name+' hdap.alert, from child='+evt.data.childid+', alerting
connectionid='+connectionid+', code='+evt.data.code+',
reasonphrase='+evt.data.reasonphrase+',
mediadescription='+evt.data.mediadescription" />
    <if cond="acceptedCall == false">
      <alert connectionid="connectionid" code="evt.data.code"
reasonphrase="evt.data.reasonphrase" mediadescription="evt.data.mediadescription"
/>
    </if>
  </transition>

<transition event="failed.signaling">
    <log expr="name+' WARN failed.signaling, sending ccxml.kill to child='+childid+',
disconnect connectionid='+connectionid" />
    <disconnect connectionid="connectionid"/>
    <send target="childid" data="'ccxml.kill'"/>
    <assign name="sendid" expr="undefined" />
    <exit/>
  </transition>

<transition event="failed.ready">
    <log expr="name+' WARN failed.ready, disconnection, killing children,
id='+connectionid" />
    <disconnect connectionid="connectionid"/>
    <send target="childid" data="'ccxml.kill'"/>
    <exit/>
  </transition>

<transition event="hdap.initialized" name="evt">
    <var name="parentid" expr="session.id" />
    <var name="firstDevice" expr="true" />
    <var name="answertype" expr="'either'" />
    <assign name="childid" expr="evt.childid" />
    <script>
      <![CDATA[
        var data = new Object();
        data.parentid = session.id;
        data.connectionlocal = connectionlocal;
```

FIG. 29E – HDAP CCXML Document

```
      data.connectionremote = connectionremote;
      data.ani = extractDigits(connectionremote);
      data.firstDevice = true;
      data.answertype = 'either';
      data.mediaconnectionid = connectionid;
      data.mediasessionid = session.id;
      data.traceid = trid;
    ]]>
  </script>

<log expr="name+' hdap.initialized, sessionid='+session.id+', sending
hdap.receivecall to childid='+childid+', local='+connectionlocal+',
remote='+connectionremote+', mediaconnectionid='+data.mediaconnectionid+',
mediasessionid='+data.mediasessionid+', data.ani='+data.ani" />
  <send target="childid" data="'hdap.receivecall'" namelist="parentid connectionlocal
connectionremote firstDevice answertype data" />
  </transition>

<transition event="send.successful" name="evt">
  </transition>

<transition event="cancel.successful" name="evt">
  </transition>

<transition event="move.successful" >
    <log expr="name+' move.successful, sending hdap.start to childid='+childid+',
connectionid='+connectionid" />
    <send target="childid" data="'hdap.start'" namelist="connectionid"/>
    <assign name="connectionid" expr="undefined"/>
  </transition>

<transition event="conference.joined" name="evt">
    <log expr="name+' conference.joined, id1='+evt.id1+', id2='+evt.id2"/>
  </transition>

<transition event="vos.move.received" name="evt">
    <log expr="name+' vos.move.received '" />
  </transition>

<transition event="*" name="evt">
    <log expr="name+' WARN unexpected event caught: ' + evt.name" />
  </transition>
  </eventprocessor>
</ccxml>
```

FIG. 29F – HDAP CCXML Document

```xml
<?xml version="1.0" encoding="UTF-8"?>
<!--
  This code is PROPRIETARY AND CONFIDENTIAL to Vocalocity, Inc.
  ** DO NOT RE-DISTRIBUTE THIS SOURCE CODE WITHOUT EXPRESS
  PERMISSION. **

This source code is Copyright (c) 2006 by Vocalocity, Inc.
  All Rights Reserved.

The source code for this program is not published or
  otherwise divested of its trade secrets, irrespective
  of what has been deposited with the US Copyright Office.
-->

<!-- PBX Device CCXML                                        -->
<!-- Grab the extension information and send it to the application server -->
<!-- to determine which device is next, then transition control to that   -->
<!-- device.                                                 -->
<ccxml version="1.0" xmlns="http://www.w3.org/2002/09/ccxml">

<var name="smid" expr="session.id"/>
  <var name="guid" expr="application.hdap.deviceguid" />
  <var name="trid"/>

<!-- ID of this device. -->
  <var name="sessionid" expr="session.id" />

<!-- ID of our parent device.  Given to children to facilitate direct communication -->
  <var name="parentid" />

<var name="state"  expr="'initial'"/>

<!-- Variables used to hold event attributes between relaying the events -->
  <var name="connectionlocal" />
  <var name="connectionremote" />
  <var name="connectionid" />
  <var name="conferenceid" />

<var name="blockcallerid" />
  <var name="calleridname" />
  <var name="calleridnumber" />
  <var name="calleridmode" />
```

FIG. 30-A – Device Logic CCXML Document

```xml
<var name="dialogid"/>
<var name="TollFree"/>
<var name="receivedHdapReady"/>
<var name="connectionremote_sipuser" />
<var name="answertype" />
<var name="onHoldDevice" />
<var name="transferid" />
<var name="transfersession" />
<var name="receivecallData" />
<var name="makecallData" />
<var name="invocation_reason" />
<var name="isTollfreecalleridnumber" />
<!-- Spawned child session -->
<var name="childid" />

<!-- Session id received in hdap event -->
<var name="evt_childid" />

<!-- Requested extension. Used for logging in later event handlers -->
<var name="extension" />

<!-- Extensions map. Used to map the requested extension with the appropriate device -->
<var name="dialplan" expr="application.ExtensionRoutingTable" />

<!-- Default device. Optional device for use as a last resource when the -->
<!-- extension cannot be found in dialplan or after contacting appserver -->
<var name="defaultDevice" expr="application.DefaultDevice" />

<!-- Default device to use to place an outbound call when one cannot be -->
<!-- located in the dialplan or routed in the appserver. Should be the PBX -->
<!-- providers switch. This property is not editable by owners of this device. -->
<var name="outboundCallDevice" expr="application.OutboundCallDevice" />

<!-- True when using the outboundCallDevice to make a call -->
<var name="sendMakeCall" expr="false" />

<var name="outBlockCallerId" />
<var name="outCallerIdNumber" />
<var name="outCallerIdName" />
<var name="exit_reason" expr="undefined" />
```

FIG. 30-B – Device Logic CCXML Document

```
<script>
 <![CDATA[
      smid = smid % 10000;
   ]]>
</script>

<script src="../js/utilities.js" />

<eventprocessor statevariable="state">

<!--                                          -->
<!-- Receive Call: received from a higher device    -->
<!--                                          -->

<transition event="hdap.receivecall" name="evt">

<assign name="trid" expr="evt.data.traceid"/>

<script>
   <![CDATA[
     application.hdap.activeStartTime = (new Date()).getTime();
   ]]>
  </script>

<assign name="state" expr="'inbound'" />
  <!-- Parse the dialed number from the SIP local URI. -->
  <script>
   <![CDATA[
    extension = evt.connectionlocal;
    if (extension.indexOf('@') > 0)
    {
      extension = extension.substring(0, extension.indexOf('@'));
    }
    if (extension.indexOf(':') > 0)
    {
      extension = extension.substring(extension.indexOf(':')+1, extension.length);
    }
    if (extension.length > 2 && extension.charAt(0) == 'p' && extension.charAt(1) == ':')
    {
      extension = extension.substring(2, extension.length);
    }
```

FIG. 30-C – Device Logic CCXML Document

```
    if (extension.length > 1 && extension.charAt(0) == '+')
    {
      extension = extension.substring(1, extension.length);
    }
  ]]>
  </script>

<log expr="'HDAP::PBX t='+trid+', i='+smid+', g=' + guid + '
source='+evt.eventsource+', hdap.receivecall, session.id='+session.id+',
Routing to extension '+extension" />

<!-- Store off the event's values -->
  <assign name="parentid" expr="evt.parentid" />
  <assign name="connectionlocal" expr="evt.connectionlocal" />
  <assign name="connectionremote" expr="evt.connectionremote" />
  <assign name="connectionremote_sipuser" expr="evt.connectionremote_sipuser" />
  <assign name="answertype" expr="evt.answertype" />
  <assign name="transferid" expr="evt.transferid" />
  <assign name="transfersession" expr="evt.transfersession" />
  <assign name="receivecallData" expr="evt.data" />
  <assign name="application.hdap.ani" expr="receivecallData.ani"/>
  <assign name="application.hdap.dnis" expr="connectionlocal"/>
  <assign name="invocation_reason" expr="evt.invocation_reason" />
  <assign name="calleridmode" expr="application.CallerIdMode" />
  <!-- if calleridmode is not set, it is individual by default -->
  <if cond="calleridmode == 'blockall'">
    <assign name="blockcallerid" expr="true" />
  <elseif cond="calleridmode == 'default'" />
    <assign name="calleridname" expr="application.CallerIdNumber" />
    <assign name="calleridnumber" expr="application.CallerIdNumber" />
  </if>

<!-- Determine whether the extension exists in the dialplan -->
  <if cond="extension == undefined">
    <!-- There is no extension in the sip uri. Use the default device if there is one,
otherwise exit -->
    <if cond="defaultDevice == undefined">
      <log expr="'HDAP::PBX t='+trid+', i='+smid+', g='+guid+' hdap.receivecall:
extension and default device are undefined. Exiting.'" />
      <exit />
    <else />
```

FIG. 30-D – Device Logic CCXML Document

```xml
        <log expr="'HDAP::PBX t='+trid+', i='+smid+', g=' + guid + ' hdap.receivecall:
extension is undefined. Using default device ' + defaultDevice" />
        <createccxml next="defaultDevice" sessionid="childid" />
      </if>
      <else />
      <if cond="dialplan[extension] == undefined">
        <!-- The extension is not in the dialplan. Let the appserver route it -->
        <log expr="'HDAP::PBX t='+trid+', i='+smid+', g=' + guid + ' hdap.receivecall:
extension is not in the dialplan. Sending a route request to the appserver'" />

<!-- declare destination first and then assign it extension since var gets evaluated
when the transition is entered -->
        <var name="destination" />
        <assign name="destination" expr="extension" />
        <send targettype="'basichttp'" target="'../../hdap/event/switch'" data="'route'"
namelist="sessionid guid destination" />
      <else />
        <log expr="'HDAP::PBX t='+trid+', i='+smid+', g=' + guid + ' hdap.receivecall:
extension is in the dialplan. Connecting to device ' + dialplan[extension]" />
        <createccxml next="dialplan[extension]" sessionid="childid" />
      </if>
      </if>
    </transition>

<transition event="route.next" name="evt" state="inbound">
      <log expr="'HDAP::PBX t='+trid+', i='+smid+', g=' + guid + ' received route.next. For
connection to ' + extension + ' received route.next event with destination ' +
evt.destination" />
      <createccxml next="'../../hdap/ccxml/devices/' + evt.destination" sessionid="childid"
/>
    </transition>

<transition event="route.failed" name="evt" state="inbound">
      <if cond="evt.reason == 'unassigned_number' &&
application.noNumberRouteURL != undefined">
        <assign name="state" expr="'dialog'"/>
        <dialogprepare src="application.noNumberRouteURL" type="'audio/wav'"
dialogid="evt.dialogid"/>
      <elseif cond="evt.reason != undefined && -1 != evt.reason.indexOf('beta')"
/>
```

FIG. 30-E – Device Logic CCXML Document

```
    <assign name="exit_reason" expr="evt.reason"/>
    <exit namelist="exit_reason" />
  <elseif cond="defaultDevice == undefined"/>
    <log expr="'HDAP::PBX t='+trid+', i='+smid+', g=' + guid + ' received a route.failed
event with reason: ' + evt.reason + '. Exiting'" />
    <exit />
  <else />
    <log expr="'HDAP::PBX t='+trid+', i='+smid+', g=' + guid + ' received a route.failed
event with reason: ' + evt.reason + '. Sending to default device ' + defaultDevice" />
    <createccxml next="defaultDevice" sessionid="childid" />
  </if>
</transition>

<transition event="hdap.initialized" name="evt" state="inbound">
  <!-- sending our parent id to the child so that return events skip us -->
  <script>
   <![CDATA[
     application.hdap.duration = application.hdap.duration + ((new Date()).getTime() -
application.hdap.activeStartTime);
     application.hdap.activeStartTime = 0;
    ]]>
  </script>

<var name="data" expr="receivecallData" />
  <log expr="'HDAP::PBX t='+trid+', i='+smid+', g=' + guid + ': hdap.initialized,
state=inbound, Sending hdap.receivecall child='+childid+'
connectionlocal='+connectionlocal+', connectionremote='+connectionremote+',
connectionremote_sipuser='+connectionremote_sipuser+', answertype='+answertype+',
invocation_reason='+invocation_reason" />
  <send targttype="ccxml" target="childid" data="'hdap.receivecall'"
namelist="parentid connectionlocal connectionremote connectionremote_sipuser
answertype transferid transfersession data invocation_reason" />
</transition>

<transition event="hdap.alert" name="evt">
  <log expr="'HDAP::PBX t='+trid+', i='+smid+', g='+guid+' received hdap.alert,
sending it to parentid='+parentid" />
  <var name="data" expr="evt.data" />
  <send target="parentid" data="'hdap.alert'" namelist="data" />

<if cond="application.hdap.disposition != 'Answered'">
   <assign name="application.hdap.disposition" expr="'Alerting'"/>
  </if>
</transition>
```

FIG. 30-F – Device Logic CCXML Document

```xml
<transition event="send.successful" name="evt" state="inbound">
  <!-- do nothing, just suppress log message about missed event. -->
</transition>

<transition event="error.send.targetunavailable" name="evt" state="inbound">
  <log expr="'HDAP::PBX t='+trid+', i='+smid+', g=' + guid + ' received
error.send.targetunavailable. It is unable to contact application server'" />
  <exit />
</transition>

<!-- Default handlers. These shouldn't be called if devices are well behaved. -->
<transition event="hdap.ready" name="evt" state="inbound">

<assign name="receivedHdapReady" expr="'true'"/>

<log expr="'HDAP::PBX t='+trid+', i='+smid+', g=' + guid + '
source='+evt.eventsource+', received hdap.ready instead of the device specified in the
hdap.receivecall, sending hdap.ready to parentid='+parentid" />
  <assign name="evt_childid" expr="evt.childid" />
  <var name="data" expr="evt.data" />
  <send targettype="'ccxml'" target="parentid" data="'hdap.ready'" namelist="childid
data" />
  <assign name="application.hdap.disposition" expr="'Answered'"/>
</transition>

<transition event="hdap.start" name="evt" state="inbound">
  <log expr="'HDAP::PBX t='+trid+', i='+smid+', g=' + guid + '
source='+evt.eventsource+', received hdap.start from='+evt.sessionid+' instead of the
device specified in the hdap.ready'" />
  <assign name="connectionid" expr="evt.connectionid" />
  <assign name="conferenceid" expr="evt.conferenceid" />
  <if cond="evt.connectionid != undefined">
    <move source="evt.connectionid" sessionid="evt_childid" />
  <else />
    <send targettype="'ccxml'" target="session.id" data="'move.successful'" />
  </if>
</transition>

<transition event="hdap.start" name="evt" state="initial">
  <log expr="'HDAP::PBX t='+trid+', i='+smid+', g=' + guid + '
source='+evt.eventsource+', hdap.start, state=initial, connectionid='+evt.connectionid"
/>
```

FIG. 30-G – Device Logic CCXML Document

```xml
    <assign name="connectionid" expr="evt.connectionid" />
  </transition>

<transition event="move.successful" name="evt" state="inbound">
    <send targettype="ccxml" target="evt_childid" data="hdap.start" namelist="connectionid conferenceid"/>
  </transition>

<!--                                                    -->
  <!-- Makecall: received from lower device               -->
  <!--                                                    -->
  <transition event="hdap.makecall" name="evt">
    <assign name="trid" expr="evt.data.traceid"/>
    <script>
     <![CDATA[
       application.hdap.activeStartTime = (new Date()).getTime();
     ]]>
    </script>

<script><![CDATA[
      state = 'outbound';
      parentid = evt.parentid;
      extension = evt.dialdigits;
      connectionlocal = evt.connectionlocal;
      connectionremote = evt.connectionremote;
      application.hdap.dnis = connectionlocal;
      connectionremote_sipuser = evt.connectionremote_sipuser;
      answertype = evt.answertype;
      onHoldDevice = evt.onHoldDevice;
      calleridmode = application.CalleridMode;
      transferid = evt.transferid;
      transfersession = evt.transfersession;
      makecallData = evt.data;
      application.hdap.ani = makecallData.ani;
      blockcallerid = false;
      calleridname = evt.calleridname;
      calleridnumber = evt.calleridnumber;
      outBlockCallerId = evt.blockcallerid;
      outCallerIdNumber = evt.calleridnumber;
      outCallerIdName = evt.calleridname;
      invocation_reason = evt.invocation_reason;
    ]]></script>
```

FIG. 30-H – Device Logic CCXML Document

```
    <log expr="'HDAP::PBX t='+trid+', i='+smid+', g=' + guid + '
source='+evt.eventsource+',  hdap.makecall, setting state=outbound,
session.id='+session.id+', dialdigits='+evt.dialdigits+', parentid='+evt.parentid+',
calleridname='+calleridname+', calleridnumber='+calleridnumber+',
blockcallerid='+blockcallerid+', answertype='+answertype + ',
connectionlocal='+evt.connectionlocal+', invocation_reason='+invocation_reason" />

<!-- Determine whether the extension exists in the dialplan -->
    <if cond="extension == undefined">
     <!-- There is no extension in the event. Nowhere to route, so exit -->
     <exit />
    <else />
     <if cond="dialplan[extension] == undefined">
      <!-- The extension is not in the dialplan. Let the appserver route it -->
      <!-- declare destination first and then assign it extension since var gets evaluated
when the transition is entered -->
      <var name="destination" />
      <script><![CDATA[

// When supporting relative dialing, here is where we would need to enter the
dial string
      destination = extension;

if (destination.indexOf('011') == 0)
      {
        makecallData.dnis = destination;
        destination = destination.substring(3);
      }
      else if (destination != '411'
        && destination != '911'
        && destination != '*98'
        && destination.charAt(0) != '1'
        && destination.charAt(0) != '0')
      {
         destination = '1' + destination;
         makecallData.dnis = destination;
      }
      else
      {
        makecallData.dnis = destination;
      }
```

FIG. 30-I – Device Logic CCXML Document

```
    if (destination.charAt(0) == '1' && destination.length > 11)
    {
      destination = destination.substring(0, 11);
    }
      extension = destination;    // Set the extension so that if we get a route.fail back and pass it out we're passing
                        // the value with the 1 included.
    ]]></script>

<if cond="calleridmode == 'blockall'">
      <assign name="blockcallerid" expr="true" />
    </if>
    <log expr="'HDAP::PBX blockcallerid='+blockcallerid"/>
    <send targettype="basichttp" target="'../../hdap/event/switch'" data="'route'" namelist="sessionid guid destination blockcallerid calleridnumber" />
    <else />
    <assign name="receivecallData" expr="makecallData" />
    <createccxml next="'dialplan[extension]'" sessionid="childid" />
    </if>
  </if>
</transition>

<transition event="hdap.initialized" name="evt" state="outbound">

<script>
  <![CDATA[
    application.hdap.duration = application.hdap.duration + ((new Date()).getTime() - application.hdap.activeStartTime);
    application.hdap.activeStartTime = 0;
  ]]>
  </script>

<assign name="receivedHdapReady" expr="false"/>

<var name="dialdigits" expr="extension" />
  <var name="data" />
  <if cond="sendMakeCall">
    <assign name="data" expr="makecallData" />
    <assign name="data.dialdigits" expr="extension" />
    <log expr="'HDAP::PBX t='+trid+', i='+smid+', g=' + guid + ': hdap.initialized, state=outbound, sendMakeCall, Sending hdap.makecall child='+childid+' extension='+extension" />
    <send targettype="'ccxml'" target="childid" data="'hdap.makecall'" namelist="parentid connectionlocal connectionremote dialdigits blockcallerid calleridname calleridnumber connectionremote_sipuser answertype onHoldDevice transferid transfersession data" />
```

FIG. 30-J – Device Logic CCXML Document

```
<else />
  <script>
    <![CDATA[
      var host = connectionlocal;
          var remoteExt=application.hdap.ani;
          if (host.indexOf('@') > 0)
          {
            host = host.substring(host.indexOf('@')+1, host.length);
          }
          else if(host.indexOf('sip:') > 0)
          {
            host = host.substring(host.indexOf('sip:')+1, host.length);
          }
          if (host.indexOf('>') > 0)
          {
            host = host.substring(0, host.indexOf('>'));
          } if(calleridname == undefined || calleridname == '')
          {
            calleridname = 'Unknown Caller ID';
          }
          if(calleridnumber == undefined || calleridnumber == '')
          {
            if(makecallData != undefined && makecallData.parentguid != undefined)
            {
              var foundExt = false;
              var extNum;
              for(extNum in dialplan)
              {
                if(dialplan[extNum] == ('/appserver/hdap/ccxml/devices/' + makecallData.parentguid))
                {
                  foundExt = true;
                  break;
                }
              }
```

FIG. 30-K – Device Logic CCXML Document

```
            if(foundExt)
            {
        calleridnumber = extNum;
            }
              else
              {
        calleridnumber = 'unavailable';
            }
          }
            else
            {
        calleridnumber = 'unavailable';
            }
          } if (blockcallerid == undefined || blockcallerid == 'undefined' || blockcallerid ==
false || blockcallerid == 'false' || extension.equals('911'))
        {
          connectionremote = '"' + calleridname + '" <sip:' + remoteExt + '@' + host + '>';
        }
        else
        {
          connectionremote = '"Unknown Caller ID" <sip:unknown@' + host + '>';
        } data = receivecallData;
        data.connectionremote = connectionremote;
      ]]>
      </script>
      <log expr="'HDAP::PBX t='+trid+', i='+smid+', g=' + guid + ': hdap.initialized,
state=outbound, Sending hdap.receivecall child='+childid+',
connectionlocal='+connectionlocal+', connectionremote='+connectionremote+',
invocation_reason='+invocation_reason" />
      <send targettype="'ccxml'" target="childid" data="'hdap.receivecall'"
namelist="parentid connectionlocal connectionremote connectionremote_sipuser
answertype transferid transfersession data invocation_reason" />
    </if>
  </transition>
```

FIG. 30-L – Device Logic CCXML Document

```
<transition event="route.next" name="evt" state="outbound">
  <script>
    <![CDATA[
      var host = connection.local;
        if (host.indexOf('@') > 0)
        {
          host = host.substring(host.indexOf('@')+1, host.length);
        }
        else if(host.indexOf('sip:') > 0)
        {
          host = host.substring(host.indexOf('sip:')+1, host.length);
        }
        if (host.indexOf('>') > 0)
        {
          host = host.substring(0, host.indexOf('>'));
        } if(calleridname == undefined || calleridname == '')
        {
          calleridname = 'Unknown Caller ID';
        } if(calleridnumber == undefined || calleridnumber == '')
        {
          if(makecallData != undefined && makecallData.parentguid != undefined)
          {
            var foundExt = false;
            var extNum;
            for(extNum in dialplan)
            {
              if(dialplan[extNum] == ('/appserver/hdap/ccxml/devices/' + makecallData.parentguid))
              {
                foundExt = true;
                break;
              }
            } if(foundExt)
            {
              calleridnumber = extNum;
            }
```

FIG. 30-M – Device Logic CCXML Document

REPLACEMENT SHEET

```
                else
                {
                calleridnumber = 'unavailable';
                }
            }
            else
            {
            calleridnumber = 'unavailable';
            }
        } if (blockcallerid == undefined || blockcallerid == 'undefined' || blockcallerid ==
false || blockcallerid == 'false' || extension.equals('911'))
        {
            connectionremote = '"' + calleridname + '" <sip:' + calleridnumber + '@' + host +
>';
        }
        else
        {
            connectionremote = '"Unknown Caller ID" <sip:unknown@' + host + '>';
        } receivecallData = makecallData;
        ]]>
    </script>
    <!-- found a route to a child device, treat it like an inbound call -->
    <assign name="state" expr="'inbound'" />
    <log expr="'HDAP::PBX t='+trid+', i='+smid+', g=' + guid + ': received route.next.
For connection to ' + extension + ' received next event with extension ' + evt.destination"
/>
    <createccxml next="'../../hdap/ccxml/devices/' + evt.destination" sessionid="childid"
/>
</transition>

<transition event="route.failed" name="evt" state="outbound">
    <if cond="evt.reason != undefined && -1 != evt.reason.indexOf('beta')">
    <log expr="'HDAP::PBX t='+trid+', i='+smid+', g=' + guid + ' received a route.failed
event. Exiting with reason ' + evt.reason + '. Sending to outbound call device ' +
outboundCallDevice" />
    <assign name="exit_reason" expr="evt.reason"/>
    <exit namelist="exit_reason" />
```

FIG. 30-N – Device Logic CCXML Document

```
      <elseif cond="outboundCallDevice != undefined &&
outboundCallDevice
!= "" />
      <script><![CDATA[
        if(makecallData.isForwardedCall)
        {
          calleridname = outCallerIdName;
          if(outCallerIdNumber != undefined)
          {
            calleridnumber = outCallerIdNumber;
          }
          else
          {
            calleridnumber = application.CallerIdNumber;
          }
        }
        else
        {
          // Block caller id is set according to the following priorities:
          // 1. The user dials *67 or *82
          // 2. PBX settings dictate blocking all caller ids or assigning all extensions the
same number
          // 3. Extension settings; if calleridmode is not set, it is treated as 'handset'
          if(makecallData.blockIdStarCode == true)
          {
            blockcallerid = outBlockCallerId;
            if(blockcallerid == false)
            {
              calleridname = outCallerIdName;
              calleridnumber = outCallerIdNumber;
            }
          }
          else if(calleridmode == 'blockall')
          {
            blockcallerid = true;
          }
          else if(calleridmode == 'default')
          {
            blockcallerid = false;
            calleridnumber = application.CallerIdNumber;
```

FIG. 30-O – Device Logic CCXML Document

```
            if(outCallerIdName == undefined)
            {
              calleridname = application.CallerIdNumber;
            }
            else
            {
              calleridname = outCallerIdName;
            }
          }
          else
          {
            blockcallerid = outBlockCallerid;
            if(blockcallerid == false || blockcallerid == undefined)
            {
              calleridname = outCallerIdName;
              if(outCallerIdNumber != undefined)
              {
                calleridnumber = outCallerIdNumber;
              }
              else
              {
                calleridnumber = application.CallerIdNumber;
              }
            }
          }
       ]]></script>
       <if cond="evt.reason == 'TollFreeNumberswithblockcallerid'">
       <assign name="TollFree" expr="true"/>
       <assign name="isTollfreecalleridnumber" expr="true"/>
       </if>
       <log expr="'HDAP::PBX TollFree='+TollFree"/>
       <log expr="'HDAP::PBX calleridnumber='+TollFree"/>

<log expr="'HDAP::PBX t='+trid+', i='+smid+', g=' + guid + ' received a route.failed
event with reason ' + evt.reason + '. Sending to outbound call device ' +
outboundCallDevice" />

<createccxml next="outboundCallDevice" sessionid="childid" />
       <assign name="sendMakeCall" expr="true" />
    <else />
```

FIG. 30-P – Device Logic CCXML Document

```xml
        <log expr="'HDAP::PBX t='+trid+', i='+smid+', g=' + guid + ' received a
route.failed event with reason ' + evt.reason + '. Exiting'" />
          <exit />
        </if>
      </transition>

<transition event="connection.connected" name="evt" state="outbound">
        <log expr="'HDAP::PBX t='+trid+', i='+smid+', g=' + guid + ': received
connection.connected. Sending hdap.ready.'" />
          <script>
           <![CDATA[
            var data = new Object();
            data.childid = childid;
            data.mediaconnectionid = evt.connectionid;
            data.mediasessionid = session.id;
            data.traceid = trid;
           ]]>
          </script>
          <send targettype="'ccxml'" target="parentid" data="'hdap.ready'"
namelist="childid data" />
          <assign name="application.hdap.disposition" expr="'Answered'"/>
      </transition>

<transition event="connection.failed">
        <log expr="'HDAP::PBX t='+trid+', i='+smid+', g=' + guid + ',
device='+application.hdap.deviceguid+', connection.failed ...' " />
          <exit/>
      </transition>

<transition event="hdap.ready" name="evt" state="outbound">
        <log expr="'HDAP::PBX t='+trid+', i='+smid+', g=' + guid + ',
source='+evt.eventsource+' state=outbound, received hdap.ready instead of the
device specified in the hdap.receivecall, sending hdap.ready to parentid='+parentid" />
          <assign name="receivedHdapReady" expr="'true'"/>
          <assign name="evt_childid" expr="evt.childid" />
          <var name="data" expr="evt.data" />
          <send targettype="'ccxml'"  target="parentid" data="'hdap.ready'" namelist="childid
data" />
```

FIG. 30-Q – Device Logic CCXML Document

```
    <assign name="application.hdap.disposition" expr="'Answered'"/>
  </transition>

<transition event="hdap.start" name="evt" state="outbound">
    <if cond="childid == undefined"> <!-- We're the device holding the connection -->
      <var name="targetObject" expr="evt.connectionid != undefined ? evt.connectionid : evt.conferenceid" />
      <log expr="'HDAP::PBX t='+trid+', i='+smid+', g=' + guid + ', source='+evt.eventsource+' received hdap.start, about to join connection ' + connectionid + ' to ' + targetObject" />
      <join id1="connectionid" id2="targetObject" />
    <else />
      <log expr="'HDAP::PBX t='+trid+', i='+smid+', g='+ guid+', source='+evt.eventsource+' received hdap.start instead of the device specified in the hdap.ready'" />
      <if cond="evt.connectionid != undefined">
        <move source="evt.connectionid" sessionid="evt_childid" />
      <else />
        <send targettype="ccxml" target="session.id" data="'move.successful'" />
      </if>
      <assign name="connectionid" expr="evt.connectionid" />
      <assign name="conferenceid" expr="evt.conferenceid" />
    </if>
  </transition>

<transition event="move.successful" name="evt" state="outbound">
    <send targettype="ccxml" target="evt_childid" data="'hdap.start'" namelist="connectionid conferenceid"/>
  </transition>

<transition event="connection.disconnected" name="evt">
    <exit />
  </transition>
  <!--                                                    -->
  <!-- Common event handlers for both inbound and outbound -->
  <!--                                                    -->
  <transition event="ccxml.exit" name="evt">
    <!-- Child is done, we can exit now too -->
```

FIG. 30-R – Device Logic CCXML Document

```
    <if cond="TollFree == true &&(blockcallerid == true
||isTollfreecalleridnumber==true)">
        <var name="parentid" expr="session.id"/>
        <dialogprepare src="/appserver/ccxml/pbx/recording_blockednumber.ulaw"
type="audio/wav" dialogid="dialogid"/>
        <log expr="'HDAP::PBXCCXML Dialog t='+trid+', i='+smid+', g=' + guid + ': received
' + evt.name + ', reason = ' + evt.reason"/>
        <else/>
        <var name="exit_reason" expr="evt.exit_reason" />
        <exit namelist="exit_reason" />

</if>

</transition>

<transition event="dialog.prepared" name="evt">
    <assign name="state" expr="dialog"/>
    <log expr="'HDAP::PBX t='+trid+', i='+smid+', g='+guid+', dialog.prepared,
state='+state+', dialogid='+evt.dialogid+', sending hdap.ready to parent='+parentid"/>
    <if cond="evt.dialogid == dialogid">
        <var name="childid" expr="session.id"/>
        <var name="data" expr="makecallData"/>
        <if cond="receivedHdapReady!= true">
            <send target="parentid" data="'hdap.ready'" namelist="childid data"/>
        </if>
        <assign name="application.hdap.disposition" expr="'Answered'"/>
    </if>
</transition>

<transition event="hdap.start" name="evt" state="dialog">
    <assign name="connectionid" expr="evt.connectionid"/>
    <log expr="'HDAP::PBX DIALOG'"/>
    <if cond="connectionid != undefined">
        <dialogstart prepareddialogid="dialogid" connectionid="connectionid"/>
    </if>
</transition>
```

FIG. 30-S – Device Logic CCXML Document

```
<transition event="dialog.started" name="evt">
  <log expr="'HDAP::PBX t='+trid+', i='+smid+', g='+guid+',
device='+application.hdap.deviceguid+', dialog.started, dialog='+evt.dialogid+',
connectionid='+evt.connectionid"/>
</transition>

<transition event="dialog.exit" name="evt">
  <log expr="'HDAP::PBX t='+trid+', i='+smid+', g='+guid+', dialog.exit, moving
connectionid='+connectionid+' to parent='+parentid"/>
  <if cond="evt.connectionid != undefined">
  <move source="evt.connectionid" sessionid="session.parentid"/>
  <elseif cond="evt.connectionid = undefined"/>
  <exit/>
  </if>
</transition>

<transition event="move.successful" name="evt">
  <log expr="'HDAP::PBX t='+trid+', i='+smid+', g='+ guid+',
source='+evt.eventsource+' received move.successful instead of the device specified in
the hdap.ready"/>
  <log expr="'HDAP::PBX t='+trid+', i='+smid+', g='+guid+', move.successful,
state='+state+', connectionid='+evt.connectionid"/>
</transition>

<transition event="connection.disconnected" name="evt">
  <log expr="name + ' received ' + evt.name + '. Moving the connection object back ' +
parentid"/>
  <move source="connectionid" sessionid="parentid"/>
  <assign name="state" expr="exiting"/>
</transition>

<transition event="ccxml.kill" name="evt">
  <if cond="childid != undefined">
  <send targettype="ccxml" target="childid" data="ccxml.kill" />
  </if>
  <exit />
</transition>
```

FIG. 30-T – Device Logic CCXML Document

```
<transition event="error." name="evt">
  <log expr="'HDAP::PBX t='+trid+', i='+smid+', g=' + guid + ': received ' + evt.name +
reason = ' + evt.reason" />
  <if cond="state == 'outbound'">
    <disconnect connectionid="connectionid" />
  </if>
  <exit />
</transition>

<transition event="ccxml.created" name="evt">
  <!-- do nothing, just suppress log message about missed event. -->
</transition>

<transition event="send.successful" name="evt">
  <!-- do nothing, just suppress log message about missed event. -->
</transition>

<transition event="ccxml.loaded" name="evt">
  <log expr="'HDAP::PBX i='+smid+', g=' + guid + ' ccxml.loaded
session.id='+evt.sessionid"/>
</transition>

<transition event="vos.move.received" name="evt">
  <log expr="'HDAP::PBX t='+trid+', i='+smid+', g=' + guid + ' vos.move.received,
connectionid='+evt.connectionid"/>
</transition>

<transition event="conference.joined" name="evt">
  <!-- do nothing, just suppress log message about missed event. -->
</transition>

<transition event="conference.unjoined" name="evt">
  <if cond="state == 'exiting'">
    <log expr="'conference.unjoined, state =for HDAP::EPABX exiting, cleaning up and
shutting down'"/>
    <send target="session.id" data="'connection.disconnected'"/>
  <else/>
    <log expr="'conference.unjoined, state = HDAP::EPABX exiting, cleaning up and
shutting down'"/>
```

FIG. 30-U – Device Logic CCXML Document

```
    <send target="session.id" data="'connection.disconnected'"/>
   </if>
  </transition>
  <transition event="failed.move" name="evt">
   <log expr="'HDAP::PBX t='+trid+', i='+smid+', g='+guid+', failed.move, exiting'"/>
   <log  label="'BILLING'"
expr="'appserver='+application.hdap.appserver+'|vserver='+application.hdap.vserver+'|a
ni='+application.hdap.ani+'|dnis='+application.hdap.dnis+'|logtype='+application.hdap.lo
gType+'|disposition='+application.hdap.disposition+'|device_id='+application.hdap.devic
eguid+'|device_type_name='+application.hdap.deviceTypeName+'|device_kit_name='+
application.hdap.deviceKitName+'|account_service_id='+application.hdap.accountServi
ceId+'|device_kit_id='+application.hdap.deviceKitId+'|device_kit_type_name='+applicati
on.hdap.deviceKitTypeName+'|start_time='+application.hdap.starttime+'|duration='+appl
ication.hdap.duration+'|terminatesLeg='+application.hdap.terminatesLeg+'"+application.
hdap.callLegInfo"/>

<exit/>
  </transition>

<transition event="'*'" name="evt">
   <log expr="'HDAP::PBX t='+trid+', i='+smid+', g=' + guid + ' WARN unexpected
event caught: ' + evt.name" />
  </transition>

</eventprocessor>
</ccxml>
```

FIG. 30-V - Device Logic CCXML Document

```xml
"<ccxml version=""1.0"" xmlns=""http://www.w3.org/2002/09/ccxml"">
<!-- Running type PBX -->
<var name=""guid"" expr=""undefined"" />
<var name=""smid"" expr=""session.id""/>

<script>
 <![CDATA[
      smid = smid % 10000;
  ]]>
</script>

<eventprocessor>
 <transition event=""ccxml.loaded"">
  <log expr=""HDAP TRACKING.  Device Kit 115 Device 434 Type PBX Starting"" />
  <script> <![CDATA[
     application.hdap = new Object();
     application.hdap.deviceguid = '434';
     application.hdap.traceid ='null1';
     application.hdap.accountstatusid = '1';
     application.hdap.appserver = '10.10.0.121';
     application.hdap.vserver = '127.0.0.1';
     application.hdap.ani = 'undefined';
     application.hdap.dnis = 'undefined';
     application.hdap.logType = 'N';
     application.hdap.name = 'Phone System for Phone System111';
     application.hdap.accountid = '25013';
     application.hdap.timezoneoffset = -14400000;
     application.hdap.starttime = new Date().getTime();
     application.hdap.duration = 0;
     application.hdap.activeStartTime = 0;
     application.hdap.disposition = 'Starting';
     application.hdap.deviceTypeName = 'PBX';
     application.hdap.deviceKitId = '115';
     application.hdap.deviceKitTypeName = 'Phone System';
     application.hdap.accountServiceId = '147';
     application.hdap.extension = 'undefined';
     application.hdap.deviceKitName = 'Phone System for Phone System111';
     application.hdap.terminatesLeg = false;

application.OutboundCallDevice='/appserver/hdap/ccxml/devices/1';

application.CalleridMode='handset';
```

FIG. 31A - Properties CCXML Document

```
application.CallerIdNumber='12157013034';

application.ExtensionRoutingTable=new Array();

application.ExtensionRoutingTable['100']='/appserver/hdap/ccxml/devices/140400';

application.ExtensionRoutingTable['*100']='/appserver/hdap/ccxml/devices/433';

application.ExtensionRoutingTable['1000']='/appserver/hdap/ccxml/devices/55156';

application.ExtensionRoutingTable['1001']='/appserver/hdap/ccxml/devices/55160';

application.ExtensionRoutingTable['1002']='/appserver/hdap/ccxml/devices/140397';

application.ExtensionRoutingTable['*101']='/appserver/hdap/ccxml/devices/432';

application.ExtensionRoutingTable['*102']='/appserver/hdap/ccxml/devices/431';

application.ExtensionRoutingTable['455']='/appserver/hdap/ccxml/devices/173884';

application.ExtensionRoutingTable['509']='/appserver/hdap/ccxml/devices/464';

application.ExtensionRoutingTable['510']='/appserver/hdap/ccxml/devices/487';

application.ExtensionRoutingTable['511']='/appserver/hdap/ccxml/devices/443';

application.ExtensionRoutingTable['512']='/appserver/hdap/ccxml/devices/440';

application.ExtensionRoutingTable['513']='/appserver/hdap/ccxml/devices/446';

application.ExtensionRoutingTable['514']='/appserver/hdap/ccxml/devices/449';

application.ExtensionRoutingTable['515']='/appserver/hdap/ccxml/devices/452';

application.ExtensionRoutingTable['516']='/appserver/hdap/ccxml/devices/437';

application.ExtensionRoutingTable['517']='/appserver/hdap/ccxml/devices/455';

application.ExtensionRoutingTable['518']='/appserver/hdap/ccxml/devices/458';

application.ExtensionRoutingTable['520']='/appserver/hdap/ccxml/devices/513';

application.ExtensionRoutingTable['528']='/appserver/hdap/ccxml/devices/461';

application.ExtensionRoutingTable['560']='/appserver/hdap/ccxml/devices/477';
```

FIG. 31B - Properties CCXML Document

```
application.ExtensionRoutingTable['562']='/appserver/hdap/ccxml/devices/471';
application.ExtensionRoutingTable['563']='/appserver/hdap/ccxml/devices/474';
application.ExtensionRoutingTable['566']='/appserver/hdap/ccxml/devices/468';
application.ExtensionRoutingTable['570']='/appserver/hdap/ccxml/devices/480';
application.ExtensionRoutingTable['572']='/appserver/hdap/ccxml/devices/485';
application.ExtensionRoutingTable['573']='/appserver/hdap/ccxml/devices/1342';
application.ExtensionRoutingTable['574']='/appserver/hdap/ccxml/devices/1349';
application.ExtensionRoutingTable['575']='/appserver/hdap/ccxml/devices/2132';
application.ExtensionRoutingTable['576']='/appserver/hdap/ccxml/devices/2135';
application.ExtensionRoutingTable['577']='/appserver/hdap/ccxml/devices/2138';
application.ExtensionRoutingTable['578']='/appserver/hdap/ccxml/devices/2141';
application.ExtensionRoutingTable['579']='/appserver/hdap/ccxml/devices/55038';
application.ExtensionRoutingTable['580']='/appserver/hdap/ccxml/devices/55041';
application.ExtensionRoutingTable['651']='/appserver/hdap/ccxml/devices/91118';
application.ExtensionRoutingTable['656']='/appserver/hdap/ccxml/devices/19537';
application.ExtensionRoutingTable['666']='/appserver/hdap/ccxml/devices/216991';
application.ExtensionRoutingTable['667']='/appserver/hdap/ccxml/devices/216993';
application.ExtensionRoutingTable['681']='/appserver/hdap/ccxml/devices/467';
application.ExtensionRoutingTable['682']='/appserver/hdap/ccxml/devices/11208';
application.ExtensionRoutingTable['*90']='/appserver/hdap/ccxml/devices/481';
application.ExtensionRoutingTable['*91']='/appserver/hdap/ccxml/devices/482';
application.ExtensionRoutingTable['987']='/appserver/hdap/ccxml/devices/56836';
application.ExtensionRoutingTable['*99']='/appserver/hdap/ccxml/devices/433';
```

FIG. 31C - Properties CCXML Document

```
application.ExtensionRoutingTable['997']='/appserver/hdap/ccxml/devices/55131';

application.ExtensionRoutingTable['998']='/appserver/hdap/ccxml/devices/55125';

application.ExtensionRoutingTable['999']='/appserver/hdap/ccxml/devices/55122';

]]></script>
<if cond="'application.hdap.accountstatusid != 1'">
  <log expr="'HDAP::properties.jsp i='+smid+', g='+application.hdap.deviceguid+'
exiting because status id = ' + application.hdap.accountstatusid'" />
  <exit />
</if>
<fetch next="'../../ccxml/pbx/pbx.ccxml'" />
</transition>

<transition event="'error.fetch'" name="'evt'">
  <log expr="'HDAP::properties.jsp i='+smid+', g='+application.hdap.deviceguid+'
Unable to fetch URL ../../ccxml/pbx/pbx.ccxml because ' + evt.reason'" />
  <exit />
</transition>

<transition event="'fetch.done'" name="'evt'">
  <var name="'childid'" expr="'session.id'" />
  <send target="'session.parentid'" data="'hdap.initialized'" namelist="'childid'"/>
  <goto fetchid="'evt.fetchid'"/>
</transition>

<transition event="'error.semantic'" name="'evt'">
  <log expr="'HDAP::properties.jsp i='+smid+', g='+application.hdap.deviceguid+'
Error loading document. Reason was ' + evt.reason'" />
  <exit />
</transition>

<transition event="'ccxml.kill'" name="'evt'">
  <log expr="'HDAP::properties.jsp i='+smid+', g='+application.hdap.deviceguid+'
exiting'" />
  <exit />
</transition>
</eventprocessor>
</ccxml>
"
```

FIG. 31D - Properties CCXML Document

SYSTEMS AND METHODS FOR SOFTWARE-IMPLEMENTED TELEPHONY DEVICES IN A VOICE OVER INTERNET PROTOCOL (VOIP) SYSTEM

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention(s) relate generally to telephony, and more particularly relate to the provision of telephony functionality via configurable, reusable software-implemented telephony devices that provide specific telephony functions, particularly useful in a digital media communication system such as a voice over Internet protocol (VoIP) system.

BACKGROUND

The widespread availability of the global and public computer network called the Internet has spawned a huge explosion of uses for many purposes by many people. The Internet is now used for communicating all sorts of media signals including video, telephony, music, file sharing, advertising, social networking, and myriads of other things. The Internet is often depicted in diagrams and drawings as a "cloud," because of the idea that a computing capability or web site is "out there somewhere," and not necessarily nearby to the actual computer user. The actual location is often not knowable to the average Internet user.

Prior to the explosion of Internet usage, the most common person-to-person electronic communication for decades was the plain old telephone system (POTS). Now, even telephone communications are migrating towards digital implementations on the Internet. Telephone calls on the Internet is often called "voice over Internet protocol" (VoIP) telephony, because of the usage of packet communications using the known Internet protocol (IP) and its variations such as TCP/IP, UDP, and the like.

Telephone service is often implemented for businesses and other entities by use of equipment known as private branch exchanges (PBX). A PBX is typically an electronic device that connects individual telephone users with handsets to other telephone users. Such connections can be within the business (for intra-PBX communications), or with other telephony users outside the business (for extra-PBX communications), typically via the known public switched telephone network (PSTN) operated by the known telephone company system operators (as of 2008) such as AT&T, Verizon, Qwest Corporation, Windstream Communications, and also mobile/cellular service providers such as AT&T, Verizon, Sprint, T-Mobile, etc. Such entities are also often called telcos.

The growing capability and presence of Internet-based computing, communication, and data storage has led to the creation of distributed computing facilities all over the world. Internet-based computing need not be centrally located, and with the advent of multi-core computer chips and "virtualization" of computers, a computing or communication or data storage function can now be dispersed among a number of different physical facilities, often miles apart, but usually invisible to the end user. Virtualization of a computer resource means that the resource need not have a single physical location for its implementation, on a single physical computer, but can be split into different pieces or parts, run on different computers, or within different processes in the same computer, perhaps in different physical locations. The rise of virtualization has led to a phenomenon known as cloud computing, which means that a computer or communication or data storage resource is merely "out there in the cloud." In other words, the resource has no readily identifiable location as far as the user is concerned, but the resource is provided as a service on behalf of the user, by some kind of service provider, such an Internet service provider (ISP).

Some PBX and call routing equipment is now being made with software components that run on a computer, instead of with discrete electronics. One example is shown in U.S. Pat. No. 7,035,935 to Voois et al., "Communications Service Provider Network." This patent describes a system for routing of telephony data in a private branch exchange (PBX) arrangement adapted to route IP telephony data. The routing arrangement includes a call-control application having an object-oriented programming (OOP) telephony interface and programmed to control the routing of calls. A device-control application is adapted to provide telephony communication signals for the routed calls and to interface between the call-control application and a plurality of telephony devices. Configuration information for the call-control application is provided via a configuration manager. In this manner, voice and data networks are allegedly effectively fused, purportedly allowing the easy integration of computer telephony applications.

There is, however, a need for more flexible and robust implementation of various forms of telephony devices within PBX equipment and for use by telephony service providers. Many telephony functions are complex, and require the coordination of different functions, sometimes as ancillary or "child" functions, and sometimes as handed off from one device to another. For example, a PBX provides various related telephony functions such as voice announcement signals, an answering machine announcement specific to a particular end user, music on hold signals, filtering of signals, conferencing capability, follow me capability to route calls to handsets then mobile devices then answering machines, connecting to an outside PSTN line, and the like. Functions such as filtering, conferencing, and music on hold are ancillary functions that are provided during the processing of a particular call. But functions such as follow me capability, connecting to an outside POTS line, and connecting to answering machine are essentially handoff type functions. Even telephone handsets have basic functions such as last number redial, memory dialing, conferencing selection, call hold, transfer call to another extension, and the like. Various telephony capabilities and functions can be collected or assembled into groups or "kits" of related functionality, but each group or kit requires complex circuitry or programming to implement.

Given the rise of ubiquitous computing, communication, and data storage facilities in the Internet cloud, and the growing popularity of VoIP for telephony purposes on the Internet, there is a need for a more robust and easily configurable arrangement for providing telephony functions for PBX and telephone service provider equipment—without dedicated electronics—and using the widespread availability of computing resources in the cloud.

The present inventions provide such a robust, expandable, and easily configurable solution, and an architecture, for providing PBX and other complex telephony functions of telephony service providers. The advantages of the inventions result, in part, by the discovery by the inventors that a number of complex telephony functions have certain aspects that are common to many users within a distributed system. By leveraging that commonality of function with reusable and universally available software components, customized by configuration parameters that are specific to particular users, service providers, PBX operators, and others, a new architecture is provided that allows provision of reusable, readily configurable telephony devices that can be assembled into kits or other collections. Further, through the extensive use of markup languages, the inventions provide for an easy and quick way for future developers to build more devices for purposes as yet not thought of

SUMMARY

Briefly described, the present inventions provide aspects of systems and methods for providing configurable, reusable software-implemented telephony devices, particularly useful for use in a voice over Internet protocol (VoIP) system. A typical system in which such various inventions are useful involves the processing of digital voice and other media signals between end users, often using telephone handsets or similar media devices, and generally with the media signals communicated in packets via a wide area distributed communications network such at the Internet. The following described aspects are equally applicable to methods for implementing the various inventions, as well as systems constructed to provide the benefits disclosed herein.

According to one aspect, there is described a voice over Internet protocol (VoIP) system in which media signals are processed in communication sessions between an originating system and a destination system, by use of at least one software-implemented configurable telephony device comprising at least logic defining a behavior and configuration parameters specific to the telephony device and its behavior. Such an exemplary system comprises a device platform data store associating (a) information corresponding to an account owner, and (b) information identifying at least one instance, on behalf of the account owner, of a telephony device provided in the VoIP system. In a preferred system, each instance is identified by a distinct device identifier, and preferably a globally unique identifier.

The disclosed system further comprises a computer program component corresponding to the software-implemented telephony device identified by the device identifier, the component comprising (a) reusable device logic defining the behavior of the telephony device to provide a configurable telephony function and (b) configuration information comprising specific device properties for an instance of the telephony device. According to one aspect, the configuration information of the program component, when utilized with the device logic, defines a specific configured instance of the telephony device in the VoIP system that provides a specific telephony function.

Finally in this aspect, the system comprises a processor responsive to an incoming request from an originating system for conducting a communication session for the purpose of processing signals between the originating system and a destination system. The processor is operative for (a) accessing the device platform data store to determine the device identifier of a telephony device that is to be activated on behalf of the account owner for the communication session, and (b) executing the device logic of the computer program component in accordance with the configuration information to provide the specific telephony function of the telephony device for the communication session on behalf of the account owner.

According to another aspect, a system in accordance with these inventions further comprises a document store for storing a computer-executable device logic document comprising the definition of a behavior of a telephony device that provides a specific telephony function. The device logic document comprises code for effecting predetermined device functions required for implementing the specific telephony function. Further still, the system preferably comprises a document store for storing a computer-executable device properties document containing configuration information comprising specific properties for an instance of a telephony device. When utilized with a device logic document, the device properties document defines a specific instance of the telephony device in the VoIP system. The device properties document is preferably stored in association with a globally unique device identifier (device GUID) for the telephony device, as the device identifier In an aspect as described with discrete device logic documents and discrete device properties documents, the processor of the disclosed system is operative to effect instances of the telephony device on behalf of an account owner by carrying out the steps of:

(1) receiving an incoming request from an originating system represented by a message including at least an identifier of a destination system, the incoming request for initiating a communication session for the purpose of processing signals between the originating system and the destination system.

(2) in response to the incoming message, accessing the device platform data store to determine the GUID of a telephony device that is to be activated on behalf of the account owner for the communication session.

(3) based on the GUID, retrieving the corresponding device properties document for the identified telephony device from the document store.

(4) utilizing the configuration information in the retrieved device properties document to determine specific operational properties of the telephony device.

(5) determining from the device properties document a corresponding device logic document for the telephony device.

(6) retrieving the corresponding device logic document from the document store.

(7) executing the predetermined device functions of the retrieved device logic document in accordance with the configuration information from the retrieved device properties document to provide the specific telephony function of the telephony device for the communication session.

According to another aspect, the processor is further operative, based upon (a) the properties of the device as specified in the device properties document, in conjunction with (b) logic of the device as specified in the device logic document, for determining to invoke a subsequent child telephony device for the communication session and provide a further telephony function for the child telephony device. In such an aspect, the processor is preferably operative for executing the above steps recursively to invoke a plurality of subsequent child telephony devices to thereby provide the telephony functions of a plurality of related telephony devices.

In yet another aspect, the processor is further operative for receiving input from an end user and carrying out the steps based on end user input in conjunction with the properties of the device and the logic of the device. The end user input may be provided via one or more of the following: dual tone multifrequency (DTMF) signals, a keypad, voice signals recognized by a voice recognition telephony device.

In a further aspect, in addition to the logic defining a behavior and configuration parameters specific to the device and its behavior, a telephony device comprises a resource external to the device. The resource may comprise one or more of the following: a telephony function provided by another telephony device, voice announcement signals, an answering machine announcement specific to a particular end user, music on hold signals, VoiceXML functions, other data content signals stored in a resource storage device.

In another aspect of the disclosed system, the device properties document and the device logic document are processed by a document interpreter. The document interpreter is provided as a computing function integrated with other computing functions for the VoIP system, such other functions including one or more of the following: a VoiceXML interpreter, a SIP handling stack, media signal processor.

According to another aspect, the device platform data store further stores information identifying predetermined services provided in the VoIP system on behalf of an account owner, the predetermined services comprising one of more device kits provided by a system operator on behalf of the account owner. In this aspect, the processor of the system is further operative for, in connection with providing predetermined services on behalf of an account owner, for providing device kit information in the system comprising the definition of a device kit comprising a collection of a plurality of software-implemented telephony devices. The device kit information is stored in association with a device kit type identifier (device kit type ID) corresponding to a particular kit of telephony devices. Further, configuration information is stored comprising specific properties for an instance of a particular device kit, that when utilized with device kit type information defines a specific instance of a device kit in the VoIP system. The configuration information is stored in association with a device kit identifier (device kit ID) for the device kit. Further in accordance with this aspect, a kit comprises one of a plurality of different kit types.

For various aspects of the systems and methods disclosed herein, the originating system may be selected from the group comprising: a SIP handset, an external switch connected to the PSTN network, and an Internet router providing an incoming VoIP call. Further, the destination system may be selected from the group comprising: a SIP handset, an external switch connected to the PSTN network, and an Internet router for transmitting out a VoIP call.

Also in various aspects of the disclosed systems and methods, the device logic document and the device properties documents are markup language (ML) documents, and in the preferred embodiment, CCXML documents. According to this aspect, the device logic document and the device properties document are processed by a CCXML interpreter, and the CCXML interpreter is also operative to process other resources required for implementing the specific instance of the telephony device. In accordance with markup language document processing techniques, the CCXML interpreter assigns a session identifier (sessionid) to each of one or more resources required for implementing the specific instance of the telephony device.

According to yet another aspect, the computer program component comprises code for effecting predetermined device functions including but not limited to one or more of the following: event processing code, scripting code, session maintenance code, database access, database logic in stored procedures, triggers for functions, variable definitions, URI's to other information, code for executing VoiceXML documents, logical expressions. Specific telephony functions include but are not limited to the following: providing a telephone handset, a PBX, a music on hold function, call transfer, signal filtering, call groups, fax routing, call forwarding, call conferencing, a follow-me function, a recording function, a voice message function, a message playback function, a call queue function, an automatic attendant function, an announcement function, a switching function, a timer function, a phone menu function, a name dialer function, a billing function, a custom third-party provider telephony function.

In the preferred system and method, each account owner has a plurality of customers, each of which has one or more telephony devices. Customers can be end users, or can be other entities such as further dependent account owners, service providers, and the like.

In many aspects, the incoming request from an originating system comprises a SIP message. A typical SIP message includes a SIP message identifier of a destination system comprising a DID number for a call external to the originating system and a DID number or an extension number for a call within a system associated with the originating system. Variations however of incoming requests can occur. For example, the message identifier of the originating system can be one or more of the following: SIP ID of the originating system, DID number, caller ID, the MAC address of a physical handset, or other identifier.

According to yet another aspect, the telephony device further comprises a resource required for implementing a specific instance of the telephone device. Such a resource may comprise one or more of the following: references to another telephony device, one or more VoiceXML documents, a URI to particular audio content, a URI to multimedia content, external code in an application server to perform functions of the telephony device other than those provided in the device logic or the device properties, database logic relating to the telephony device's function.

According to yet another aspect, the device platform data store further stores information identifying at least one instance of a telephony device as constituting a root telephony device that is to be initially activated on behalf of an account owner. In one embodiment, the root telephony device is a root switch that is activated on behalf of the account owner in response to an incoming call from an external source, and wherein the root switch is operative for routing the incoming call to a subsequent telephony device associated with the account owner. In an aspect involving routing, the processor is further operative for determining a routing for the communication session to an ordered sequence of telephony devices, and successively instantiating further telephony devices in accordance with the ordered sequence. In such an aspect, a subsequent telephony device immediately following the root switch can be a PBX telephony device or a provider-level root switch.

According to another aspect, the root telephony device is a SIP handset that is activated on behalf of the account owner in response to activation of a physical handset by an end user associated with the account owner. According to yet another aspect, the incoming request represents a call originating from a physical SIP handset that is associated with the account owner and is to be routed to an external destination. In this and other cases, one exemplary telephony device comprises operational code for software-implementable functions of the physical handset, and another telephony device comprises operational code for software-implementable functions for a switch that is connected to the PSTN network as an outbound call.

According to yet another aspect, the incoming request represents a call originating from a first physical SIP handset that is associated with the account owner and is to be routed to a second physical SIP handset that is associated with the account owner. In this and other cases, the incoming request represents a call originating from an external source intended for a destination equipment within the VoIP system as an inbound call.

In yet another aspect, the incoming request represents a call originating from a handset of an end user of an account owner within the VoIP system intended for a destination within a PBX associated with the account owner (intra-PBX).

In a further aspect, the incoming request represents a call originating from a handset of an end user of an account owner within the VoIP system intended for a destination within a PBX associated with another account owner (inter-PBX).

Turning to a further aspect involving the instantiation of child telephony devices to construct complex interconnected and related telephony functions, the device logic document for the telephony function corresponds to a parent telephony device that invokes a child telephony device. In such aspects, the processor is further operative for determining that the telephony function provided by the telephony device calls for the invocation of a related child telephony device, as reflected by the presence of a GUID of a child telephony device. The processor is then operative for retrieving the corresponding device properties document for the identified child telephony device that is to be activated on behalf of the account owner. Thereafter, the processor is operative for utilizing the configuration information in the retrieved device properties document to determine specific operational properties of the child telephony device. Next, the processor is operative for determining from the device properties document a corresponding device logic document for the child telephony device. Then, the processor is operative for retrieving the corresponding device logic document for the child telephony device. After these steps, the processor is operative for executing the predetermined device functions of the retrieved device logic document in accordance with the configuration information from the retrieved device properties document to provide the specific telephony function for the child telephony device.

In an exemplary parent/child device aspect, the GUID of the child telephony device may be provided in the device properties document of the parent telephony device. In another exemplary aspect, the GUID of the child telephony device is provided from routing information obtained by the parent telephony device, the routing information comprising a subsequent telephony device in sequence of related telephony devices. Preferably in many aspects of the inventions, the invocation of a child telephony device is recursive, so as to allow construction of complex and related functions.

According to yet another aspect involving reusability, a single device logic document is utilized in connection with all instances of a corresponding telephony device type for all account owners, and is referenced by all corresponding device properties documents for that type. In such an exemplary case, there is distinct device logic document for each telephony device type.

In yet another aspect, the processor is further operative for providing a network-accessible user interface for allowing a user authorized by an operator of the VoIP system to access and change configuration information of one or more telephony devices, by accessing and changing the information of the device properties documents, such that configuration information changes take effect in the VoIP system in real-time.

In another but related aspect, the processor is further operative for providing a network-accessible application programming interface for allowing a user or developer authorized by an operator of the VoIP system to access and change configuration information of one or more telephony devices, by accessing and changing the information of the device properties documents, such that configuration information changes take effect in the VoIP system in real-time.

In yet another but related aspect, the processor is further operative for providing a network-accessible graphical user interface (GUI) for allowing a user or developer authorized by an operator of the VoIP system to access and change configuration information of one or more telephony devices, by accessing and changing the information of the device properties documents, such that configuration information changes take effect in the VoIP system in real-time. In such an exemplary aspect, certain configuration information is represented as a graphical tree. Changes are effected by dragging representations of devices in the GUI on specific locations of the tree, and drawing and moving lines between devices to establish device connections. In such an embodiment, the task of configuring aspects of the VoIP system is made user-friendly and available to a non-technical common user.

A further aspect of the disclosed methods and systems involves provision of telephony services on behalf of multiple telephony service providers. In such an aspect, the device platform data store stores information corresponding to a plurality of telephony service providers, wherein each one of the plurality of telephony service providers has a plurality of account owners. In such a system, an account owner may be any one of the following: a service provider, a direct customer of the VoIP system operator, a customer of a service provider, a branded reseller of services, a private label reseller of services, a PBX operator. In such a multiple service provider aspect, an in other aspect, a single device logic document may be utilized in connection with all instances of a corresponding telephony device type for all account owners of the plurality of telephony service providers, and is referenced by all corresponding device properties documents for all customers of such account owners.

Another aspect of the disclosed systems and methods involves a marketplace and exchange for third party developers of telephony devices constructed as described herein. In such an aspect, a telephony device database stores information corresponding to one or more telephony devices provided in the VoIP system by a third party device developer. In this exemplary aspect, the processor is further operative for providing access to the VoIP system by the third party developer to create new telephony devices, and/or customize, extend, and/or integrate existing telephony devices with additional functionality, to thereby provide a third party device marketplace.

In another aspect of the third party developer involvement, a telephony device database stores information associating (a) information identifying one or more telephony devices provided in the VoIP system by a third party device developer; and (b) telephony device usage information identifying the usage of the one or more telephony devices provided by the third party device developer by account owners. In such an aspect, the processor is further operative for tracking the usage of one or more of the telephony devices provided by the third party device developer by a particular account owner; storing telephony device usage information in the telephony device usage database corresponding to usage of one or more of the telephony devices provided by the third party device developer by the particular account owner; and providing a financial credit to the third party device developer in accordance with the telephony device usage information. In such a system, an account owner that utilizes a telephony device provided by a third party device developer can be charged a fee for the utilization according to a usage schedule.

Yet another aspect of the disclosed systems and methods relates to high speed caches of certain data involved in implementing the telephony devices, for performance and reliability purposes. In one such embodiment, a system includes a high speed cache for storing of device properties documents, SIP identifiers (SIP ID), and SIP handset device GUIDs. In such an embodiment, the processor is further operative in response to the incoming request from the originating system represented by the SIP ID in the SIP message, for accessing the high speed cache to extract a corresponding SIP handset device GUID; and accessing the high speed cache using the extracted SIP handset device GUID to retrieve the corresponding device properties document for an initiating SIP handset.

According to another aspect, a system comprises a high speed cache for storing (a) device properties documents, (b) target phone numbers associated with an account owner, (c) the GUID of a telephony device associated with each phone number of the account owner, including a root telephony device that is first invoked in response to an incoming call, and (d) the route, in the form of an ordered sequence of device GUIDs of the list of telephony devices that have to be invoked to reach the telephony device associated with the phone number of the incoming call. In such an exemplary embodiment, the processor is further operative, in response to an incoming request from the originating system represented by an incoming call directed to a target phone number associated with the account owner, for extracting the route to a telephony device GUID associated with the account owner that responds to the incoming call; and accessing the high speed cache using the root telephony device GUID to retrieve the corresponding device properties document for a subsequent telephony device as specified by a retrieved route retrieved from the high speed cache.

In exemplary aspects relating to caching, there is provided primary and secondary redundant parallel caches for the high speed cache, and an external database as a tertiary redundant cache. In such an exemplary embodiment, the processor is further operative for:

(a) pointing one group of servers to a particular primary cache and a particular secondary cache, whereas pointing the remaining servers to the secondary cache of the first group as the primary, and to the primary cache of the first group as the secondary, thus reducing the risk of unavailability of the primary cache for any server;

(b) in response to the incoming request from the originating system, accessing the primary redundant cache;

(c) in response of failure of the primary redundant cache to respond within a predetermined first time period, accessing the secondary redundant cache;

(d) in response of failure of the secondary redundant cache to respond within a predetermined second time period, accessing the tertiary redundant cache; and (e) in response of failure of the tertiary redundant cache to return the requested cached data within a predetermined third time period, invoking appropriate function calls within the database to recalculate and return the necessary data from the raw underlying database data.

In many of the disclosed embodiments, a plurality of telephony devices is associated into a predetermined kit. The data store in such a system stores information also associating one or more kits of devices provided on behalf of the account owner.

Yet another aspect of the disclosed systems and methods involves the provision of the telephony services in a cloud computing environment. In such an exemplary aspect, storage for device logic documents, storage for the device properties documents, the device platform data store, and processing functions for effecting telephony devices are implemented by different processes on different computer servers in a cloud computing environment. In such an embodiment, customers, resellers and private labelers of a VoIP system do not need to manage the functioning, scalability, reliability, performance and capacity planning of the infrastructure underlying the VoIP system, as these aspects are implicitly outsourced to the operator of the cloud-based VoIP system.

It will by now be appreciated that the telephony devices, as implemented as described herein, may be of various forms and natures, to provide connected, related, and complex functions. For example, specific contemplated telephony functions include the provision of functionality for one or more SIP handsets, for use in connection with the function of a PBX provided on behalf of an account owner having multiple customers, each customer having multiple associated SIP handsets. Further still, the device logic document is stored in association with a device type identifier (device type ID) corresponding to a particular telephony device type. The device properties document contains configuration information comprising specific properties for an instance of a telephony device type, that when utilized with a device logic document defines a specific instance of the telephony device type in the VoIP system. In such an aspect, the device platform data store further associates, with the account owner, device type information identified by a unique device type ID, corresponding to the identification of one or more types of different telephony devices provided in the VoIP system.

It will also be appreciated that, in various exemplary aspects, there is a device logic document stored corresponding to each device type ID provided in the VoIP system on behalf of the account owner; and wherein there is a device properties document stored corresponding to each device GUID, provided for each instance of the one or more types of different telephony devices provided in the VoIP system on behalf of the account owner. In such an exemplary aspect, the operation of determining from the device properties document a corresponding device logic document for the telephony device comprise (a) determining from the device properties document a corresponding device logic document for the device type represented by the device type ID; (b) determining the corresponding device logic document by a universal resource locator (URL) contained in the device properties document; and (c) retrieving the corresponding device logic document by the URL of the device logic document.

These and other aspects, features, and benefits of the present invention(s) will become apparent from the following detailed written description of the preferred embodiments taken in conjunction with the following drawings, although variations and modifications therein may be effected without departing from the spirit and scope of the novel concepts of the disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 10 is a listing of CCXML events that each telephony device is required to handle.

FIG. 11 is an hdap.receivecall event structure for the event handlers of FIG. 10.

FIG. 12 is an hdap.ready event structure for the event handlers of FIG. 10.

FIG. 13 is an hdap.initialized event structure for the event handlers of FIG. 10.

FIG. 14 is an hdap.start event structure for the event handlers of FIG. 10.

FIG. 15 is an hdap.makecall event structure for the event handlers of FIG. 10.

FIG. 19 shows the events that must be supported by the CCXML document that is typically configured as the default CCXML document for the CCXML interpreter.

FIG. 29 is an exemplary HDAP CCXML document.

FIG. 30 is an exemplary device logic CCXML document.

FIG. 31 is an exemplary device properties CCXML document.

DETAILED DESCRIPTION

Figure 1:
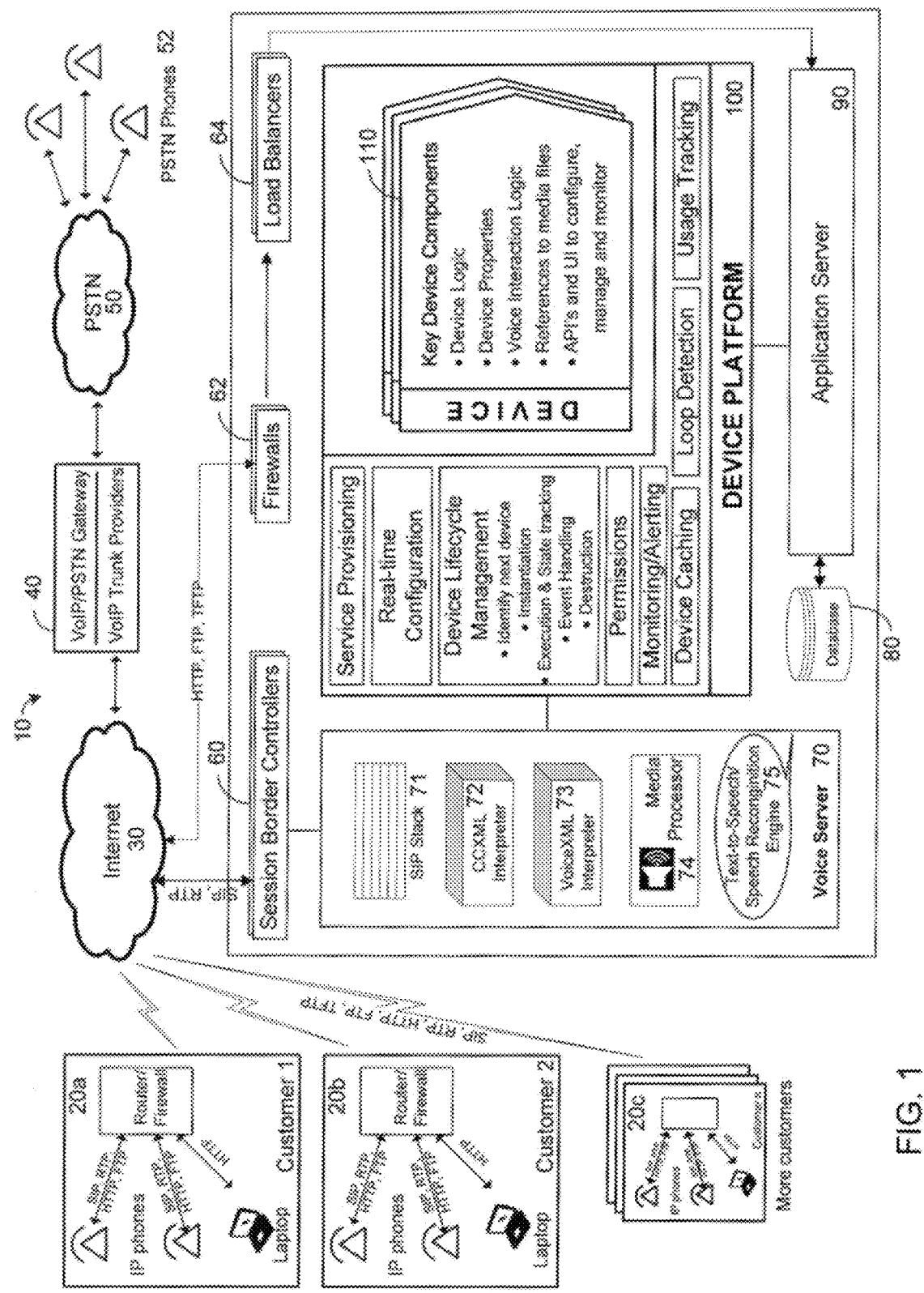
FIG. 1 shows an overview of a voice over Internet protocol (VoIP) system for providing telephony functionality using multiple configurable software-implemented telephony devices.

Reference is now made in detail to the description of the embodiments of systems and methods for providing telephony functionality via configurable software-implemented telephony devices between originating systems and destination systems using a session control protocol and a communication content protocol as illustrated in the accompanying drawings. The inventions may, however, be embodied in many different forms and should not be construed as limited to the embodiments set forth herein; rather, these embodiments are intended to convey the scope of the inventions to those skilled in the art. Furthermore, all "examples" given herein are intended to be non-limiting.

1.0 DEFINITIONS/GLOSSARY

Prior to a detailed description of the invention(s) and aspects thereof, the following definitions are provided as an aid to understanding the subject matter and terminology of aspects of the present invention(s), are exemplary, and not necessarily limiting of the invention(s), which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended.

Account. a database entity that represents a single customer or provider.

Account service. a service that has been purchased by an account.

ASIC (Application Specific Integrated Circuit): an integrated circuit customized for a particular use. Early VoIP used ASICs and other hardware for digital signal processing, specifically constructed for processing voice.

Caching: a scheme whereby a copy of critical data that is accessed frequently is kept in a location that allows high-speed access to it, while maintaining synchronization between this copy of the data and the underlying slower source.

Call: A call is typically a phone call, usually handled by a number of devices.

Call group: a telephony feature whereby calling a number results in ringing several phones simultaneously thus increasing the chances that the call will be answered.

CCXML (Call Control eXtensible Markup Language): provides declarative markup to describe telephony call control. CCXML is a language that is based on XML and ECMAscript, and can be used with a voice user interface dialog specification language such as VoiceXML.

CCXML document: a collection of information and computer commands contained in a file in the known CCXML format.

CCXML interpreter: a computer-implemented process or computer program that parses, operates upon, and executes the functions of a CCXML document.

CCXML properties document: a CCXML document that provides information (variable values and other information) for creating a specific instance of an associated component (e.g. a device, a kit) that is represented by CCXML.

Child device: The device following the current device in the chain of processing a call. The child device has been launched by the current device.

Cloud: a system environment to which access is provided over the internet that allows developers to deploy their applications to this environment without concern for the routine management, upkeep, uptime and capacity planning and growth of the infrastructure.

Computer executable document. Self contained file or other unit that can be processed by a computer to extract its components and operations, and can include logic, scripts, pointers to other information, configuration parameters, variables, etc. The logic and resources are common to a particular telephony function.

Configurable software-implemented telephony device, also device: A device is specified by a CCXML document and a set of properties. It contains logic, properties, and resources, and performs a telephony function through software.

Connection: a specific instance of a "lifetime" of a communication between two particular identified communicating elements, for example, a call between two telephones, a single call into a conference call that includes multiple telephones, the time during which a "message recorder" component is storing signals represented a saved voice message, etc. A connection almost invariably has a lifetime shorter than that of a session, as a session is required to "hold together" the various resources (e.g. devices, memory allocations, etc.) required to make a connection. A connection is necessarily associated with a session, but a connection can be transferred or handed off to a different session. The variable connectionid is used in the disclosed embodiments to represent and reflect a connection.

Customer: a consumer of the services provided by the disclosed embodiments. The consumer may be a multi-user business made up of many individual end-users or a single-user entity. Each customer is represented by an Account in the database.

Database: a repository of information which provides means to retrieve, find, update, delete, backup and copy such information using standard languages, such as Structured Query Language or SQL.

Device CCXML logic document: a CCXML document that provides the core functionality (computer program instructions in the CCXML format) of a particular component in the disclosed embodiments, such as a device or a kit. A device CCXML logic document does not contain specific parameters for an instance of a device or a kit. A specific instance of a device or a kit is created (instantiated) when the data of a particular CCXML properties document—typically but not necessarily associated with a particular account or a particular customer or a particular service provider—is processed by a CCXML interpreter and "combined" with the functionality of the device CCXML logic document, becomes a particular instance of the device.

Device: See configurable software-implemented telephony device. An instance of a Device Type on behalf of an Account. Identified by Device-GUID.

Device kit: A collection of device instances that together fulfill the functionality of a purchased Account-Service. Identified by Device_Kit_ID.

Device Kit Type: Device types that are commonly used together are bundled together to serve a common more complex function. Identified by Device_Kit_Type_ID.

Device type: A definition or template for the device. Devices are instances of device types. Identified by Device_Type_ID.

GUID (Globally Unique Identifier): an identifier that is designed to be universally unique, used to identify a specific object instance in the system (in the case of the disclosed embodiment, the device).

HDAP (Hosted Device Applications Platform): A component based environment that promotes rapid reuse for VoiceXML and CCXML compliant applications that have been built using the framework.

HDAP server: a server on which a copy each of the voice server and the application server are deployed and executing.

Load balancing: a technique to spread work between two or more computers, network links, CPUs, hard drives, or other resources, in order to get optimal resource utilization, throughput, or response time.

Media file: A resource managed by HDAP that is used in the execution of a device. A media file is typically an audio file, but may also be an image file or a video file.

Memcache: a general-purpose distributed memory caching system, that is often used to speed up dynamic database-driven websites by caching data and objects in memory to reduce the number of times the database must be read. A giant hash table is distributed across multiple machines, and when full, subsequent inserts cause older data to be purged in least recently used order.

Parent device: The device immediately prior to the current device in the chain of processing a call.

PBX (Private Branch Exchange): A telephone exchange that serves a particular location, business, or office, as opposed to one operated by a common carrier or telephone company for many locations (general public). PBXs connect internal telephones of a private organization and also connect them to the PSTN.

Provider: An organization that sells VoIP services to its customers and uses the system described by the disclosed embodiments to provide those services. A single instance of the system described by the disclosed embodiments can include many providers. Each provider has an account of their own, under which are the accounts of its customers. The database can hold a hierarchy of providers. Providers may be White Labelers (ones who hide the name of original operator of the system, and brand the product under their own name) and Resellers (who sell the product under the name of the original operator of the system. Provisioning Server: A server from which an IP phone can remotely download the configuration that it needs to connect to a VoIP system and make and receive calls.

PSTN (Public Switched Telephone Network): The PSTN is the network for the world's public circuit-switched telephone networks. These systems predate VoIP systems.

RTP (Real-time Transport Protocol): A standardized packet format for delivering audio and video over the Internet.

Root CCXML document: a CCXML document that provides the core functionality (computer program instructions in the CCXML format) of a particular component in the disclosed embodiments, such as a device or a kit. A root CCXML document does not contain specific parameters for an instance of a device or a kit. A specific instance of a device or a kit is created (instantiated) when the data of a particular CCXML properties document—typically but not necessarily associated with a particular account or a particular customer or a particular service provider—is processed by a CCXML interpreter and "combined" with the functionality of the root CCXML document, be become a particular instance of the device.

Service: A product feature or set of features provided by devices, that can be purchased, provisioned and consumed. Services are purchased by customers, and customers are billed for the Services that they have purchased. Identified in the database by Service-Id.

Service provider: see Provider.

Session: a specific instance of a "lifetime" of particular components of the system, identified during processing by a session identifier. The variable sessionid is used in the disclosed embodiments to represent and reflect a session. Once a session is ended, by natural expiration or termination, the resources associated with that session are released by the system's operating system or controller. A session can "live" before and after any associated active connections, or no connections at all. Termination of a session necessarily ends any associated connections.

Session border controller: a device used in VoIP networks to exert control over the signaling and usually also the media streams involved in setting up, conducting and tearing down calls. SBCs are inserted into the signaling and/or media paths between the calling party and the called party in a VoIP call.

SIP (Session Initiation Protocol): a signaling protocol, widely used for setting up and tearing down multimedia communication sessions such as voice and video calls over the Internet. Other uses include video conferencing, streaming multimedia distribution and instant messaging.

Telephone: a telecommunications device that is used to transmit and receive sound (voice).

Telephony: the use of equipment to provide voice communication over distances, specifically via connecting telephones together.

UDP (User Datagram Protocol): sometimes called the Universal Datagram Protocol, is one of the core protocols of the Internet Protocol Suite, allowing programs on networked computers to send short messages or datagrams to one another. UDP does not guarantee reliability or ordering, and datagrams may arrive out of order, appear duplicated, or go missing without notice. Any reliability checks of the transmitted information is performed in upper layers. Common network application that use UDP include, the Domain Name System (DNS) and streaming media applications such as IPTV, VoIP, TFTP and online games.

URI (Uniform Resource Identifier): a compact string of characters used to identify or name a resource on the Internet or on an IP network.

Vocal OS: the name of a voice server that includes a SIP stack, CCXML interpreter, a VoiceXML interpreter, media handling capabilities, ability to interface with text to speech and speech recognition systems.

VoIP (Voice over Internet Protocol: a protocol optimized for transmission of voice through the Internet or other packet-switched networks. VoIP is often used abstractly to refer to the actual transmission of voice rather than the protocol that implements the voice transmission.

2.0 TELEPHONY DEVICE OVERVIEW

A hosted voice application for providing telephony functionality can be viewed as a group of devices connected to serve the same purpose as the hosted application. A call would then be passed from one device to another. Each device individually has enough intelligence to evaluate the call, provide the telephony functionality that is expected of it for the particular nature of the call, and determine the next device destination for the call. This approach also allows end-users to select these devices and place them together in various other ways as desired using, for example, a wysiwyg (what you see is what you get) graphical configurator.

Turning attention to the drawings, FIG. 1 is a diagram of a VoIP system 10 that illustrates the use of configurable software-implemented telephony devices 110 within a hosted device applications platform (HDAP), a device platform 100, to provide telephony functionality. The VoIP system 10 provides telephony functionality from the device platform 100 between customers 20 connected to the Internet 30 and PSTN phones 52 connected to a public switched telephone network (PSTN) 50. The PSTN 50 is connected to the Internet 30 through VoIP/PSTN gateway and/or VoIP trunk providers 40.

The device platform 100 enables rapid reuse for VoiceXML and CCXML compliant applications that have been built using its framework. Each discrete functionality is serviced by a telephony device 110 that is dedicated to that particular type functionality. The device platform 100 connects this group of components together into a specific application. For example, one telephony device 110 could handle recording, another handles switching based on an input for routing a call in a particular fashion, another receives audio, and another sends audio. Of course, much more complicated telephony devices 110 could be used also. Any desired phone functionality can be implemented by some particular collection of these telephony devices 110.

Customers 20 use the Internet 30 to connect to outside telephone systems. At their premises, they typically have IP phones connected to a Local Area Network (LAN), that is connected to the Internet 30 through some combination of routers and firewalls. The IP phones use the Session Initiation Protocol (SIP) for signaling and use the Real-time Transport Protocol (RTP) for audio. IP phones can automatically provision (or configure) themselves by fetching provisioning files through the Internet 30. Various types of IP phones use protocols ranging from FTP (File Transfer Protocol) and TFTP (Trivial File Transfer Protocol) to HTTP (Hypertext Transfer Protocol).

Telephony devices 110 within the device platform 100 may also access subscriber PSTN phones 52 that are connected to the PSTN 50. When a PSTN phone 52 desires to talk to someone on a customer's IP phone, the PSTN provider routes the call to the CLEC (Competitive Local Exchange Carrier) that owns the customer phone number, and in turn the call is routed to a VoIP/PSTN gateway and/or VoIP trunk provider 40.

The PSTN accesses the Internet 30 through VoIP/PSTN gateway and/or VoIP trunk providers 40, that provide either PSTN/VoIP gateway services, SIP trunks or both. Larger providers sometimes have both services. It is not unusual for a VoIP/PSTN gateway provider to also be a CLEC. For purposes of the inventions described herein, it is sufficient that calls from PSTN phones 52 are converted to VoIP external to the device platform 100, and that calls that are received into the device platform 100 arrive as VoIP calls. Similarly, outgoing calls from the device platform 100 use VoIP.

SIP and RTP traffic goes through the Session Border Controllers (SBC) 60. The SBCs 60 perform registration, authentication, routing, NAT (network address translation) traversal, media anchoring, load balancing and prevention of denial of service attacks. Registration keeps track of the IP address and SIP port for each customer phone. Authentication ensures that only authorized phones can send calls from the device platform 100. Routing ensures that calls are sent to the correct providers based on the information (from/to) in the SIP header. NAT traversal handles issues stemming from network address translation at the on-premise router/firewall. Media anchoring provides that for certain types of calls, the audio is anchored at the SBC rather than forwarded to the voice servers 70, thus allowing the calls to pass directly to the other party via the SBC. Load balancing ensures that calls are balanced relatively equally across the available voice servers 70. Prevention of denial of service attacks provides protection against malicious calls or hack attempts through calls, that can overwhelm and/or bring down the system.

Firewalls 62 receive the non-call traffic such as, for example, HTTP from browsers that are being used to configure the phone system, and FTP, TFTP or HTTP from phones retrieving their provisioning files. The firewalls 62 send the HTTP web traffic to the load balancers 64, and send other traffic to the respective destinations.

As noted above, the load balancers 64 receive HTTP web traffic and balance the load across a bank of web application servers 90.

The voice server 70, also referred to as a voice application server, includes functionality provided by different components (which may also be independent modules) including a SIP stack 71, a CCXML interpreter 72, a VoiceXML interpreter 73, a media processor 74 and a TTS/ASR engine 75. The voice server 70 executes the aspects of the device platform 100 that are directly telephony-related.

The SIP stack 71 receives, processes, generates, and sends SIP messages compliant with the W3C SIP standard. To facilitate call control, events are sent to the CCXML interpreter 72.

The CCXML interpreter 72 interprets CCXML documents. CCXML is a W3C draft standard for an XML and ECMAscript based language for exercising call control. CCXML absolves the programmer from dealing with direct protocol level programming and provides a flexible and rapid mechanism for call control, i.e. establishing, joining, unjoining, conferencing, holding, un-holding, transferring, tearing down calls, etc. The CCXML interpreter 72 sends events to the SIP stack 71 based on the directives in the CCXML documents. The CCXML interpreter also maintains and tracks sessions, connections and channels and provides the abstraction layer between CCXML and the communications protocol, in this case SIP.

The VoiceXML interpreter 73 interprets VoiceXML documents and works closely with the CCXML interpreter 72. VoiceXML is another W3C standard for an XML and ECMAscript based language and is used for creating dialogs that control voice user interfaces. VoiceXML dialogs can be used to program complex interactions between an automated phone system and a user by using DTMF digits, speech recognition and text to speech synthesis. VoiceXML enables the developer to program these interactions without the need for the programmer to understand and master the underlying telephone and communications protocols.

The voice server 70 uses the media processor 74 to handle media (RTP audio). The media processor 74 is able to receive and transmit media, as well as mix audio for conferences. The media processor 74 is also capable of handling multiple codecs and converting from one codec to another.

The TTS/ASR engine 75 uses text-to-speech (TTS) synthesis to create automated prompts and greetings, and uses advanced speech recognition (ASR) to recognize speech for user input in the place of DTMF digits. The TTS/ASR engine 75 uses industry standard protocols for processing text-to-speech synthesis and speech recognition. Requests to the TTS/ASR engine 75 originate in VoiceXML documents that are interpreted in the VoiceXML Interpreter 73.

A database 80 holds customer data, device definition data, device configuration data, call usage log data, state information for certain complex types of calls (conferencing, call queues), user permissions data, billing data, and many other configuration parameters that drive and control the behavior of the system. The primary interface into the database 80 is from the application server 90.

The application server 90 is actually a bank of servers that perform several functions including: (1) execution of those aspects of the device platform 100 that are not directly telephony-related, (2) serving the CCXML and VoiceXML documents requested by the CCXML interpreter 72 and VoiceXML interpreter 73, (3) dynamically generating CCXML and VoiceXML documents in response to certain requests, (4) managing access to the database 80 and converting data as appropriate into object-oriented objects or CCXML properties documents as appropriate and (5) serving the web user interface application through which customer users and administrators can configure and manage the phone services offered by the telephony devices 110 in the device platform 100.

The device platform 100 is the engine that enables and supports the telephony device 110 technology by providing the services necessary for telephony devices 110 to exist and execute. The key functions provided for by the device platform include service provisioning, real-time configuration, device lifecycle management, permissions, monitoring/alerting, device caching, loop detection and usage tracking. It should be noted that some functionality of the device platform 100 is executed within the voice server 70, whereas other functionality is executed in the application server 90, and some functionality is executed in both servers.

The service provisioning function of the device platform 100 is performed in the application server 90 and involves the creation of the correct number and type of telephony devices 110 when a customer purchases a new service. Further, the telephony devices 110 need to be initialized with the correct properties and hooked together in the correct manner by default, so that the service is plug-and-play, therefore being useful and usable immediately following the purchase-time provisioning.

The real-time configuration function of the device platform 100 is performed at the application server 90 and refers to the ability provided by the device platform 100 for device properties to be configured "on the fly", a key benefit of the software telephony device architecture. Users and administrators, or developers, can make changes to the configuration through a user interface or Application Programming Interface (API), and these changes take effect immediately, so that on the very next call any changed telephony devices 110 follow the new configuration.

The device lifecycle management function of the device platform 100 refers to the core of device execution. The device platform 100 has the capability to perform:

a. Identification of the next device. This is performed at both the application server 90 and the voice server 70. The next telephony device 110 to be invoked is determined according to the directive of the current telephony device 110, or alternately by a "getroute" API call in response to which the device platform 100 can compute the next telephony device 110 that should get the call.
b. Invocation and instantiation of the next telephony device 110. This is done at both the application server 90 and the voice server 70, and is a multi-step process that involves generating and/or fetching and interpreting the properties CCXML document of the next telephony device 110, establishing the necessary CCXML sessions and handing off the connection with the correct directives and data to the next telephony device 110.
c. Device execution, which is done at the voice server 70. This includes interpretation of the CCXML and VoiceXML documents, processing of the SIP and RTP in accordance with the directive in the device documents, handling errors, logging progress and usage, and exposing monitoring information.
d. State tracking. This is performed at both the application server 90 and the voice server 70. For some telephony devices 110, such as call queue devices and conference devices, the application server and voice server need to exchange state data, and persist it for the length of the call to facilitate both telephony and real-time tracking and reporting requirements.
e. Event handling. This is done at both the application server 90 and the voice server 70 and includes handling of events raised by the SIP stack 71, sending events to the SIP stack 71, sending events to the application server 90, and the application server 90 handling those events with specific API methods and returning appropriate data or documents back to the voice server 70.
f. Destruction. This is performed at both the application server 90 and the voice server 70 and includes termination of device execution, cleanup and post-logging.

The permissions function of the device platform 100 is handled at the application server 90 and includes enforcement of rules on which users can configure and use each telephony device 110.

The monitoring and alerting function of the device platform 100 is handled at the voice server 70 and the application server 90. The device platform 100 tracks the progress of telephony devices 110 and exposes that information from the voice server 70. The application server 90 pulls this information and can display it, and provide alerts accordingly.

The device caching function of the device platform 100 is performed at the voice server 70 and the application server 90. Device logic CCXML documents are parsed, cached and reused. Device properties CCXML documents are generated once, and then used repetitively from cache. Other critical information including device routes and relationships between phone numbers, SIP ID and telephony devices 110 is stored in fast caches. These caches then have to be kept in sync with the master copy of data, usually in the database 80, and this is done by the device platform 100.

The loop detection function of device platform 100 is performed by the voice server 70. Bad device configurations can sometimes lead to loops. The device platform 100 detects such conditions, has configurable thresholds for different kinds of loops, and kills the loop when the thresholds are exceeded. The condition is reported via an automated email to the system administrator.

The usage tracking function of the device platform 100 is performed by the voice server 70 and the application server 90. The device platform 100 (at the CCXML level) emits critical log information, that is sent to the application server 70, which collates and processes these logs according to complex logic rules to track and bill usage.

Telephony devices 110 are written by device developers and deployed on the device platform much like Java code is written and deployed into a Java Virtual Machine. A telephony device 110 typically comprises many discrete elements as shown in FIG. 1 and as further explained in detail in FIG. 6. Telephony devices 110 work with each other to process calls. The device developer does not need to know how the device platform 100 is built, but rather just needs to know what the telephony device 110 is desired to do. Telephony devices 110 are discussed in further detail below.

The device platform 100 provides an environment where a software-implemented configurable telephony device 110 performs a particular function over and over, regardless of the context, and thus where different telephony devices 110 can be configured in multiple ways and used together or separately for any conceivable telephony functionality.

For example, a filter device is provided with certain rules, and then accepts or reject calls according to those rules. Additionally, it can be configured to drop the call or forward the call to another device. A filter device would be useful for enabling/disabling call recording, enabling a supervisor to listen in on a call to a call center agent, or to route all international calls to a special call center in a different time zone. Rather than recreating these functions in different places, a single telephony device 110 can be configured to do different things at different times and can be placed in the path of the call through software configurable connections.

Based on this paradigm, the basic reusable building block component of any voice application running on the device platform 100 is a (software) device. A simple telephony device 110 performs an atomic function that is essentially the same regardless of the context in which it is invoked. An example of a simple telephony device 110 might be a voicemail device that (in its default configuration) plays a greeting, records the message and notifies the voicemail owner that messages are waiting. Runtime property values can be used to influence specific actions of a device instance. So, for example, each person using the voicemail device may play a different greeting. Other examples of basic devices are a SIP handset device, a PSTN device, a switch device, etc. Examples of more complex devices are a PBX and an auto attendant. Device Kits are groups of telephony devices 110 made up of other simple or complex devices. For example, an extension device kit may be made up of a follow me device, a SIP handset device, a PSTN device and an answering machine device. Telephony devices 110 are hooked up together much like they would be if they were physical devices that make up an office phone network. A diagram showing the logical connection between telephony devices 110 is a configuration graph.

According to aspects of the described inventions, the best mode currently contemplated for implementing certain functions described herein is CCXML, the Call Control eXtensible Markup Language. CCXML provides declarative markup to describe telephony call control. CCXML is a language that can be used with a dialog system such as VoiceXML. Details of CCXML and its implementation are provided by W3C® (World Wide Web Consortium)(http://www.w3c.org), and can be found at http://www.w3.org/TR/ccxml/, the contents of which are incorporated herein by reference and made a part hereof.

As will be known to those skilled in the art, CCXML can be employed to provide a complete telephony service application, comprised of Web server CGI compliant application logic, one or more CCXML documents to declare and perform call control actions, and to control one or more dialog applications that perform user media interactions. CCXML, as expressed in CCXML documents that are executed by a CCXML interpreter, is utilized in the disclosed embodiments and aspects to store, locate, and implement root device types, devices, kits types, kits, and instances of such root device types, devices, kits types, kits, as well as properties of such items.

Also as will be known to those skilled in the art, CCXML documents contain scripts for executing specific computational and control functions (namely, via the known ECMAScript), variable definitions, specific values for variables in accordance with the definitions, handles events that occur during the operations of the function. The main aspects of a CCXML implementation include: (a) event processing, (b) scripting (logic and control), (c) maintenance of a life cycle of a session or connection, (d) definitions of variables, expressions, and other data required to provide the function, and (e) if provided, signal processing functions such as conferencing, bridging, filtering, setting up and breaking down connections, etc.

Figure 2:
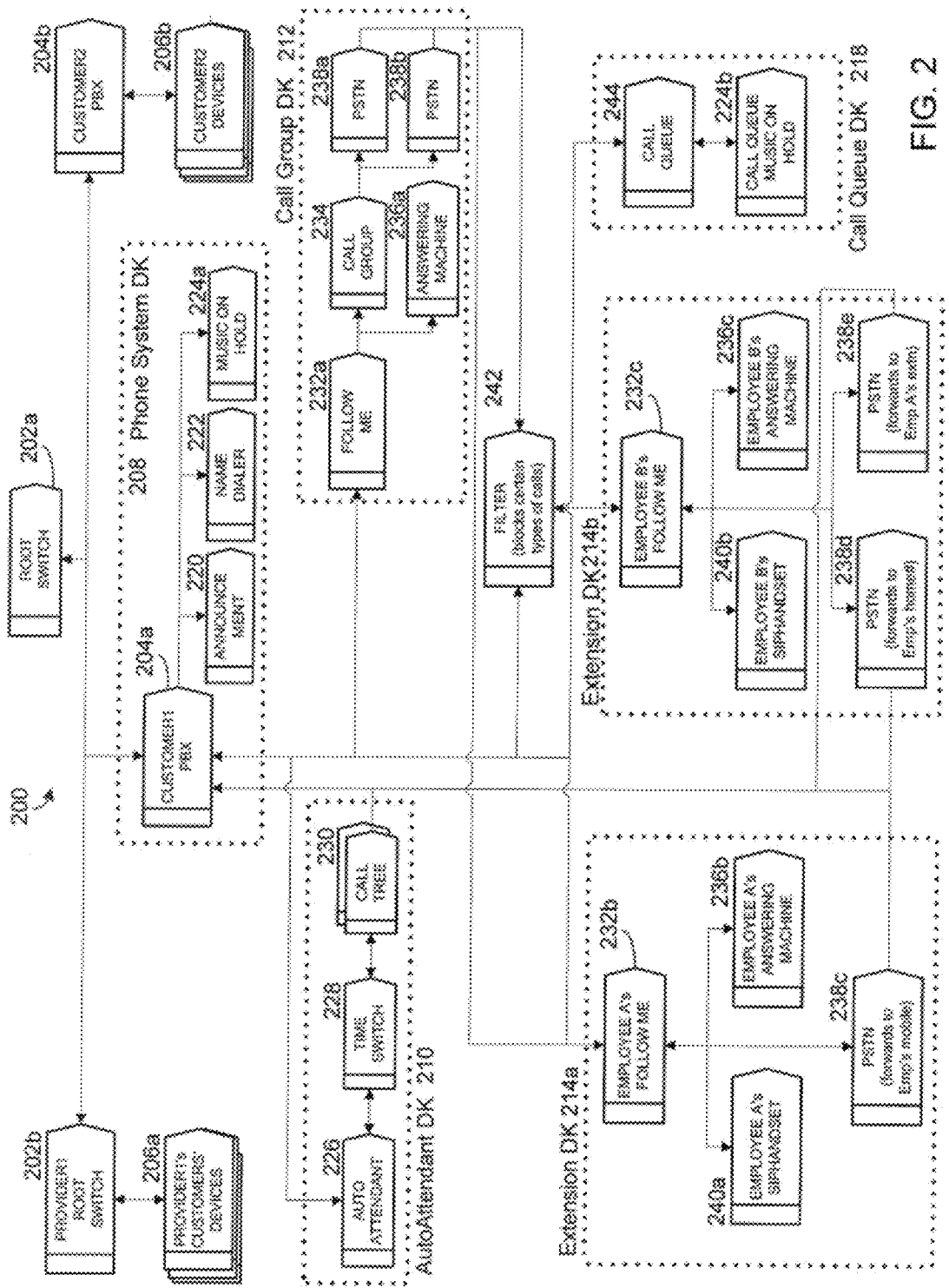
FIG. 2 is an exemplary configuration graph illustrating how logical connections between telephony devices as in FIG. 1 are used to achieve advanced telephony functionality.

FIG. 2 is an exemplary configuration graph 200 illustrating the logical connection between the telephony devices in FIG. 1. It should be noted that each small box (with two vertical lines on the left and an angled right side) is a software telephony device 110. The dotted box that surrounds a group of devices represents a device kit, which is a group of devices that are often used together for a common complex function. The purpose of configuration graph 200 is to show, through a sample configuration, how the functionality of a telephony system can be divided and conquered through the use of devices. Lines running from one device to another represent device connections. The existence of a device connection between two devices implies that under some circumstance a call can be passed from one device to the other. It does not mean that every call will pass through that connection. Whether a call traverses a device connection in the graph or not depends on the logic of the device, parameters of the call and the properties of the parent device. The arrow head on the connection line indicates which direction the call can be passed in. In some cases, devices may be connected together with bi-directional connections, which means that either device can pass a call to the other. It is important to note that unlike in a hardware telephony system, or even a less flexible software telephony system, connections are not hardwired and unchanging. In the disclosed embodiments herein a device connection is nothing more than a property, of type device connection. In other words, a connection is a configuration parameter of the source device and the value of the parameter is the Device GUID of the target device. It can be very easily changed, as easily as changing data in a database, to point the connection to a different device or remove it altogether. Thus, once the devices have been created and configured, it is very easy and quick to change the configuration graph and create new routes and functionalities, and therein lies the power of the device architecture.

The configuration graph has the appearance of a hierarchy or an inverted tree. At the root of the tree is the root switch 202a. The root switch 202a is responsible for making calls to destinations outside the system, as well as routing inbound calls to the right next device. The root switch is directly connected to one of two kinds of devices—either provider root switches such as root switch 202b, or PBX devices of direct customers such as PBX 204a. The PBX device 204a usually is the entry point into the phone system device kit 208, and is usually accompanied by an announcement device 220 (that can play recordings), a name dialer 222 that can list the names of all the users within the PBX and allow them to be reached by extension number of phone menu option, and a music on hold device 224a that plays the chosen audio file that the customer has chosen for their hold music for their company's phone system. All calls into customer 1 go through the customer 1 PBX device 204a, and likewise all calls into customer 2 go through the customer 2 PBX device 204b. The focus of configuration graph 200 is customer 1, so the only third level of devices shown are the ones for customer 1, but it should be noted that provider 1 root switch 202b and customer 2 PBX 204b will normally have a number of similar devices underneath them in the tree as well.

A PBX device is usually connected directly to other devices that have an extension number. Accordingly, customer 1 PBX 204a is shown to be connected to an auto attendant device kit 210, to a call group device kit 212, to an extension device kit 214b, a call queue device kit 218, and through a filter 242, to another extension device kit 214b. When a call comes into the PBX device 204a from the root switch 202a, the PBX 204a looks first to see if the dialed digits match any of the extension numbers known to it. If so, the PBX 204a routes the call to the device that the extension number points to. If there is no match, then the PBX device 204a makes a getroute call to the application server, passing the dialed digits. The application server returns a route to the number in the form of a list of devices to traverse. The PBX 204a hands the call off to the first device in the list.

The auto attendant device kit 210 is made of an auto attendant device 226, a time switch device 228 and a call tree device 230. The detailed functions performed by these are illustrated further in FIG. 3 configuration graph 300, but in summary, an auto attendant answers a call, plays a phone menu, takes user input and routes the call based on the input.

The call group device kit 212 has a follow me device 232a at its entry point. The follow me device 232a first sends the call to the call group device 234 next to it, and if there is no answer then moves on to the answering machine device 236a. The call group device 234 in turn is connected to two PSTN devices 238a, 238b that it calls simultaneously. One of the PSTN devices 238a is connected to extension device kit 214 and the other through a filter 242 to extension device kit 214b. These are the two extensions that will be rung if a call reaches the call group 234.

Note that the two extension device kits 214a, 214b are not identical. Extension device kit 214a is configured to received calls into the follow me device 232b which in turn will first try a SIP handset device 240a (which will ring employee A's desk phone), and if no answer, then call a PSTN device 238c which routes back to the customer 1 PBX 204a to make an outbound call to a cell phone. If there is no answer from the cell phone within a certain amount of time, then the follow me 232b sends the call to the answering machine 236b.

Extension device kit 214b is configured slightly differently. It will receive calls into its follow me device 232c which in turn will first try a SIP handset device 204b (which will ring employee B's desk phone), and if no answer, then call a PSTN device 238d which routes back to the customer 1 PBX 204a to make an outbound call to employee B's home phone. If there is no answer from the home phone, then the follow me device 232c will send the call to the next PSTN device 238e (which forwards to employee A's follow me 232b through PBX 204a) within a certain amount of time. Still if there is no answer, then the follow me device 232c sends the call to the answering machine device 236c. This example shows how the same device kit type (extension in this case) can be configured differently with different numbers of devices within to serve slightly different functionality.

All calls to extension device kit 214*b* pass through the filter 242. The filter device 242 evaluates each call against its set of configured rules (such as block international outbound, or block all inbound calls) and decides whether to let the call through or not.

The call queue device kit 218 is made of two devices, call queue device 244 and call queue music on hold 224*b*. When a call comes into the call queue device 244, it determines if any agents assigned to the queue are logged in, and is so are they available. If so, it sends the call to the first available agent based on the chosen algorithm, if not it connects the caller to the call queue music on hold device 224*b*. It then keeps checking for available agents, and as soon as one becomes available, it moves the call to the available extension through the PBX 204*a*.

Note that at a given moment in time, any number of calls can be going on through this configuration graph, and indeed through any one device. For each call going through a device, a separate copy of the device executes. Generally speaking, all upstream (parent) devices stay running while the call is being processed by downstream devices, until the call ends. In most cases, upstream devices do not do anything active after passing the call, but in some cases they might do some tasks such as in the call queue device 244 case where it continues to look for available agents.

The power of the configuration graph 200 is not the specific configuration that is depicts but the flexibility that it represents and illustrates.

Figure 3:
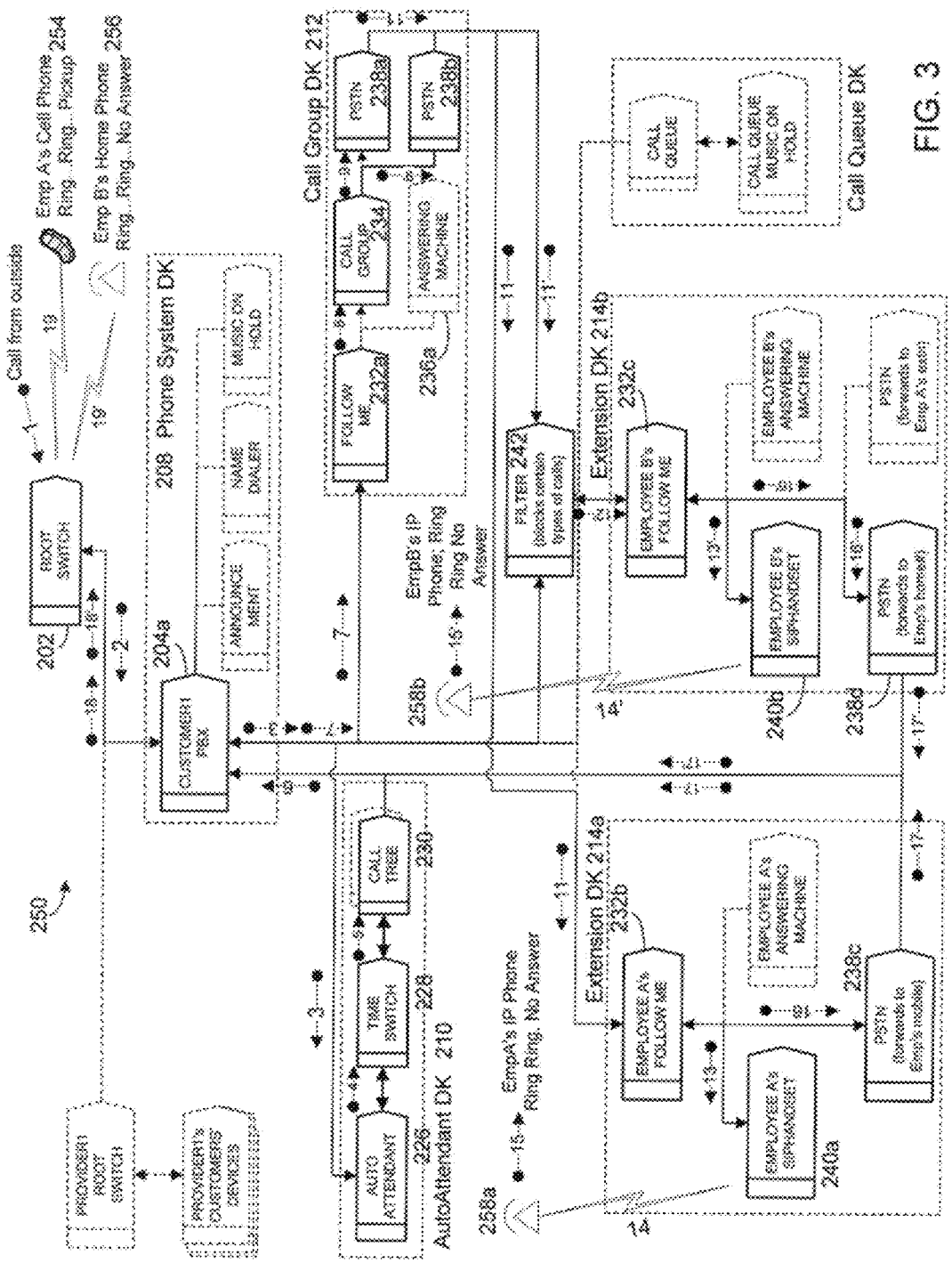
FIG. 3 illustrates an exemplary path through the configuration graph of FIG. 2 for an inbound call into a call group through an automatic attendant that then rings multiple phones until the call is answered.

FIG. 3 is an exemplary configuration graph 250 for illustrating inbound calls that are processed by telephony devices and directed to agent phones. Configuration graph 250 depicts a specific call scenario making use of the configuration graph 200 in FIG. 2. The numbered arrows indicate steps in the flow of the inbound call as it is processed by the various telephony devices. It should be noted that the numbered arrows apply only to this particular exemplary configuration graph 250 and do not carry over to any subsequent exemplary configuration graphs. As noted above, the various telephony devices shown in the configuration graph 250 are explained in further detail in section 3.0 below. A brief summary of the process is presented first and is followed by a slightly more detailed high level explanation of the call processing by the various telephony devices. As also noted above, each telephony device illustrated in the configuration graph 250 is individually configurable so that VoIP systems may be configured in innumerable different combinations.

A call is received from an outside system for a phone number associated with an auto attendant 226 for customer 1. The auto attendant 226 answers the call and plays a phone menu for the caller. The phone menu is dependant upon the time of day and provides messages such as "Thank you for calling Acme Computers. For sales press one, for support press two, . . . ," and the like.

After the caller makes a choice, pressing phone button one for example, the call is transferred to a sales call group. A sales call group is a telephony function that simultaneously rings all phone extensions in the sales call group. The first to answer is connected to the caller, and the remaining extensions stop ringing. In this instance, the sales group has two members, employee A and employee B, that are associated with sales.

Employee A has follow me functionality set to prioritize the ringing of various phones. Employee A's office IP desk phone is to ring first, followed by their mobile phone, and then their answering machine. Similarly, employee B has follow me functionality set to ring their office IP desk phone first, followed by their home phone, followed by employee A's office IP desk phone, and finally to employee B's answering machine. The time allowed for each phone to be answered before ringing the next phone is configurable and may be different for each phone.

Additionally, a filter is set up to block certain kinds of calls for employee B. The filter might be set up to prevent employee B from making international calls and also from receiving calls from toll free numbers.

Further details of the configuration graph 250 show that the outside calls are received from an external source by the root switch 202 at step 1. The outside call is received from a phone that is not known to the system, and may, for example, be received from a home phone, a business phone, a cell phone, an IP phone, PSTN phone or any other type telephone.

At step 2, the root switch 202 performs a route lookup based on the destination phone number and determines that the phone number is owned in the system by customer 1. The call is then routed to a PBX device 204*a* for customer 1.

Next at step 3, it is determined that the phone number does not match an extension number known to the customer 1 PBX device 204*a*. The PBX device 204*a* performs a route table lookup on the destination phone number and determines that the phone number is owned within its account by an auto attendant device 226 within an auto attendant device kit 210. The call is then routed to the auto attendant device 226. A device kit is a grouping of multiple telephony devices that are often used together for a common complex function. The auto attendant device kit 210 includes the auto attendant device 226, a time switch device 228 and a call tree device 230.

At step 4, the auto attendant device 226 determines that there are time of day related rules to be followed for this call, and the call is sent to a time switch device 228.

At step 5, the time switch device 228 determines that for the current time slot, the call needs to be sent to a specific call tree device 230. An example would be if a customer has one phone menu for business hours, a second phone menu for non-business hours, and a third phone menu for holiday periods. A time switch device 228 routes calls to different devices according to time considerations.

The call tree device 230 that services the particular time period receives the call and plays a phone menu message to the caller at step 6. An example phone menu message might be: "Thank you for calling Acme Computers. For sales press 1, for support press 2, . . . " In actuality, the call tree device 230 uses an announcement device (not shown in FIG. 3) to play the message. After playing the phone menu message, the call tree device 230 waits for a response input from the caller. After receiving the caller response input (i.e., caller presses key one on their phone for sales), the call tree device's properties indicate that for this response, the call goes to a particular extension. (The extension in this example applies to the sales call group, however, the call tree does not and need not know this particular information.) The call tree device 230 sends the call back to the customer 1 PBX device 204*a*, with the particular extension number corresponding to option one from the phone menu's properties.

The customer 1 PBX device 204*a* performs a lookup from its extension routing table to find the device GUID of the device that owns the received extension number. The call is then sent to that device at step 7. As far as the PBX device 204*a* is concerned the call is routed to an extension, while in actuality the extension number applies to a call group device kit 212. Again, the PBX device 204*a* does not and need not know that it is a call group device kit 212 rather than an actual extension.

The call group device kit 212 includes a follow me device 232a (entry point device), a call group device 234, an answering machine device 236a, and PSTN devices 238a, 238b. A call is received by the follow me device 232a, and is first sent to the call group device 234 at step 8. Optionally, and based upon configuration, an unanswered call may be sent to the local answering machine device 236a of the call group rather than to an answering machine corresponding to one of the member extensions.

The remaining steps in FIGS. 3, 9-19 and 9'-19' are executed in two parallel threads of execution that do not depend on, nor wait on, the other thread. Steps in the first thread are numbered normally, while steps in the second thread are numbered with a prime (') indicator. It is not necessary—unless specifically indicated—that a step number with no prime indicator and the same step number with a prime indicator occur at the same exact moment in time. The timing depends on the number and length of execution of each of the preceding steps for each thread of execution. Each pair of steps below is described together merely for convenience and do not represent concurrent timing. Of course, it will be apparent to those of skill in the art that many and different additional threads, both concurrent and not could also be included in this configuration graph 250.

The call group device 234 performs a look up on its extensions property to determine which device or devices are to ring simultaneously for the call. It should be noted that a call group device 234 can ring the extensions in the same account, but also any other number, including outside numbers. PSTN devices are used to send calls to extensions and also to outside numbers. Thus, the call group extensions property has a list of PSTN device GUIDs. In this example, the call group device 234 initiates simultaneous calls at step 9 to PSTN device 238a (corresponding to employee A), and at step 9' to PSTN device 238b (corresponding to employee B), each of which are listed in its extensions property. Of course, if there were more PSTN devices listed in the extensions property, each would also be called.

Step 10 is intentionally removed.

Each of the PSTN devices 238a, 238b has an outbound device property denoting what next device to send the call to. If the phone number to be forwarded is a DID, the outbound device is the PBX device 204a, whereas if the phone number is an extension number, the outbound device is the extension's follow me device or filter device. One PSTN device 238a is configured to send its calls to employee A's follow me device 232b at step 11. The other PSTN device 238b is configured to send its calls to a filter 242 ahead of employee B's follow me device 232c.

The filter 242 corresponding to employee B, evaluates its rules for handling calls at step 12' and determines that this call should not be blocked. The call is then sent to employee B's follow me device 232c. Filters are typically used to block certain kinds of calls, for example to prevent employee B in this instance from making and/or receiving certain kinds of calls.

A follow me device typically has a list of telephony devices to be tried in sequence with a configurable amount of time between each, and after which it moves on to try the next telephony device in the chain until a telephony device answers. In this example, both employee A and employee B have set their follow me devices 232b, 232c to first attempt to ring their IP desk phone 252a, 252b at their respective desk. Employee A's follow me device 232b sends its call to the SIP handset 240a at step 13. Employee B's follow me device 232c sends its call to the SIP handset 240b at step 13'. It should be noted again, that these are independent actions and can happen at slightly different times for each of the follow me devices.

At step 14, upon receiving a call, employee A's SIP handset device 240a makes a call (sending an SIP INVITE message) to its corresponding SIP phone device 258a identified by the device ID property. The invite is actually sent to a session border controller (not shown) which knows the IP address for each phone when given the Device ID (also called the SIP ID). The Device ID is not to be confused with the GUIDs that identify the software-implemented configurable telephony device 110 disclosed in the present invention. Similarly, at step 14', upon receiving a call, employee B's SIP handset device 240b makes a call to its corresponding SIP phone device 258b.

At step 15, the IP desk phone 252a at employee A's desk rings. Employee A is not at the desk and the phone is not answered. After the configured delay, the follow me device 232b cancels the ringing. Similarly, at step 15', employee B's IP desk phone 252b rings, is not answered, and the follow me device 232c cancels the ringing after the configured delay.

Employee A's follow me device 232b then sends the call to the next device in its list. Employee A has set his follow me device 232b to forward the call to a mobile phone upon no answer at his/her desk. Since a mobile phone is an outside number, the call is sent to a PSTN device 238c at step 16. Similarly, employee B's follow me device 232c is set to forward the call to his home phone number, again an outside number, and the call is sent to a PSTN device 238d at step 16'.

A PSTN device uses the account's PBS to forward calls to outside numbers. At step 17, employee A's PSTN device 238c sends the call to the customer 1 PBX device 204a along with the phone number. Similarly, at step 17', employee B's PSTN device 238d sends its call to the PBX device 204a along with the phone number. It should be noted that these are two separate calls, and further that each PSTN device 238c, 238d creates its own copy of the PBX device 204a and hands off the call its respective instance.

Each independent instance of the PBX device 204a receives a call, then looks up the destination number (a 10-digit DID) in its extension routing table. Since the numbers are not extension numbers, no match is found. Each PBX device 204a instance makes a request to the application server to retrieve a route for the call (the phone number is passed with the request). Upon determining that the phone number is not known and is therefore an outside number, the application server returns a message indicating that the route failed, i.e., it does not have and cannot determine a route for the call. Each PBX device 204a has no way to route the call within the system, so the call is sent to its outbound device, the root switch 202 at step 18 for employee A and at step 18' for employee B. It should be noted again that these are two separate device instance copies of the PBX device 204a performing this logic independently of the other. If there were ten employees with similar configurations, then there would be ten copies of the PBX device 204a that would execute whenever the respective calls reach the PBX.

Upon receiving the call, the root switch 202 also attempts to acquire a route for the call with the received number, and also concludes that the call is for an outside number, and then sends an INVITE to the phone number in the outside world (outside the system) through the session border controller (not shown). The session border controller sends the call to a SIP trunk provider, having access to a CLEC for resolving the number to the final destination, employee A's cell phone 254. Similarly, the other call is routed to employee B's home phone 256. Since these are two separate calls, both phones ring. Whichever of employee A and employee B first answers is connected to the caller. Assuming that employee A answers first, the call is established, caller and employee A are connected, and media (audio in this instance) being flowing in both directions.

Since the caller is connected to employee A, the call group device 234 sends a message to terminate the other call that is in process of trying to be established (if employee B answers). A CANCEL SIP message is sent through the session border controller to the VoIP provider that passes on the equivalent signal to employee B's home phone, and employee B's home phone stops ringing.

Figure 4:
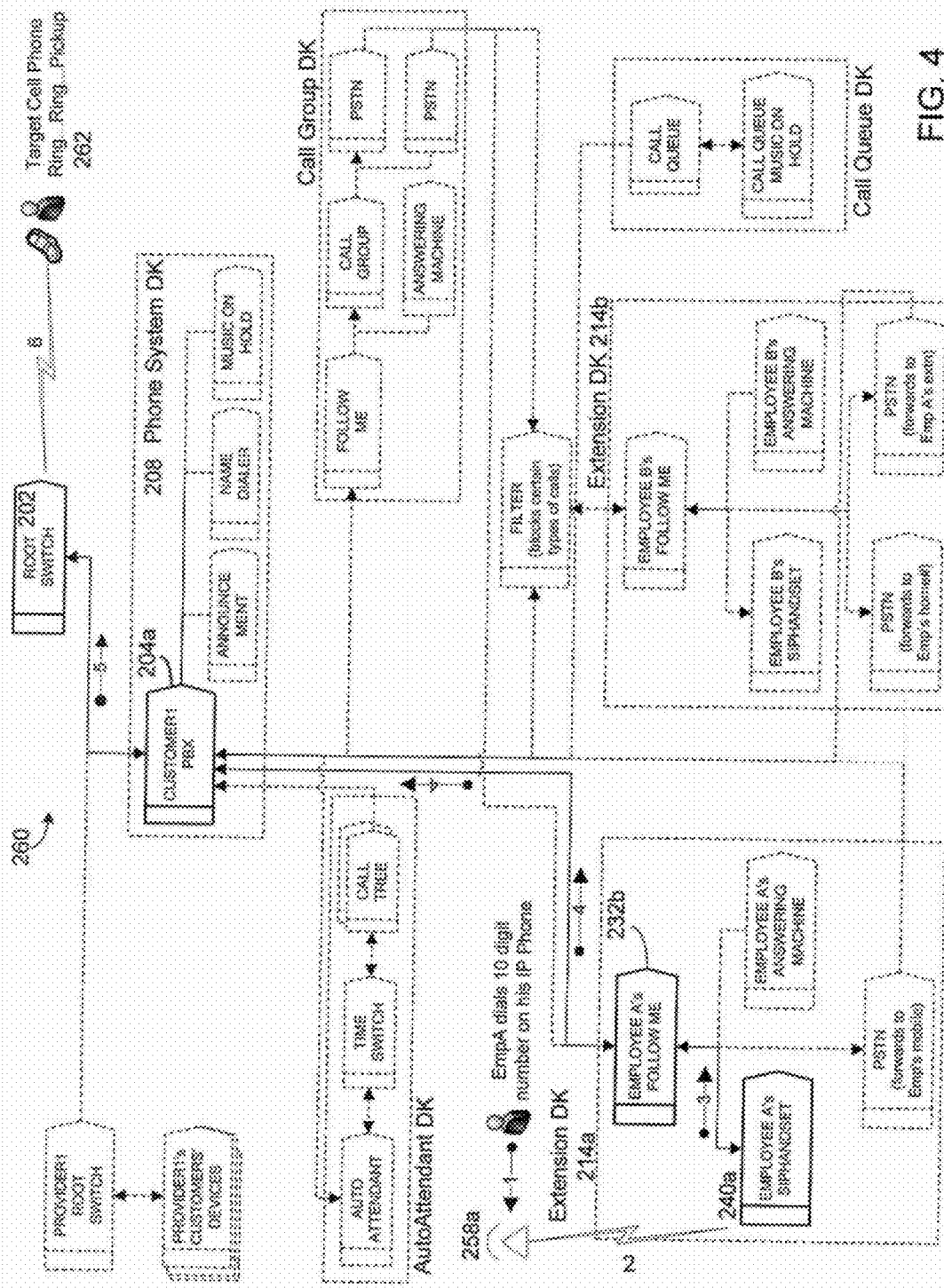
FIG. 4 illustrates an exemplary path through the configuration graph of FIG. 2 for a call from an extension out to a PSTN destination.

FIG. 4 is an exemplary configuration graph 260 for illustrating an outbound call from an extension. Configuration graph 260 is a specific instance making use of the configuration graph 200 in FIG. 2. As above, the numbered arrows indicate steps in the flow of the outbound call as it is processed by the various telephony devices. It should be noted that the numbered arrows apply only to this particular exemplary configuration graph 260 and do not carry over to any previous or subsequent exemplary configuration graphs. As noted above, the various telephony devices shown in the configuration graph 260 are explained in further detail in section 3.0 below. A brief summary of the process is presented first and is followed by a slightly more detailed high level explanation of the call processing by the various telephony devices. As also noted above, each telephony device illustrated in the configuration graph 260 is individually configurable so that VoIP systems may be configured in innumerable different combinations.

The call processing is initiated when employee A picks up his IP phone handset and enters a 10-digit phone number. Employee A hears ringback to indicate that the call is being processed and that the outside phone is ringing. The target phone rings and the cell phone subscriber answers the call, whereupon employee A and the cell phone subscriber begin to talk.

Further details of the configuration graph 260 show that employee A initiates a call process by dialing a 10-digit phone number on the IP desk phone 252*a* at step 1.

At step 2, the call comes in from the handset and is detected as such (by the system) due to the presence of the known SIP ID in the 'from' field of the SIP message header. The SIP ID is passed to the application server to obtain the device GUID of the SIP handset device 240*a* which represents this phone in the system. The SIP handset device 240*a* is then invoked.

The SIP handset device 240*a* determines that this is an outbound call and hands off the call to the device identified by its outbound call property at step 3. The outbound call device is a follow me device 232*b* within the extension device kit 214 that includes the SIP handset device 240*a*. Again, it should be noted that when a device hands off a call to another device, the first device does not know and does not need to know the type of the second device. Thus, the call (connection) is sent to the follow me device 232*b*.

At step 4, the follow me device 232*b* determines that the call is an outbound call and sends the call to the device specified in its out device property, the PBX device 204*a* of the account in which the follow me 232*b* is a part. Thus, the call is sent to the customer 1 PBX device 204*a*.

The PBX device 204*a* receives a call, then looks up the destination number (a 10-digit DID) in its extension routing table. Since the numbers are not extension numbers, no match is found. The PBX device 204*a* makes a request to the application server to retrieve a route for the call (the phone number is passed with the request). Upon determining that the phone number is not known and is therefore an outside number, the application server returns a message indicating that the route failed, i.e., it does not have and cannot determine a route for the call. The PBX device 204*a* has no way to route the call within the system, so the call is sent to its outbound device, the root switch 202 at step 5.

Upon receiving the call, the root switch 202 also attempts to acquire a route for the call with the received number, concludes also that the call is for an outside number, and then sends an INVITE to the phone number in the outside world (outside the system) through the session border controller (not shown). The session border controller sends the call to an SIP trunk provider, having access to a CLEC for resolving the number to the final destination, target cell phone 262. The phone rings and the cell phone user answers the call. The call is established, employee A and the cell phone user are connected, and media (audio in this instance) being flowing in both directions.

Figure 5:
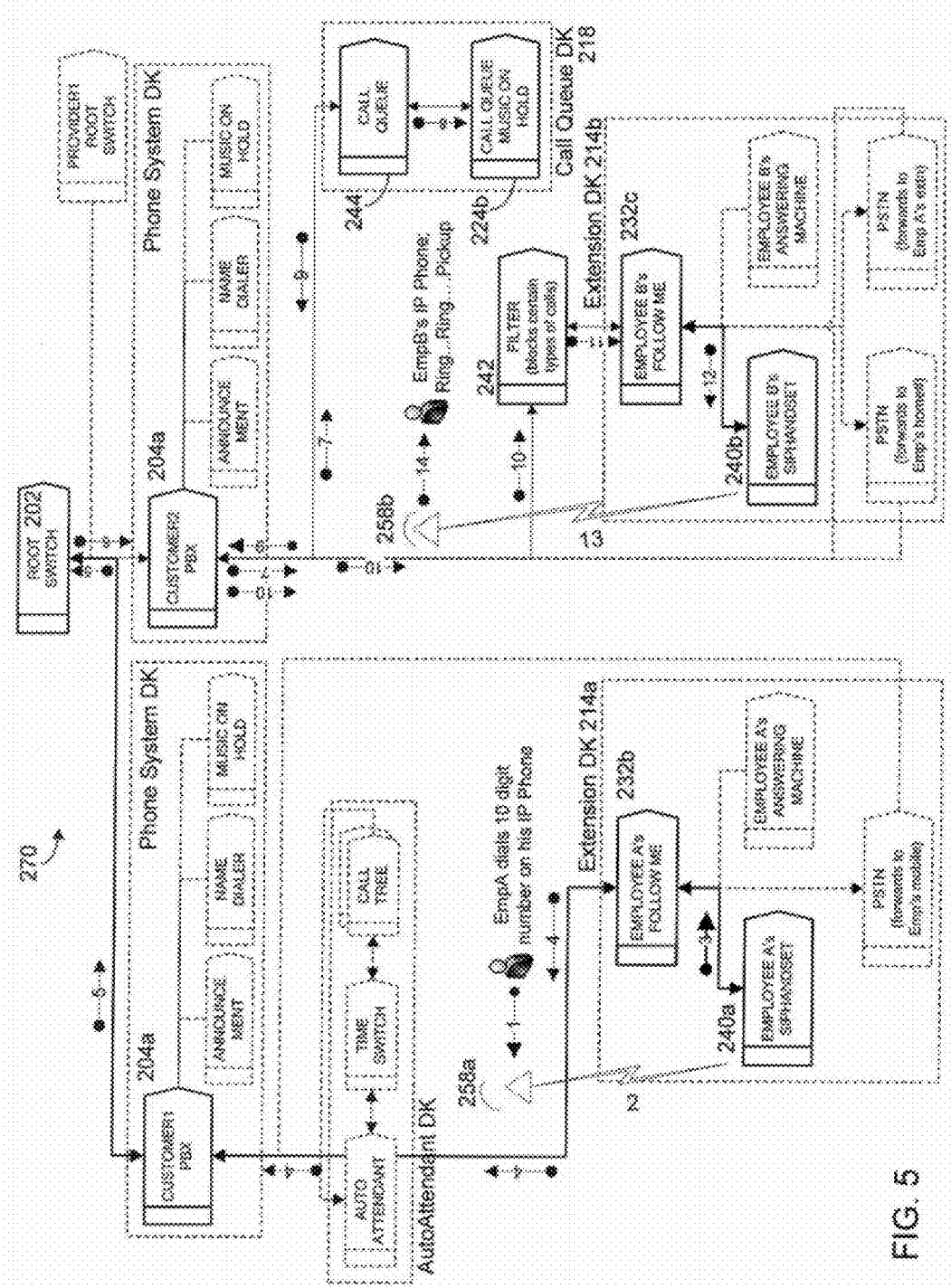
FIG. 5 illustrates an exemplary path through the configuration graph of FIG. 2 for an inter-PBX call from an extension of one account owner to the call queue in another account, and eventually to an extension in the other account.

FIG. 5 is an exemplary configuration graph 270 for illustrating an inter-PBX call. Specifically, an employee from one customer calls a toll-free support line at another customer and is placed on hold until an employee at the second customer answers the call. Configuration graph 270 is a specific instance making use of the configuration graph 200 in FIG. 2. As above, the numbered arrows indicate steps in the flow of the outbound call as it is processed by the various telephony devices. It should be noted that the numbered arrows apply only to this particular exemplary configuration graph 270 and do not carry over to any previous or subsequent exemplary configuration graphs. As noted above, the various telephony devices shown in the configuration graph 270 are explained in further detail in section 3.0 below. A brief summary of the process is presented first and is followed by a slightly more detailed high level explanation of the call processing by the various telephony devices. As also noted above, each telephony device illustrated in the configuration graph 270 is individually configurable so that VoIP systems may be configured in innumerable different combinations.

The call processing is initiated when employee A (customer 1) uses an IP phone handset and enters a 10-digit number. The number being called is the toll-free support line at customer 2. Employee A receives (hears) a ringback briefly, followed by a phone menu message indicating that it may be a few minutes before the call is answered. After the phone menu message plays, the hold music begins as employee A is waiting on hold. Employee A is placed on hold because the only agent on duty to receive the call (employee B of customer 2) is busy on another call. Employee B's phone rings once he/she becomes available. Once employee B answers, the call is connected.

Further details of the configuration graph 260 show that employee A initiates a call process by dialing a 10-digit phone number on the IP desk phone 252*a* at step 1.

At step 2, the call comes in from the handset and is detected as such (by the system) due to the presence of the known SIP ID in the 'from' field of the SIP message header. The SIP ID is passed to the application server to obtain the device GUID of the SIP handset device 240*a* which represents this phone in the system. The SIP handset device 240*a* is then invoked.

The SIP handset device 240*a* determines that this is an outbound call and hands off the call to its outbound call property at step 3. The outbound call device is a follow me device 232*b* within the extension device kit 214 that includes the SIP handset device 240*a*. Thus, the call (connection) is sent to the follow me device 232*b*.

At step 4, the follow me device 232*b* determines that the call is an outbound call and sends the call to the device specified in its out device property, the PBX device 204*a* of the account in which the follow me 232*b* is a part. Thus, the call is sent to the customer 1 PBX device 204*a*.

At step 5, the PBX device 204*a* receives a call, then looks up the destination number (a 10-digit DID) in its extension routing table. Since the numbers are not extension numbers, no match is found. The PBX device 204*a* requests a route for the call from the application server (the phone number is passed with the request). The application server determines that the number is known and calculates the route from the customer 1 PBX 204*a* to the device within the system that owns the number (customer 2's call queue device 244). The route is returned to the customer 1 PBX 204*a* which then hands the call of to the first device in the route which is the root switch 202.

Upon receiving the call, the root switch 202 also attempts to acquire a route for the call at step 6. The root switch 202 receives back a route for the call from itself to the device in the system that owns the number. The call is then handed off to the first device in the route, the customer 2 PBX 204*b*.

The customer 2 PBX 204*b* receives the call and looks up the destination phone number in its extension routing table. Since the phone number is not an extension number, it does not find a match. The PBX device 204*b* requests a route for the call from the application server (the phone number is passed with the request). The application server determines that the number is known and calculates the route from the customer 1 PBX 204*a* to the device within the system that owns the number (customer 2's call queue device 244). This route is returned to the customer 2 PBX 204*b*. At step 7, the PBX 204*b* hands the call off to customer 2's call queue device 244, the first device in the calculated route.

Upon receiving the call, the call queue device 244 determines whether any agents are logged in and available. It finds that employee B is logged in but unavailable as employee B is on another call. The call queue device 244 then connects the call to the call queue music on hold device 224*b* at step 8. The call queue device 244 subsequently continues to monitor the availability of agents, so that the call may be transferred once an agent becomes available. The call queue music on hold device answers the call, at which point the caller stops hearing ringback and instead hears the music on hold phone message.

Upon employee B ending his current call, the next call will be received after a set amount of time. (This set time is configurable as a property of the call queue device 244 as down time.) Once this down time has elapsed, the call queue device initiates the process of transferring the call to employee B, at step 9, by sending the call back to the customer 2 PBX 204*b* along with employee B's extension number.

The customer 2 PBX 204*b* receives the call and looks up the extension number in its extension routing table property. At step 10, once the match is found the call is handed off to the filter device 242 listed for employee B's extension.

The filter 242 corresponding to employee B, evaluates its rules for handling calls at step 11, determines that this call should not be blocked, and then sends the call to employee B's follow me device 232*c*. As noted above, filters are typically used to block certain kinds of calls, for example to prevent employee B in this instance from making and/or receiving certain kinds of calls.

At step 12, the follow me device 232*c* sends the call to the SIP handset device, the first device in its list.

At step 13, upon receiving the call, employee B's SIP handset device 240*a* sends an SIP INVITE message to its corresponding SIP phone device 258*b* identified by the device ID property. The invite is actually sent to a session border controller (not shown) which knows the IP address for each phone when given the Device ID (also called the SIP ID). The SIP phone device 258*b* is not to be confused with the software-implemented configurable telephony device disclosed in the present invention.

At step 14, the IP desk phone 252*b* at employee B's desk rings, and employee B answers the phone. The call queue device 244 determines that the phone has been answered, sends an exit message to the call queue music on hold device 224*b*, and connects the call to the new channel established with the IP desk phone 252*b*. The caller no longer hears music and is connected to employee B.

The call between the two employees of the respective companies is therefore completed without leaving the device system.

3.0 TELEPHONY DEVICE ARCHITECTURE 3.1 HDAP Device Platform Overview

The device platform 100 allows customers to configure their PBX by using and connecting a series of configurable software-implemented telephony devices. Design details of several exemplary telephony devices 110 as well as design details for the interaction of those telephony devices 110 is now presented. Additionally, device-to-device transitions are presented.

3.2 Telephony Devices

One embodiment of a configurable software-implemented telephony device 110 is specified by a CCXML document and a set of properties. As part of a device, additional CCXML, VXML, the supporting resources (pre-recorded audio, grammar files, script files, etc), application server code that generates one of the above, and configuration screens, as well as application server code that provides an API to control or monitor the device at runtime in special or custom ways can be included.

A call is handled by a number of telephony devices. When the call is first presented to a device platform, it is handled by the HDAP CCXML document which then passes control to either the root device for externally initiated calls or to the SIP handset device corresponding to the phone that is initiating the call. Control is then passed on to the next device as its configuration of the first device determines. At any point a telephony device 110 can fully handle the call itself rather than passing it along. An exemplary HDAP CCXML document is shown in FIG. 29.

In the context of the device platform 100, a telephony device 110 is a collection that includes a device logic CCXML document that includes event handlers, a properties CCXML document that contains descriptors (including properties, name of root document, other information needed for configuration UI), VoiceXml documents, a configuration UI, supporting resources, application server code, and test scripts. An exemplary device logic CCXML document is shown in FIG. 30.

Application server code could include software for special billing, monitoring implementations that cannot be performed in CCXML, or code that generates dynamic VoiceXML, for example. The test scripts could be used to test the functionality of the telephony device 110.

During call processing a telephony device 110 may be or have a parent device and/or a child device. A parent device is the device immediately prior to the current device in the chain of processing a call. The root switch and handset devices when initiating a call have a parent CCXML session that is the HDAP CCXML, however they don't have a parent device. A child device is the device following the current device in the chain of processing a call. This device has been launched by the current device.

Telephony devices 110 have properties, and every telephony device 110 has a universe of properties that it can ever have. These properties usually have default or initial values. If a specific value is not prescribed, a device normally functions in a certain way based on the default properties. However, in each instance of a telephony device 110, when a device is used for a particular function, the default properties can be overridden with specific values. Values can include such information as (1) how long the call rings before it gets picked up, (2) how long the call rings before it gets transferred to the next device, (3) which is the next device to which the call should be sent, and (4) under what conditions should a device be sent a call.

In a dynamic fashion, when a telephony device 110 is instantiated, it provides a context and then inquires of the HDAP engine to determine what it is supposed to do. The engine looks up the information and provides the telephony device 110 with the properties and logic to perform its functionality.

3.2.1 Example Devices

Listed below are some examples of telephony devices 110 together with a brief description for each:

a. Switch: sends the call one way or the other according to rules; knows how to call the outside world,
b. SIP Handset: knows how to start and stop calls to a SIP phone; knows the identity of a specific phone,
c. PBX: routes calls within an account, and provides common account-level features,
d. PSTN: forwards a call to PSTN or an extension,
e. Follow me: rings a series of devices in turn according to rules,
f. Hold music: plays music for a caller on hold,
g. Answering machine: records voicemail,
h. Voicemail server: allows retrieval and management of voicemail boxes,
i. Call queue: provides ability to queue callers, have them hear music or prompts (via other devices) and connect to agents upon availability,
j. Call queue worker login: enables call queue worker to login over the phone,
k. Call queue worker logout: enables call queue worker to logout over the phone,
l. Announcement: plays a recording,
m. Time switch: switches calls according to time based rules,
n Call tree: provides the ability to give the caller a menu of options,
o. Call group: rings several phones (or devices) at the same time, can handle no-answer situation,
p. Filter: can filter a call according to rules, and allow it through or not,
q. Conference: Allows multiple parties to talk to one another,
r. Mock no answer: allows phone system to be automatically tested for no answer case by simulating the condition,
s. Mock busy: allows phone system to be automatically tested for busy case by simulating the condition,
t. Mock answer: allows phone system to be automatically tested for answer case by simulating the condition,
u. FAX: device to handle receiving a FAX,
v. No answer: device which never signals ready,
w. Name dialer: allows a caller to specify the name of the person they are calling using DTMF,
x. Override: overrides the usual behavior of a device kit for a limited time in favor of alternate behavior,
y, SIP endpoint: places a direct call to a SIP URI,
z. Auto attendant: serves as the entry point for all auto attendants,
aa. Sequential: executes one device, then another, etc. in sequence.

3.2.2 Components of a Device

Figure 6:
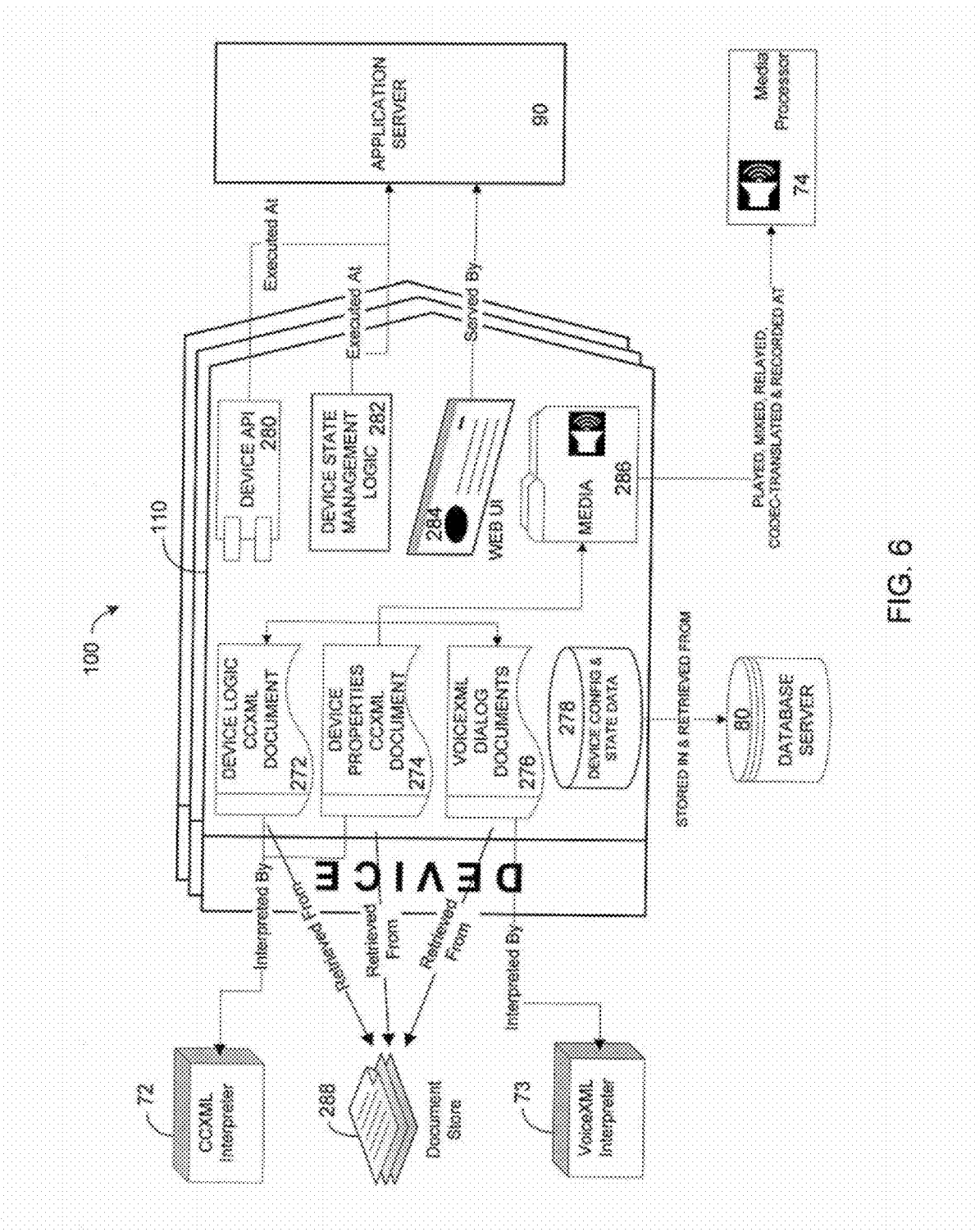
FIG. 6 is an illustration of a telephony device of FIG. 1 in an exploded view that shows the components of a telephony device, and where each component is stored and executed.

FIG. 6 is an illustration of a telephony device 110 in an exploded view that shows the components of a telephony device, and where each component is stored and executed with respect to the device platform 100. Rather than being a single monolithic component, a telephony device 110 is made up of a number of components that work together to present a virtual appearance of a singe component that serves a single purpose.

Each type of telephony device 110 has a device logic CCXML document 272 that contains the CCXML logic that specifies the repeatable behavior of the telephony device 110. The device logic CCXML document 272 is referenced by the device properties CCXML document 274, and is interpreted by the CCXML interpreter 72 when a properties document invokes it by reference. As noted above, the CCXML interpreter 72 is part of the voice server 70. An exemplary device properties document is shown in FIG. 31.

The device properties CCXML document 274 is the first CCXML document that executes for a telephony device 110. It sets all the dynamic and static properties of the telephony device 110 into session variables and then invokes the device logic CCXML document 272. The properties document is automatically generated by, and kept in sync with the changing properties by the application server 90.

VoiceXML Dialog documents 276 are an optional part of a telephony device 110. If the device logic relies on user interaction, such as playing a menu, getting DTMF input or doing text to speech synthesis, then VoiceXML is used. The name and location of the VoiceXML dialog documents 276 are usually properties referenced in the device properties CCXML document 274. The VoiceXML dialog documents 276 are interpreted by the VoiceXML interpreter 73. As noted above, the VoiceXML interpreter 73 is part of the voice server 70.

A general purpose, shared and fast document store 288 stores and serves up all of the device logic CCXML documents 272, device properties CCXML documents 274, and VoiceXML dialog documents 276.

Device configuration and state data 278 are the properties and configuration information that make a particular telephony device 110 instance different from another instance. The properties are stored in the database 80 before being copied into the generated device properties CCXML document 274. State data is another distinguishing part of a telephony device 110. In a call queue state device for example, the state data might include the list of workers logged in, the list of callers holding in the queue, the list of callers talking to agents, the last agent that was sent a call, etc. This data is held in memory but is also persisted to the database 80 so that it is available across multiple servers.

In addition to storing telephony device data, the database 80 also stores account data and static definitions of device types and device kit types.

The device management API 280 is the Application Programming Interface provided by the device developer to create, manage, query, configure and delete the telephony device 110. Telephony device properties are set through this API. It runs in the application server 90 and works on data in the database 80.

The application server 90 is a multi-purpose, off the shelf platform that serves many purposes, including a web server. While the application server 90 is off the shelf, the logic that it runs is either part of the device platform 100 or telephony devices 110.

Device state management logic 282 refers to the application logic that accompanies more complex telephony devices, such as call queue devices and conference devices for example, to maintain and manage their state from multiple servers, and to use that state in making run-time decisions. An example of such logic, for a conference device, might be the logic that executes when a conference device is first invoked, to query the state and determine if any other callers are already in the conference, and if so, determine which server is acting as the master server for the conference. This logic executes in the application server 90.

The device developer provides the web user interface 284 through which the telephony device 110 is manipulated, configured, created, and deleted. The web user interface (UI) 284 must conform to certain architectural requirements so that it fits in seamlessly with and works in conjunction with the UI for the rest of the telephony devices 110. The web UI 284, is served up by the application server 90.

Finally, a telephony device 110 includes media 286. These media 286 elements might include static media files, dynamically recorded greetings files that need to be played back, or the ability to receive and mix media such as in a conference. A common media store provides storage for any media 286 that is stored. The media 286 is handled, played, mixed, relayed codec-translated and/or recorded at the media processor 74 (see FIG. 1).

Figure 7:
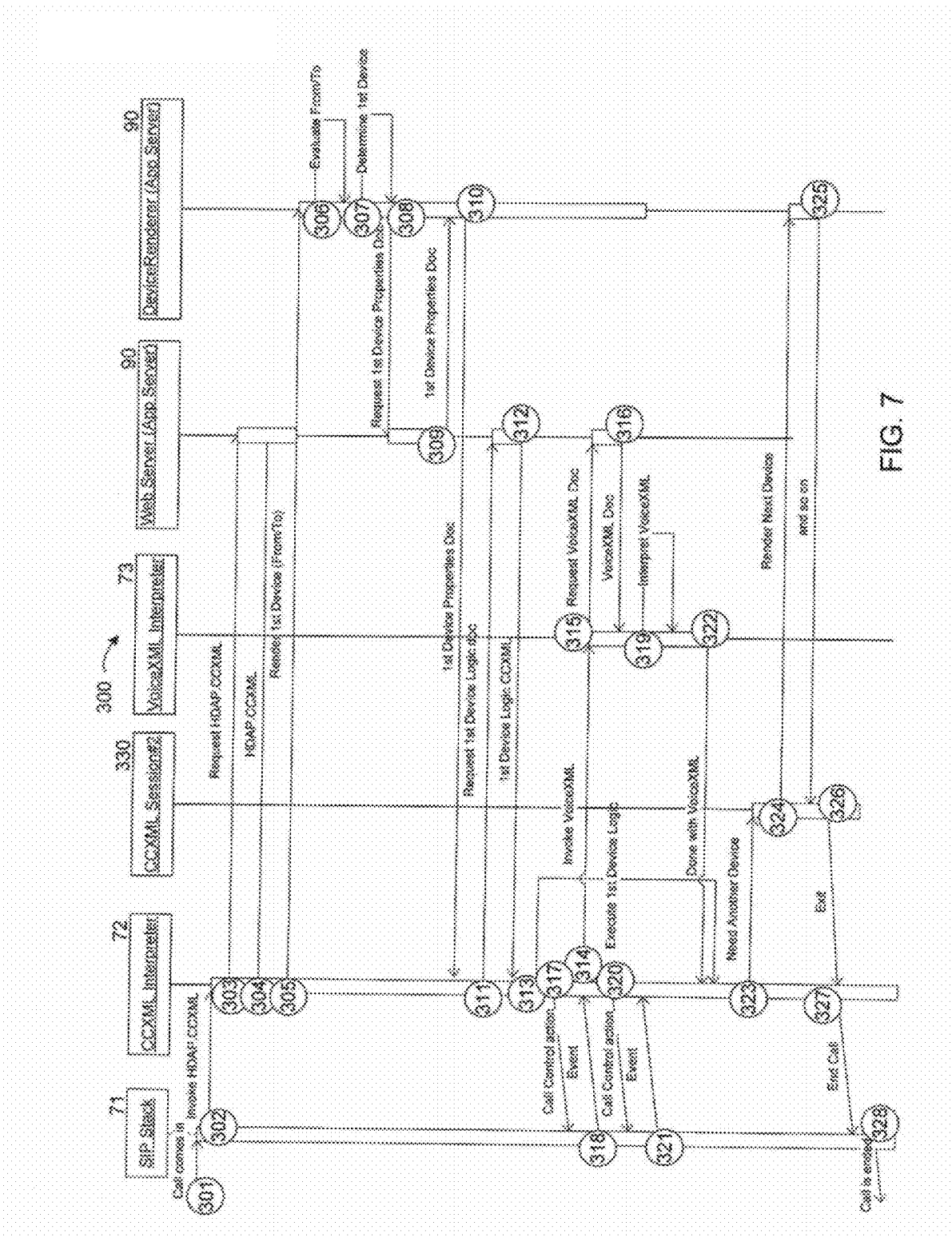
FIG. 7 is an exemplary high level sequence diagram that illustrates how a call is processed through the components of FIG. 1.

FIG. 7 is an exemplary high level sequence diagram 300 that illustrates how a call is processed through the components of FIG. 1.

At step 301, a call comes in to the SIP stack 71. The SIP stack 71 then sends an event to the CCXML interpreter 72 at step 302, and includes information from the incoming call, which triggers the invocation of the root (bootstrapping) CCXML document of the system—HDAP.CCXML—in the CCXML interpreter 72.

At step 303, the CCXML interpreter 72 requests the HDAP.CCXML from the web server component of the application server 90. The web server responds by serving up HDAP.CCXML at step 304.

Next, the HDAP.CCXML pulls from/to/subject information from the SIP header and, at step 305, sends a request to the device renderer in the application server 90 to serve up the first telephony device 110.

At step 306, the device renderer evaluates the from/to and determines whether this call is from a SIP phone known to the system 10 or is from a source external to the system 10. At step 307, the device renderer determines which telephony device 110 to serve up first. If it is a call from a SIP phone known to the system, it serves up the appropriate SIP handset device. Otherwise, it serves up the root switch device.

The device renderer requests the web server for the first device's properties CCXML document 274 at step 308, and the web server (at application server 90) returns the first device's properties CCXML document 274. At step 310, the device renderer returns this properties document to the CCXML interpreter 72, and the CCXML interpreter 72 begins interpreting the properties document.

After setting the properties, the CCXML interpreter 72 encounters a reference to the device logic CCXML document 272. It requests this document from the web server at step 311. The web server returns the requested device logic CCXML document 272 at step 312, and the CCXML interpreter 72 begins interpreting the first telephony device's logic CCXML document 272 at step 313 using the properties previously set.

In some instances, there might optionally be a need for VoiceXML execution. Should that be the case, the ongoing CCXML session 330 calls the VoiceXML interpreter 73 at step 314. The VoiceXML interpreter 73 requests the referenced VoiceXML dialog document 276 from the web server at step 315, and the web server returns the document requested at step 316.

Meanwhile, independently, the CCXML interpreter 72 and the SIP stack 71 may be exchanging a series of events 318 and call control commands 317. At step 19, the VoiceXML interpreter 73 interprets the VoiceXML document returned to it by the web server. This may involve user interaction. Independently, the CCXML interpreter 72 and the SIP stack 71 may again be exchanging a series of events 321 and call control commands 320. After all user interaction is complete, the VoiceXML interpreter 73 exits the dialog and lets the CCXML interpreter 72 know that it is finished at step 322.

The CCXML interpreter 72 carries on with the execution of the device logic, and may encounter the need for the next telephony device 110. In such an occurrence, a new CCXML session is started. The new CCXML Session 330 requests the device renderer to render this next device.

And this process continues as described above until all necessary devices have been invoked.

Eventually all CCXML sessions exit, as in step 326, the SIP stack is asked to end the call at step 327, and ends the call at step 328.

3.3 Data Models

Figure 8A:
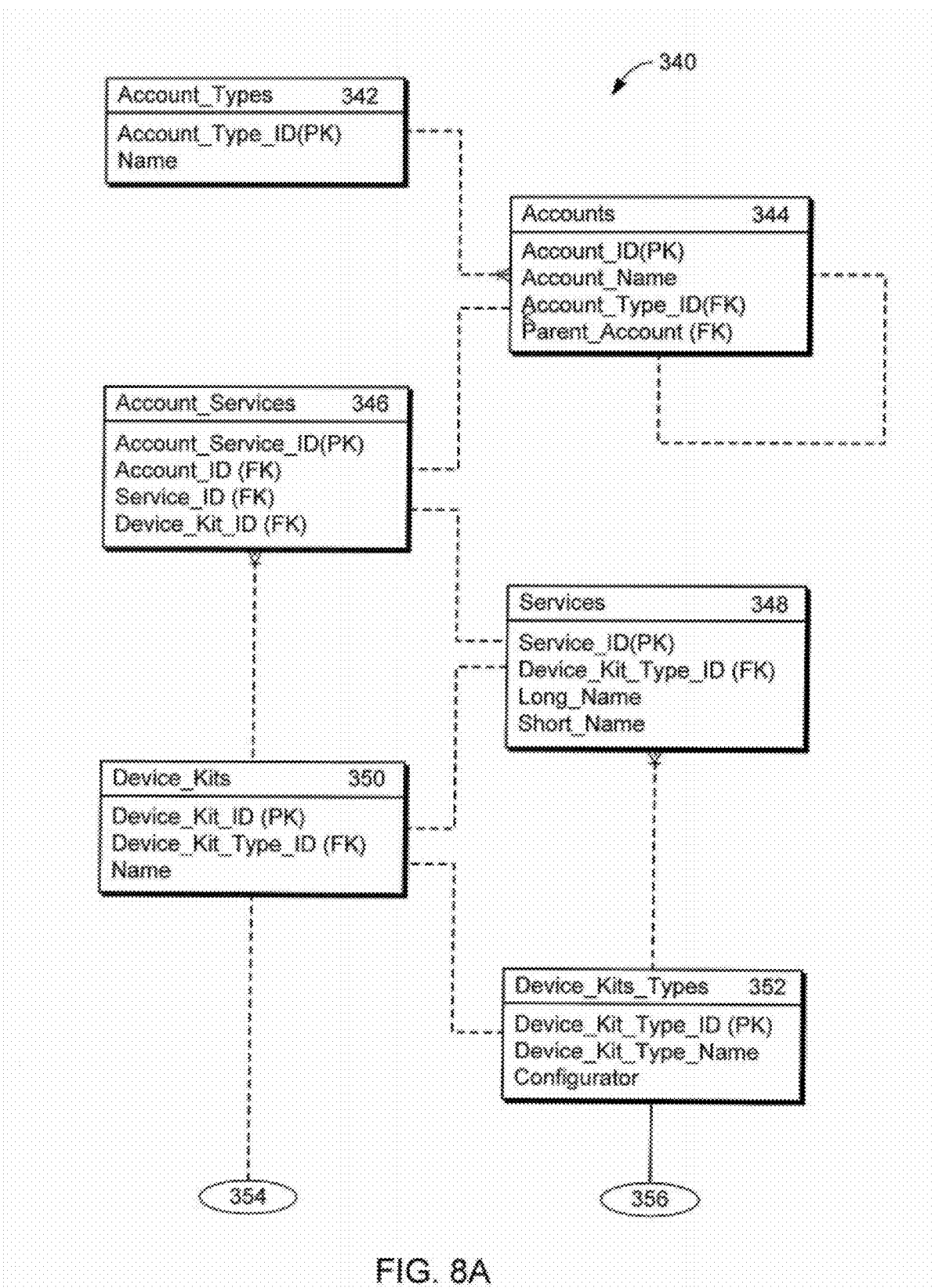
FIGS. 8A and 8B together are a data model diagram illustrating how the data relating to device kits, telephony devices, accounts and services is stored.
Figure 8B:
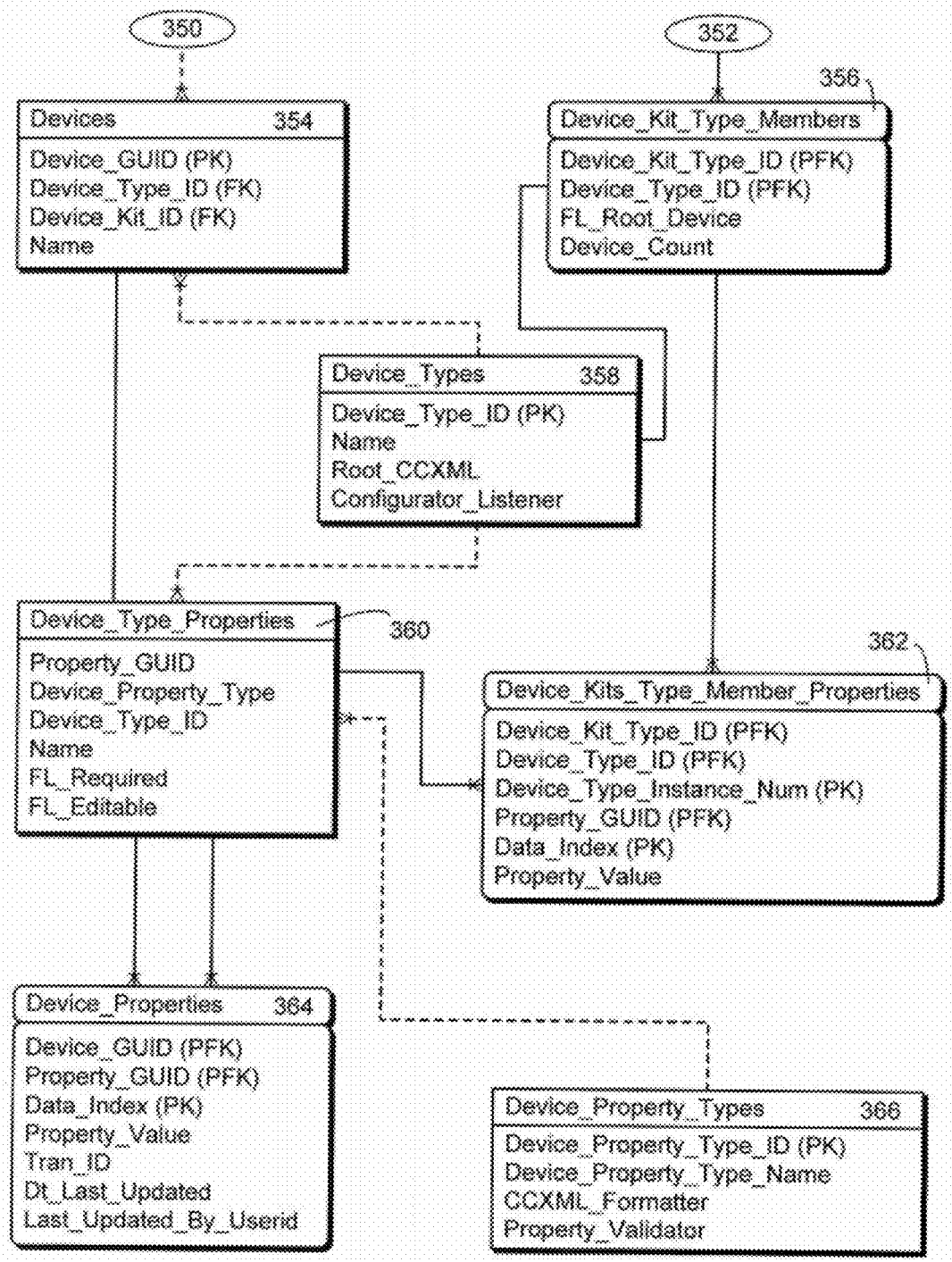

FIGS. 8A and 8B together are a data model diagram for the key database entities that support the device platform 100, and relate devices to accounts and services.

The database entities shown in boxes (such as 342 and 344) are relational tables. The table name is shown at the top of each box. The items in the lower section of the box are the columns or attributes. The PK in parenthesis signifies Primary Key. No two rows in the table can have the same exact values in the primary key columns. The FK in parenthesis signifies that the column is part of a Foreign Key. A foreign key always points to a primary key on a parent table. The relationship between the parent and the child is shown as a line between them. The foreign key on the child table ensures and enforces that no child row can be inserted without a corresponding row in the parent table. The value of the foreign key column in every row of the child table must match the value of the primary key in a row of the parent table. The parent row cannot be deleted unless the child is deleted first. There can be many children rows to the one parent row. A PFK in parenthesis signifies that the column is part of both a primary key and a foreign key of the table.

A description of each of the tables shown in FIGS. 8A and 8B follows. Note that a static lookup table is one that is populated once at the time the system is deployed and only changed occasionally when the system is upgraded with new values for the static lookup table. A dynamic table (one that is not a static lookup table) is one that is actively inserted into, updated or deleted from during the course of the system's routine activities.

Table Name: Account_Types 342
Primary Key: Account_Type_ID
Static Lookup Table: Yes
Description: Static Lookup table that holds the list of types of accounts that exist in the system, such as "Direct Customers" of the operator of the system, "White Labelers" of the operator who present the system as their own to their customers, and "Resellers" who sell the system under its original branding. This is a parent to the Accounts 344 table.

When does this table change: Hardly ever. Only if system is upgraded to support new types of providers or customers Table Name: Accounts 344
Primary Key: Account_ID
Static Lookup Table: No
Description: Holds one row for each Account in the system. Accounts may be of the different types specified in Account Types. This is a parent to the Account_Services 346 table.

When does this table change: Every time a new customer or provider comes on board, a new row is inserted into this table. Also when a customer cancels or is suspended, the table is updated.

Table Name: Services 348
Primary Key: Service_ID
Static Lookup Table: Yes
Description: Static lookup list of all services sold by operator of the system. The Device Kit Type ID column points to the Device Kit Type in Device_Kit_Types 352 that fulfills the feature functionality of the specific service. The Device_Kit_Type_ID tells the system what type of Device Kit to create in the account when this service is purchased When does this table change: When new services are added to the list of what is available for sale, and also when a service is to be supported by a different Device Type than earlier.

Table Name: Account_Services 346
Primary Key: Account_Service_ID (Account_ID+Service_ID are also unique)
Static Lookup Table: No
Description: Lists the services purchased by each account. One row for every service purchased by every account. The Device_Kit_ID points to the specific Device Kit in Device_Kits 350 that was created at the point of purchase When does this table change: Every time a customer purchases or cancels a service.

Table Name: Device_Types 358
Primary Key: Device_Type_ID
Static Lookup Table: Yes
Description: A Device Type is the template for a reusable building block component that provides a specific atomic telephony function using CCXML, VoiceXML, Java, media files, and data. This is a static lookup table of all the Device Types in the system. Example Device Types are Root Switch, PBX, Follow Me, Sip Handset, etc. Using Object-oriented terminology, A Device Type is like a Class, while a Device is like an object.

When does this table change: Only if the system is upgraded and new types of Devices are introduced.

Table Name: Devices 354
Primary Key: Device_GUID
Static Lookup Table: No
Description: A Device is a created executable instance of a Device Type. Each Device is of a type as specified by its Device_Type_ID. A Device is controlled through its properties. Example: Two accounts that have a PBX Device Type get two different devices, each with its own properties. This table holds the list of all Devices in the system, for all customers of all providers.

When does this table change: Every time a Device is created, reconfigured or deleted.

Table Name: Device_Kit_Types 352
Primary Key: Device_Kit_Type_ID
Static Lookup Table: Yes
Description: A Device Kit Type is a collection of Device Types that (when created into Devices) provide a complex reusable functionality. Examples include Extension Device Kit, Phone System Device Kit, Call Group Device Kit, etc When does this table change: Only if the system is upgraded and new types of Device Kits are introduced or old ones retired.

Table Name: Device_Kits 350
Primary Key: Device_Kit_ID
Static Lookup Table: No
Description: Device Kit is a created instance of a Device Kit Type. Each Device Kit is of a type as specified by its Device_Kit_Type_ID. A Device Kit does not actually execute, its component Devices execute. This table holds the list of all Device Kits in the system, for all customers of all providers.

When does this table change: Every time a Service is purchased.

Table Name: Device_Kit_Type_Members 356
Primary Key: Device_Kit_Type_ID, Device_Type_ID
Static Lookup Table: Yes
Description: This table specifies what Device Types make up a Device Kit Type. The Device Count indicates how many instances of each Device Type are needed to make up the given Device Kit Type. This static lookup table is used at the time of service purchase, to determine what Devices need to be created in order to create a particular Device Kit of the Type specified in Device_Kit_Type_ID on Services 348.

When does this table change: Only if the system is upgraded and a change is made to the composition of a Device Kit Type Table Name: Device_Property_Types 366
Primary Key: Device_Property_Type_ID
Static Lookup Table: Yes
Description: Static lookup table that lists all the different TYPES of properties that the system supports for Devices. Type examples are String, Numeric, DeviceConnection, etc. The Property_validator column specifies the name of the java method that is to be used to validate the property value, thus allowing for custom property types to be introduced without a change to the existing system When does this table change: Only if system is upgraded and new types are introduced Table Name: Device_Type_Properties 360
Primary Key: Property_GUID
Static Lookup Table: Yes
Description: Static lookup table that specifies what properties each Device Type can and must have. A Device can only have those properties that this table specifies for its Device Type. Examples of Properties might be OutboundCallingDevice, TimetoRingBefore VoceiMail, etc.

When does this table change: Only if system is upgraded and new properties are introduced.

Table Name: Device_Kit_Type_Member_Properties 362
Primary Key: Device_Kit_Type_ID,Device_Type_ID, Device_Type_Instance_Num, Property_GUID, Data_Index
Static Lookup Table: Yes
Description: Static lookup table that specifies the DEFAULT property values that are to be assigned to Devices when created as part of a given Device Kit. This table is used at purchase time when new Devices are created. Device_Type_Instance_Num is needed to identify which of several of the same Device Type the property value applies to. Data_Index is there to support array type properties.

When does this table change: Only if system is upgraded and

Table Name: Device_Properties 364
Primary Key: Device_GUID, Property_GUID
Static Lookup Table: No Description: This all-important table stores every property of every Device. These properties determine the behavior of each Device.

When does this table change: Any time a user or administrator changes the configuration of a feature

3.3.1 Device Type

A device type is a definition or template for the device, and is similar to a make and model of a physical device.

A list of Device Types is provided above under the heading Example Devices.

3.3.2 Device Kit Types

Devices that are commonly used together in a particular configuration can be bundled into a device kit. A device kit is a number of device types connected together to serve a common function. The two primary uses of device kits are (1) easier service provisioning and (2) configuration. Customers may purchase device kits rather than having to buy the individual component devices. This simplifies the purchase for the customer, and allows device vendors to offer packaged groups of devices that are pre-connected to perform a specific larger function. At configuration, an administrator may add a device kit to the configuration graph, which essentially results in the pre-connected group of devices to be added to the graph. Once added, the device kit ceases to exist as a device kit (except for the purposes of relating the devices together for billing), and instead becomes just a set of independent, connected devices similar to others on the configuration graph.

The list of sample Device Kits is:

Extension, Conference, FAX, Auto Attendant, Phone System, Call Group, Virtual Extension, Call Queue.

3.3.3 Device Kit Type Members

Device Kit Type Members are the list of Device Types that make up each Device Kit Type. When a Device Kit is created one or more devices of each of the member types is created.

An exemplary list of Device Kit Type Members is:

| Device Kit Type | Member Device Types |
| --- | --- |
| Extension | Follow me |
|  | Siphandset |
|  | Answering Machine |
| Conference | Conference |
| FAX | FAX |
| Auto Attendant | Auto Attendant |
|  | Announcement |
|  | Call Tree |
|  | Time Switch |
| Phone System | PBX |
|  | Announcement |
|  | Voice Mail Server |
|  | Name Dialer |
|  | Hold Music |
| Call Group | Follow me |
|  | Call Group |
|  | Answering Machine |
| Virtual Extension | Follow me |
|  | Answering Machine |
| Call Queue | Call Queue |
|  | Announcement |
|  | Answering Machine |

3.3.4 Device Property Types

A device property has a type that defines the data format of the underlying value. All device properties must conform to one of these Device Property Types. The different data types available include string, number, device connection, phone DID, duration, boolean, FAX DID and media file.

A string value is any sequence of characters. To format the string value for CCXML single quotes are put around the value. There is no validation of the string value.

A number value is a numeric value, and may optionally include a floating point component. The number value is formatted for CCXML as-is with no additional markup or processing. This type can be validated with the regular expression \d+\.*\d+.

A device connection is a link connecting two devices together. The value stored in the database is the device GUID of the other device being connected to. This value is formatted for CCXML by appending the Device GUID to the URI for the DeviceRenderer. This value is verified first that it's a numeric value and the value is a Device GUID in the database.

A phone DID is a phone number that can be dialed to reach a telephony device 110 from anywhere in the device platform 100 (not an extension id, but the 10 digit phone number). The value is formatted for CCXML like a String value. The value is considered valid if it can be typed on a standard phone keypad with the regular expression [\d\*#]+

A duration represents a length of time. The value in the database is formatted according the CCXML spec's description of durations, which it gets from the Cascading Style Sheets 2 specification. This value is formatted for CCXML by placing single quotes around the text. This value is a number, optionally followed by white space and the ms or s identifiers, as specified in the regular expression \d+\s*[(ms)|s]?.

A Boolean value represents a true or false value. This value is stored in the database as the text true or false. The value is formatted for CCXML as it is stored in the database without quotes. The validation verifies that it is one of the two literal values, in lower case.

A FAX DID is a DID number that is routed to an external fax provider for processing. The value is formatted for CCXML as a String value. The validation for this type is the digits on the keypad—0-9, *, and #.

A media file is a file resource managed by device platform 100 that is used in the execution of a telephony device 110. Typically this will be an audio file, but the Announcement device allows this to be a VoiceXML file and other embodiments of the system might allow this to be image or video files. The value stored in the database is the result of asking the media manager class in the application server 90 to store the file. The value is formatted by CCXML by appending the value in the database to the path to the HDAP Servlet's media URL (/appserver/hdap/media/) and putting quotes around it. Users can not edit these fields directly, instead a user interface prompts the user for a file to upload, pass that file to the media manager and store the result. The media manager has a validation method that, given a value it can verify that a file exists.

3.3.5 Device Kit Types Member Properties

The list of properties of each exemplary telephony device 110 is as follows:

| Device Type Name | Property Name | Property Type |
| --- | --- | --- |
| Announcement | AllowAnyEntry | Boolean |
|  | DID | Phone DID |
|  | PlayIndefinitely | Boolean |
|  | TransferDevice | Device Connection |
|  | announcementURL | Media File |
| Answering Machine | AccountId | Numeric |
|  | BusyGreeting | Media File |
|  | UnavailableGreeting | Media File |
|  | UseVacationGreeting | Boolean |
|  | VacationGreeting | Media File |
| Auto Attendant | DID | Phone DID |
|  | NextDevice | Device Connection |
|  | PreviousDevice | Device Connection |

| Device Type Name | Property Name | Property Type |
|---|---|---|
| Call Group | DID | Phone DID |
|  | Extensions | Device Connection |
| Call Queue | ConnectionTimeout | Duration |
|  | DID | Phone DID |
|  | DefaultDevice | Device Connection |
|  | NoAgentDevice | Device Connection |
|  | OutboundDevice | Device Connection |
|  | QueueId | String |
| Call Queue Worker Login | LoginDuplicateDialog | Media File |
|  | LoginNotAllowedDialog | Media File |
|  | SuccessDialog | Media File |
| Call Queue Worker Logout | LogoutNotAllowedDialog | Media File |
|  | LogoutNotLoggedInDialog | Media File |
|  | LogoutNotMemberDialog | Media File |
|  | SuccessDialog | Media File |
| Call Tree | AllowAnyEntry | Boolean |
|  | DID | Phone DID |
|  | Extensions | String |
|  | NameTTS | String |
|  | NameURL | Media File |
|  | TransferDevice | Device Connection |
|  | WelcomeTTS | String |
|  | WelcomeURL | Media File |
| Conference | ConferenceID | String |
|  | DID | Phone DID |
|  | InvalidTTS | String |
|  | InvalidURL | Media File |
|  | NoinputTTS | String |
|  | NoinputURL | Media File |
|  | NumRetries | Numeric |
|  | WelcomeTTS | String |
|  | WelcomeURL | Media File |
| FAX | DID | FAX DID |
|  | DateRequestMade | String |
|  | EmailAddress | String |
|  | ReceiveFormat | String |
|  | RequestedAreaCode | String |
|  | RequestedCountryCode | String |
|  | RequestedExchangeCode | String |
| Filter | DisallowedOrgination | String |
|  | DisallowedOutgoing | String |
|  | NextDevice | Device Connection |
|  | PreviousDevice | Device Connection |
| Follow me | BlockCallerID | Boolean |
|  | DID | Phone DID |
|  | Devices | Device Connection |
|  | DisplayInDirectory | Boolean |
|  | NMACChoice | String |
|  | NameGreeting | Media File |
|  | OutDevice | Device Connection |
|  | Timeout | Duration |
| Hold Music | HoldMusic | Media File |
|  | PlaybackMode | String |
| Mock Answer | CallLength | Duration |
|  | TestId | String |
|  | TimeToAnswer | Duration |
| Mock Busy | TestId | String |
|  | TimeToAnswer | Duration |
| Mock No Answer | TestId | String |
| Name Dialer | InvalidTTS | String |
|  | InvalidURL | Media File |
|  | NoinputTTS | String |
|  | NoinputURL | Media File |
|  | OutboundDevice | Device Connection |
|  | WelcomeTTS | String |
|  | WelcomeURL | Media File |
| No Answer Override | NonProperty | String |
|  | DID | Phone DID |
|  | ExpirationTime | String |
|  | TemporaryDevice | Device Connection |
|  | UsualDevice | Device Connection |
| PBX | CallerIdMode | String |
|  | CallerIdNumber | String |
|  | DefaultDevice | Device Connection |
|  | ExtensionRoutingTable | Device Connection |
|  | OutboundCallDevice | Device Connection |
| PSTN | AnswerType | String |
|  | ConnectTimeout | Duration |
|  | DID | Phone DID |
|  | InvocationReason | String |
|  | OutboundDevice | Device Connection |
|  | PhoneNumber | String |
|  | TerminatesLeg | Boolean |
| Sequential | Devices | Device Connection |
|  | Timeout | Duration |
| Sip Endpoint | ConnectionTimeout | Duration |
|  | DID | Phone DID |
|  | DeviceID | String |
|  | OutboundDevice | Device Connection |
|  | SipURI | String |
| Siphandset | ConnectionTimeout | Duration |
|  | DeviceID | String |
|  | MacAddress | String |
|  | MailboxId | Numeric |
|  | OnHoldDevice | Device Connection |
|  | OutboundCall | Device Connection |
|  | Password | String |
|  | ProvisioningModel | String |
|  | SIPPort | String |
| Switch | nextDevice | Device Connection |
|  | noNumberRouteURL | Media File |
|  | outDevice | Device Connection |
|  | sipTerminator | String |
| TimeSwitch | DID | Phone DID |
|  | EndTime | String |
|  | InRangeDevice | Device Connection |
|  | OutRangeDevice | Device Connection |
|  | StartTime | String |
| Voice Mail Server | DID | Phone DID |
|  | OutboundDevice | Device Connection |
|  | PromptForMailbox | Boolean |

3.3.6 Device Properties

The device type of a telephony device 110 defines the properties that are allowed to be set for a given device. For example the announcement device type defines the device type properties of AnnouncementURL and DID. When a new device of type announcement is created the instantiated device then is allowed to have values for the fields AnnouncmentURL and DID.

A device type property declares the names of the properties, their types, and a flag indicating the type of list the property is. The device platform 100 supports three types of lists: none, list, and map as:

0. None. The object is a single entry and is not part of any list structure
  1. List. This object is part of a sequential list, indexed by an integer value starting at zero and continuing sequentially.
  2. Map. This object is part of a map or associative array where values are indexed by other key values. Each key can point to only one value.

Combinations of list types are not supported. Thus a list of maps or a map having a value that is a list is not allowed.

The properties of the telephony device 110 determine how the device behaves at run time. There are some properties that every device must have, in order for the device to work properly and consistently within the device platform 100 framework, and take advantage of common services like monitoring or call log generation. A list of required and immutable properties that every device must have includes:

1. TYPE: Unique type name of the device; stays the same in all copies of the device.
2. ROOT_DOCUMENT: Relative URL of root CCXML document Since these properties exist for every device, they are stored on the Devices 354 table rather than as properties. Other properties may be used by the device developer to influence the behavior of the device at run time.

Each telephony device 110 has a device GUID.

Some properties cannot be modified in any device copy of a device type, whereas others are allowed to be modified.

In one embodiment, devices are deployed as a Java standard Web Archive WAR file. Within the WAR file is packaged all the CCXML, VXML, and associated resources needed for device execution. Also in the WAR file, in the WEB-INF directory, adjacent to the web.xml file is a device.xml file. This file includes the details of the device's properties and its CCXML documents.

A new type of device is added to the system through the configuration application programming interface. After a device has been installed the configuration database has been updated so that the data in the device.xml file have been loaded. Additionally, the WAR file has been distributed to all the application server 90 instances.

3.4 Creation of Devices

Figure 9:
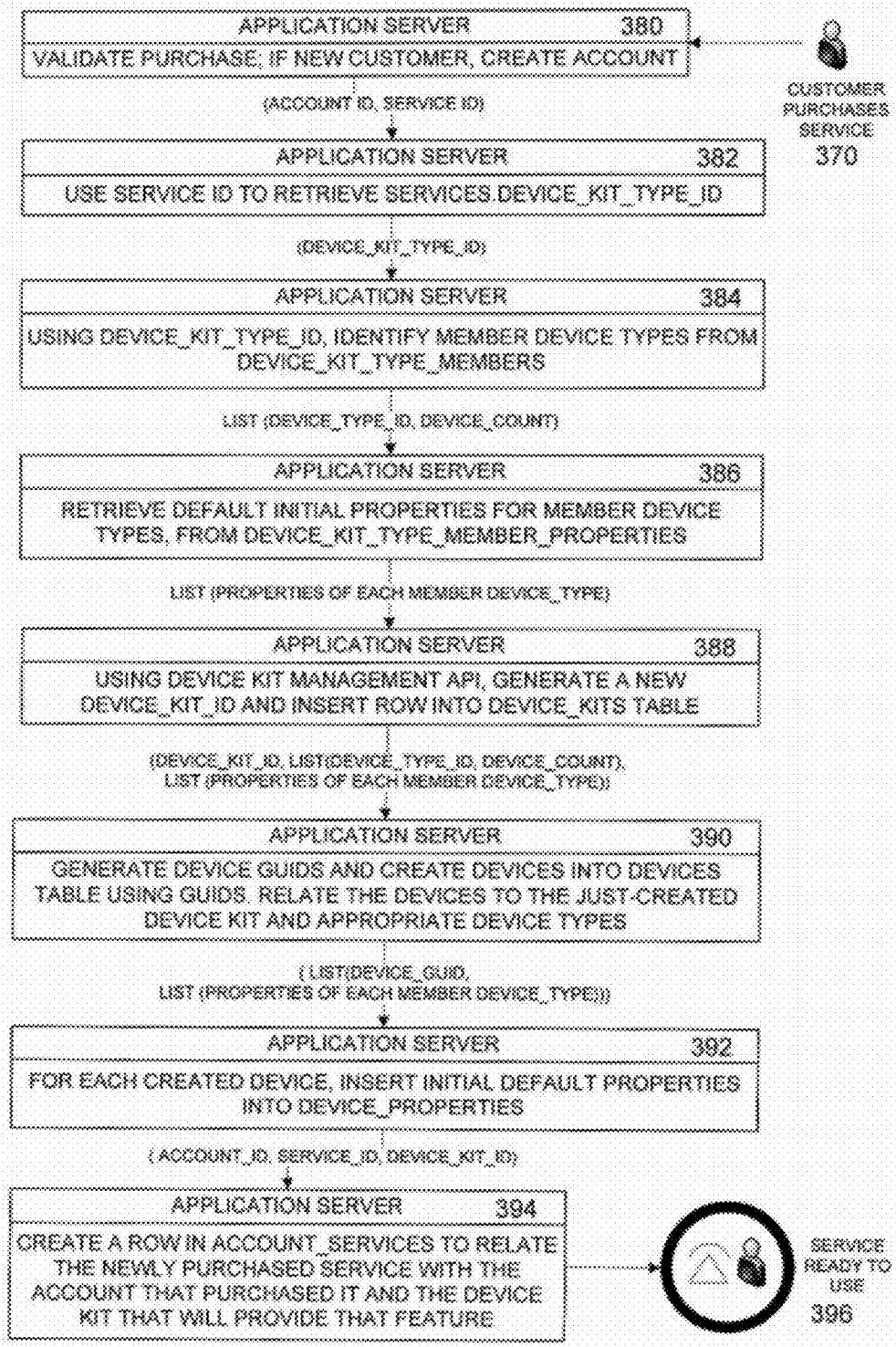
FIG. 9 is a flow diagram illustrating the creation of telephony devices at the time of purchase of services.

FIG. 9 is a flow diagram illustrating the creation of telephony devices at the time a customer purchases services 370. When a customer purchases new services (usually various telephony features) for their phone system, the right type, combination and number of telephony devices 110 need to be created. This is required so that when the customer then makes phone calls that require a particular feature, the right telephony devices 110 can be instantiated and their usage can be correctly tracked back to the customer so that accurate usage logs and bills can be generated.

At step 370, a customer purchases a service. Purchases can be made through a web-based user interface or through an API. Under the covers, the web-based user interface uses the same API.

After purchase, the application server 90 validates the data in the purchase, and creates an account for the customer at step 380. An account ID and service ID are created, and are passed through to the next step.

At step 382, the service ID is used by the API in the application server 90 to perform a lookup on the services table and identify the Device_Kit_Type_ID of the device kit type that fulfills the telephony function associated with that service. The Device_Kit_Type_ID is passed through to the next step.

The Device_Kit_Type_ID from step 382 is used to determine the member device types of the device kit type by accessing the Device_Kit_Type_Members table at step 384. Not only does this table indicate which device types (Device_Type_ID) make up the given device kit type, but also indicates the quantity of each device type (Device_Count) that are part of the device kit type. A Device_Type_ID list and the Device_Count are passed through to the next step.

Each member device type of a device kit type has certain default properties, and these are specified in the Device_Kit_Type_Member_Properties table. These default properties are designed so that when the devices are created they will function in a useful manner, even before the user customizes them for their specific needs. At step 386, these default properties are retrieved and passed through to the next step.

At step 388, the device kit is created by the API in the application server 90. A new Device_Kit_ID is generated and a new row with this ID is inserted into the Device_Kits table. The newly generated Device_Kit_ID along with the Device_Type_ID list, the Device_Count, and the default initial properties are passed through to the next step.

Next, at step 390, Device_GUIDS are generated for the new telephony devices 110 to be created, one for each telephony device 110. Rows are then inserted into the Devices table with these Device_GUIDS. Each row is assigned the appropriate Device_Type_ID, so that when the telephony device 110 is invoked, the system knows which device_type's CCXML logic document to serve up. The Device_GUIDS and the default initial properties are passed through to the next step.

Once the telephony devices 110 are created, the Device_Properties table is populated with the default properties at step 392. The account ID and service ID are passed through to the next step.

At step 394, a row is now inserted into the Account_Services table to relate the account with the new instance of the service that the customer has now acquired. This row also includes the Device_Kit_Id of the new device_kit that was just created. These relationships are necessary to (a) bill the right customer for the usage of the devices underlying the purchased feature, (b) to be able to invoke the right devices for the right feature of the right customer, (c) to be able to configure the right devices through the API and user interface, and (d) to be able to disable the right devices when the customer's account needs to be suspended. The Device_Kit_ID to Account_Services relationship relates the business of running a telephony system to the technology underlying the system.

At step 396, the pieces are in place for the customer to make use of the newly acquired features in plug-and play fashion.

3.5 Permissions Framework

The core purpose of the Permissions framework of the device platform 100 is to ensure that (a) customer accounts are only able to use the devices that they have purchased the rights to use, and (b) customer account administrators have the ability to limit what their staff members (end users) can change or do with each device.

The device platform 100 supports an account hierarchy where the operator of the system is at the top of the hierarchy. Below the operator are the different types of accounts such as White Labelers, Resellers and Direct Customers. Every account can have one and only one parent. At every level, every account can have users. At every level, every account also has telephony devices. The device permissions subsystem specifies, enables and enforces authorized and organized access to devices by users. At each level of the account hierarchy, there is a need for users to:

- Have access to devices to use in building applications
- Allow others below oneself in the organizational hierarchy to have access to some of the devices one has access to
- Limit the access for these subordinates in some ways (for example, certain properties may be modified but not others)
- Specify if subordinates can pass on some or all of their privileges (in terms of device-access and device-property-access) to their subordinates.
  - The Permission framework requires that each user can only be associated with one Account. The framework provides for four types of users:
  - a) Super User: must belong to the account of the operator of the system also known as the System Owner Account; not all System Owner users are super users. The system owner account has one of more users of type super user.

One of these is the master super user and can never be deleted. A super user can make any changes to the any device in the system.

b) Account Super User: An Account super user belongs to a regular customer account and can do everything an Administrator can do and in addition grant or revoke the Administrator privilege to and from others.

c) Administrator: An administrator user belongs to a customer account and can see and manipulate all the devices and all the users in his or her Account. Multiple users in an Account can be designated as Administrators.

d) End User: This is everyone else; belongs to a customer account; can manipulate device properties of devices granted to him/her. An end user can be designated as an API user. API users can make calls to the API that they are authorized for.

The device developer can specify whether a device property is modifiable or not. If it is, any user with access to the device can modify it for himself and, if he is an administrator, do it for all those in his account. Properties that are defined as immutable cannot be modified by anyone through an API or UI, not even the super user. They will have to be modified manually by a developer. A super user can grant access to any device to any direct child account of the system owner. When granting access to a device, the super user can specify whether the grantee has read or modify privilege on the device. Any administrator type user in an account can grant access to devices in his account to any user in his account. When granting access to a device, the administrator can specify whether the grantee has Read or Modify privilege on the device.

An Administrator can take away a device from any user in the account. Taking away a device in this situation means removing the access that the end user had to the telephony device 110, resetting the properties of the device to the default values from the corresponding device type. A super user can similarly take away a device from any direct child of the system owner.

When an end user is deleted, all his devices remain. This is akin to an employee leaving but their telephone staying. When an account is canceled, all its devices cease to be functional.

Permissions are restrictive and cannot be expanded going down the hierarchy; this means that if the account was given only Read privilege on a device, an account administrator can not grant modify privilege on it to another user.

Permissions are mainly used during the building of a configuration graph, and specifying device connections.

3.6 CCXML Implementation.

FIG. 10 is a listing of CCXML events 400 that each telephony device 110 is required to handle. Each telephony device 110 is required to implement several CCXML event handlers so that control can be passed to the device. Additional event handlers are required for passing control to other devices and a different set of event handlers are necessary for passing outgoing call requests. The event handlers are given in FIG. 10 together with the scenarios for which they are required, and an overview of what the event handler should do. The actions each event handler is responsible for is covered in the next section.

There are many telephony devices 110 that do some processing early and then don't need to remain involved. An example would be the filter device that either allows a call to pass through or terminates. Another example is the switch device, once a child device is found the switch does not have any further function. As an optimization, in these cases the device (filter or switch), could pass its child session to its parent in the hdap.ready event that it relays on. This would cause the device's parent to move the connection directly to its child device and send the start message to the child, reducing the number of times the connection must be moved and the number of events that must be generated and processed.

Telephony devices 110 that use this optimization should still implement the hdap.start event in case their parent device does not use the session id passed in the hdap.ready event.

3.7 Event Structures

An event structure specifies the data that must be passed when sending an event from one CCXML session to another. This section defines the event structures for the event handlers for the hdap.* events.

FIG. 11 is the event structure 402 for the hdap.receivecall event handlersof FIG. 10. The hdap.receivecall event is thrown to a child session from its parent session when a HDAP component is about to begin execution because of an incoming call.

FIG. 12 is the event structure 404 for the hdap.ready event handler of FIG. 10. The hdap.ready event is thrown from a child to its parent session when a HDAP component is now ready to take control of a call.

FIG. 13 is the event structure 406 for the hdap.initialized event handler of FIG. 10. The hdap.initalized event is generated once a device's session has had all its properties set and the CCXML is executing. This event is sent from the dynamically generated CCXML document that sets the device's properties and should never be sent from a device's logic CCXML.

FIG. 14 is the event structure 408 for the hdap.start event handler of FIG. 10. The hdap.start event is thrown from a parent to its child session when a HDAP component should take control of a call.

FIG. 15 is the event structure 410 for the hdap.makecall event handler of FIG. 10. The hdap.makecall event is thrown from the parent to child session when a HDAP component needs to make an outbound call.

3.8 Device Interactions 3.8.1 Process Overview

When a telephony device 110 needs to hand off the current call to another device for processing, the device currently processing the call creates a new CCXML session using a URL provided by the application server 90. This session will start with the application server generating a dynamic CCXML document that assigns the properties the administrator/user set for the device when it was configured, including setting the URL for any of the child's child devices (grandchildren to the current device). These properties will be stored in the application scope. This dynamic document will then use CCXML fetch and goto elements to transfer execution to the CCXML document for the device.

The CCXML interpreter will send the parent session a ccxml.created event. The parent device will send a "hdap.receivecall" message to its child device. The child device can then begin processing. Once the device is ready to assume control, it will send an event to its parent named "hdap.ready". It is possible that a device never sends its parent device a hdap.ready event because it can not assume control (i.e., a SIP handset device that the user does not answer).

The device that is currently in control and started the new device will receive this hdap.ready event. Once it is ready to delegate control to the new device it will first move the connection the user is attached to into the child's session and then send an event named "hdap.start". This event will include two attributes named connectionid and conferenceid. One of the attributes will be undefined and the other will be for the connection or conference the user is connected to.

The parent device can send a ccxml.kill event to a child device at any time, including before sending the hdap.start event. Once a child device receives this event it must kill any child devices, move the connection object, if any, to its parent session and exit.

Once a device has received the hdap.start the device can continue its business processing. Once the device is done processing the call it exits using the CCXML exit element. This causes the parent device to receive a ccxml.exit event. The parent device can then continue its processing.

3.8.2 Parent Device Receiving Input

There are likely to be cases in which a device's functionality requires listening on the connection after it has transferred control to another device. One example would be a company PBX that wishes to transfer any user who presses zero at any time to the operator, regardless of where they are in the system, including while talking to an actual person. This behavior would also be necessary when the users wishes to have separate music on hold for the same extension depending on how the caller connected to the extension—through the main switch board or through a call queue.

The flow is the same as that of a normal device until the point where the child device has signaled it is ready with a hdap.ready event. Normally, the parent would issue a move on the connection and then send the child a hdap.start event.

When a parent device wishes to continue to receive input from the connection and the child device has signaled its ready, the parent device will use the CCXML createconference element to create a new conference with a unique name created by using the device's GUID and a random identifier based on the current time. Once this conference has been created, it would join the current call to the conference and pass the conference id and not the connection id to the child device in the hdap.start event.

3.8.3 Initiating Outbound Call

At times a device might need to initiate an outbound call. For instance a user might want to configure call forwarding to a phone number not terminated within the device platform 110, or a user might pick up a handset and dial a number that might be another extension in their company or the number of an outside phone.

To initiate an outbound phone call, the device follows the process laid out in the previous section, but instead of sending an event hdap.receivecall, it sends a message hdap.makecall. This event has an attribute named dialdigits, which are the digits of the phone number and will be passed on unmodified.

3.8.4 CCXML Sequence

Figure 16:
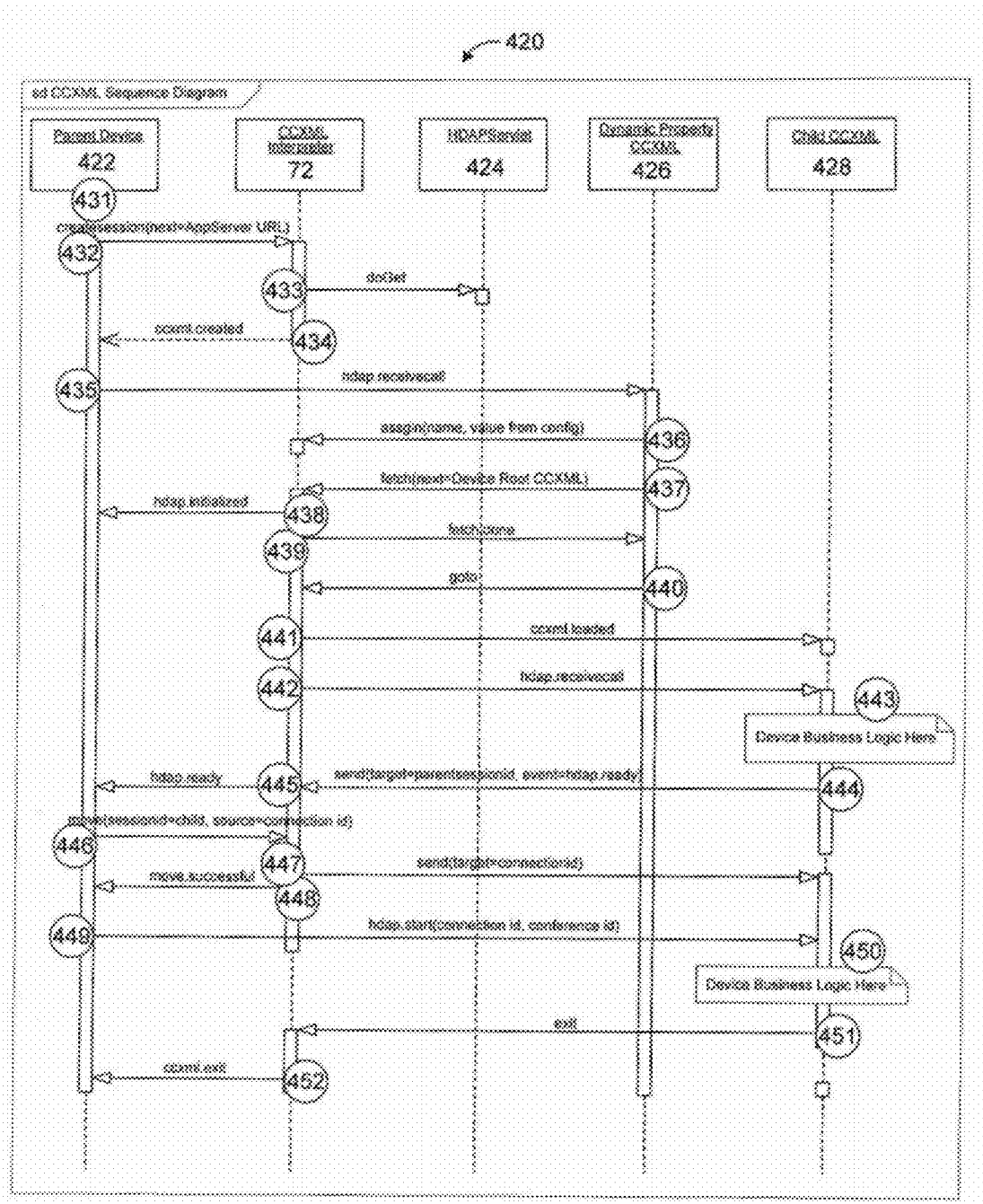
FIG. 16 is an exemplary sequence diagram illustrating the actions in a CCXML interpreter and application server when one telephony device invokes another.

FIG. 16 is an exemplary sequence diagram 420 illustrating the actions in a CCXML interpreter and application server when one telephony device invokes another. This sequence diagram illustrates the core functionality of the handoff interaction between two devices. At the end of the sequence, the connection is handed off from a parent device 422, such as a PBX, to a child 428.

At step 431, a parent device 422 determines that control of a connection must be transitioned to another device, a child device 428. The parent device 422 creates a session at step 432 by making a call to the CCXML interpreter 72 (engine) with the createsession call. The URL of a CCXML document is provided as the parameter. At step 433, the CCXML interpreter 72 then makes a doGet call to an HDAPServlet 424 object to fetch the document. The document is provided to the CCXML interpreter 72 by an application server and the CCXML session is created.

The CCXML interpreter 72 sends a ccxml.created event back to the parent device 422 at step 434, and the parent device 422 is informed that a CCXML session has been created. At this point, the CCXML document has been retrieved in memory and is in a CCXML session that is running in a session inside the CCXML interpreter 72.

The parent device 422 next sends a hdap.receivecall message to that session (dynamic property CCXML) at step 435.

After the hdap.receivecall message is sent, the properties of the device are assigned values as CCXML variables inside the session at step 436. Multiple assign statements are actually executed to assign the values. The values come from the dynamic property CCXML 426 that has been fetched and is inside the CCXML session. The values are assigned as a result of parsing the property CCXML document.

After all properties have been assigned, a fetch statement is issued to retrieve the root CCXML for this device at step 437. The path of the root CCXML is thus retrieved with the business logic of the device, i.e., the logic that determines the function of the previously assigned variables.

It should be noted that there is only one CCXML document—business logic document—for a device type. Though there are many devices for a particular device type, each device has a distinct GUID and a distinct property CCXML document. However, there is only one device type CCXML document. For example, a SIP handset device type has one root CCXML document. Thousands of customers may each have five SIP handset devices, and so there would be five thousand SIP handset devices each of which has one property CCXML document.

The CCXML interpreter 72 then sends an hdap.initialized event to the parent device 422 at step 438, thus informing the parent device 422 that the child device 428 has been initialized. The CCXML interpreter 72 also sends a fetch.done event to the properties CCXML at step 439, after which the properties CCXML sends a goto to the CCXML interpreter 72 at step 440 to transfer control of the CCXML document. The CCXML interpreter 72 can thus start executing the contents of the CCXML document.

The CCXML interpreter 72 then sends a ccxml.loaded event message to the child CCXML 428 at step 441, and the child device begins performing the logic that was loaded. Once the loaded message is received, the child CCXML 428 then receives the hdap.receivecall message from the CCXML interpreter 72 at step 42. At step 443 then, the child device 428 begins executing its primary business logic. The child device 428 begins to execute its logic after the loaded message is sent to the body of the child's CCXML document.

After performing its logic, the child device 428 sends an hdap.ready back to the parent device 422. The hdap.ready is actually sent to the CCXML interpreter 72 at step 444 via a send statement that requests the CCXML interpreter 72 to forward the hdap.ready to the parent device 422. Subsequently, the CCXML interpreter 72 sends the hdap.ready to the parent device 422 at step 445.

The call has thus been sent and the child device 428 has executed its functionality (on the hdap.receivecall), and has sent an hdap.ready back to the parent device 422. The parent device 422 knows that the child has performed its initial functionality and that the child device 428 is running Next, the parent device 422 moves its session along with a connection object to the CCXML interpreter 72, which in turn sends the session to the child. At step 446, the connection object is moved (via a move command) to the CCXML interpreter 72. The connection that was originally held by the parent device 422 is thus moved to the child device 428. At step 447, a send command forwards the connectionid to the child device 428. No return message is received, though of course error handling logic (not shown) is present in this and the other executed commands as well. After sending the connectionid to the child device 428, the CCXML interpreter 72 informs the parent device 422 of success by sending a move-.successful message to the parent device 422 at step 448.

At step 449, the parent device 422 issues an hdap.start command to the child CCXML with the connection id parameter to indicate the call to start. It will be noted that an optional conference id parameter may also be included if the call is a conference call. In this nominal case example, only the connection id is passed since it is not a conference call.

At step 450, the child CCXML may perform more activity via its business logic. Once the child CCXML has finished its activity, it issues an exit to the CCXML interpreter 72 at step 451 to indicate that all activity is done. The CCXML interpreter 72 then sends an exit back to the parent device 422, at step 452, so that the parent knows that the child device 428 no longer exists and the call is finished.

Figure 17:
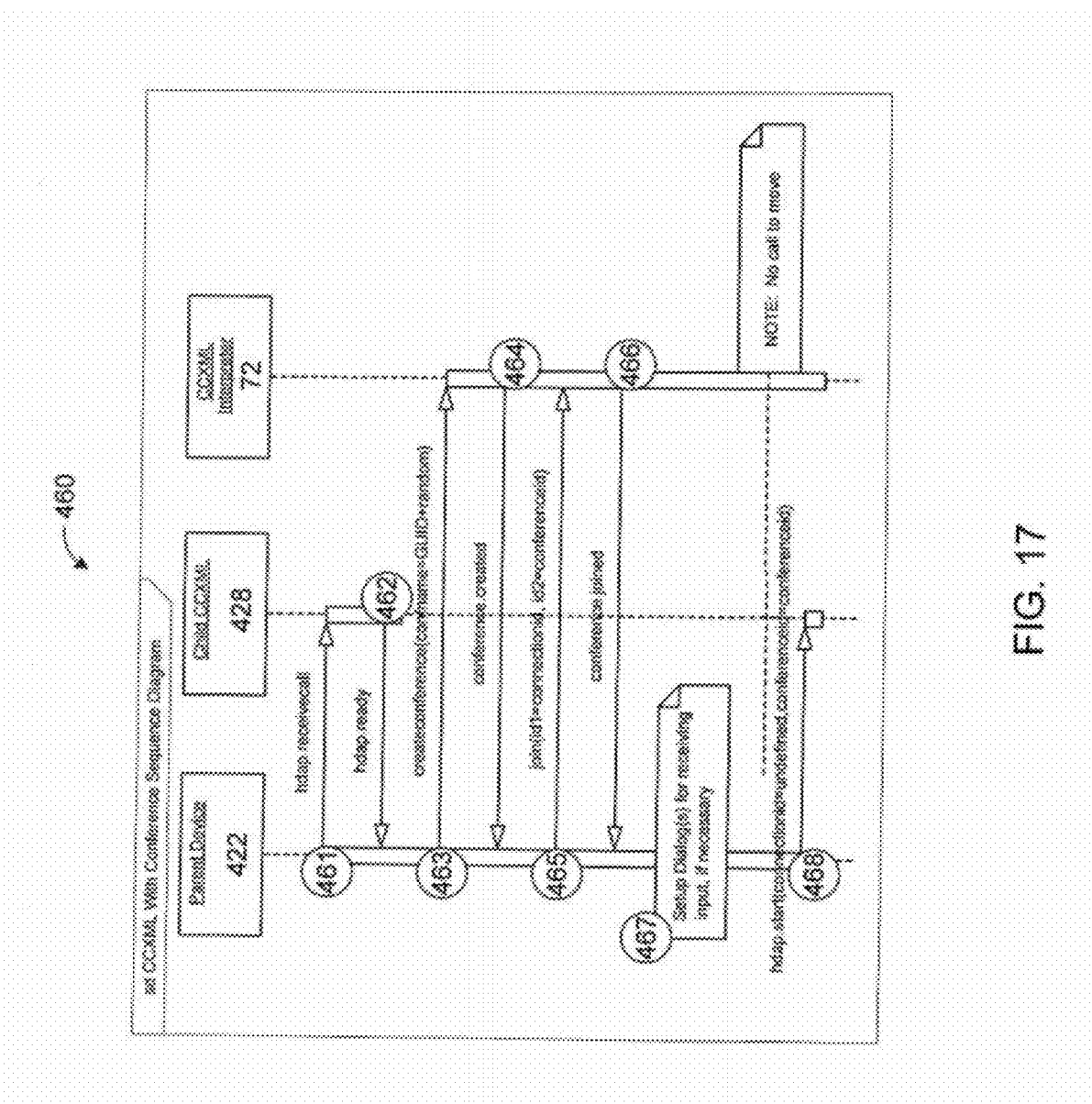
FIG. 17 is an exemplary sequence diagram illustrating a parent device creating a conference.

3.8.5 CCXML Sequence for Parent Device Receiving Input after Instantiating Child FIG. 17 is an exemplary sequence diagram 460 illustrating a parent device creating a conference. A parent device 422 instantiates a child device, but then continues to receive input from or about the connection.

At step 461, the parent device 422 determines that a conference call is to be created and that a child device is to be invoked. The parent device 422 sends a hdap.receivecall to the child device's CCXML 428. At step 462, the child device does its necessary processing and sends a hdap.ready event to the parent device. The parent device 422 now knows that the child device 429 is running At step 463, the parent device 422 executes a create conference element by sending a createconference call to the CCXML interpreter 72. The confname attribute is the GUID for the current device appended with a random identifier. The CCXML interpreter creates the conference and then indicates completion by sending the event conference.created to the parent device 422 at sep 464.

At step 465, the parent device 422 then executes a join element in response to the conference. created event. The attributes for the join are the conference id corresponding to the conference that was just created, and the connection id passed in from the hdap.start event that invoked the parent. At step 466, the CCXML interpreter 72 joins the two objects together and signals completion by sending the conference-.joined event to the parent device 422.

If the conference requires any inputs from the user, such as pin ids, conference bridge numbers, that additional logic is handled by a VoiceXML document. The CCXML Interpreter 72 performs any necessary logic at step 467 for creating dialogs to accept user input or setting states to know how to process signaling events if inputs are necessary. Dialog handling for input is done through VoiceXML. User interaction or input is handled by VoiceXML.

At step 468, the parent device 422 sends the hdap.start event to the child device's CCXML 428 with an undefined connectionid and the conferenceid corresponding to the conference created. The hdap.start command starts the conference.

Processing then continues at step 449 of the sequence in FIG. 16 above.

It is important to note that the parent device 422 did not use the move element to pass the connection object to its child session; the parent device 422 continues to own the connection and will receive signaling events. In addition to instantiating the child device, a conference was started via the CCXML interpreter 72, and then the parent device 422 joined the call that was on-going to the conference device. Thus the connection is now in the conference device.

As opposed to handing off the connection to another child device, the parent device 422 started a conference and then added the call into the conference.

3.8.6 Application Server

Figure 18:
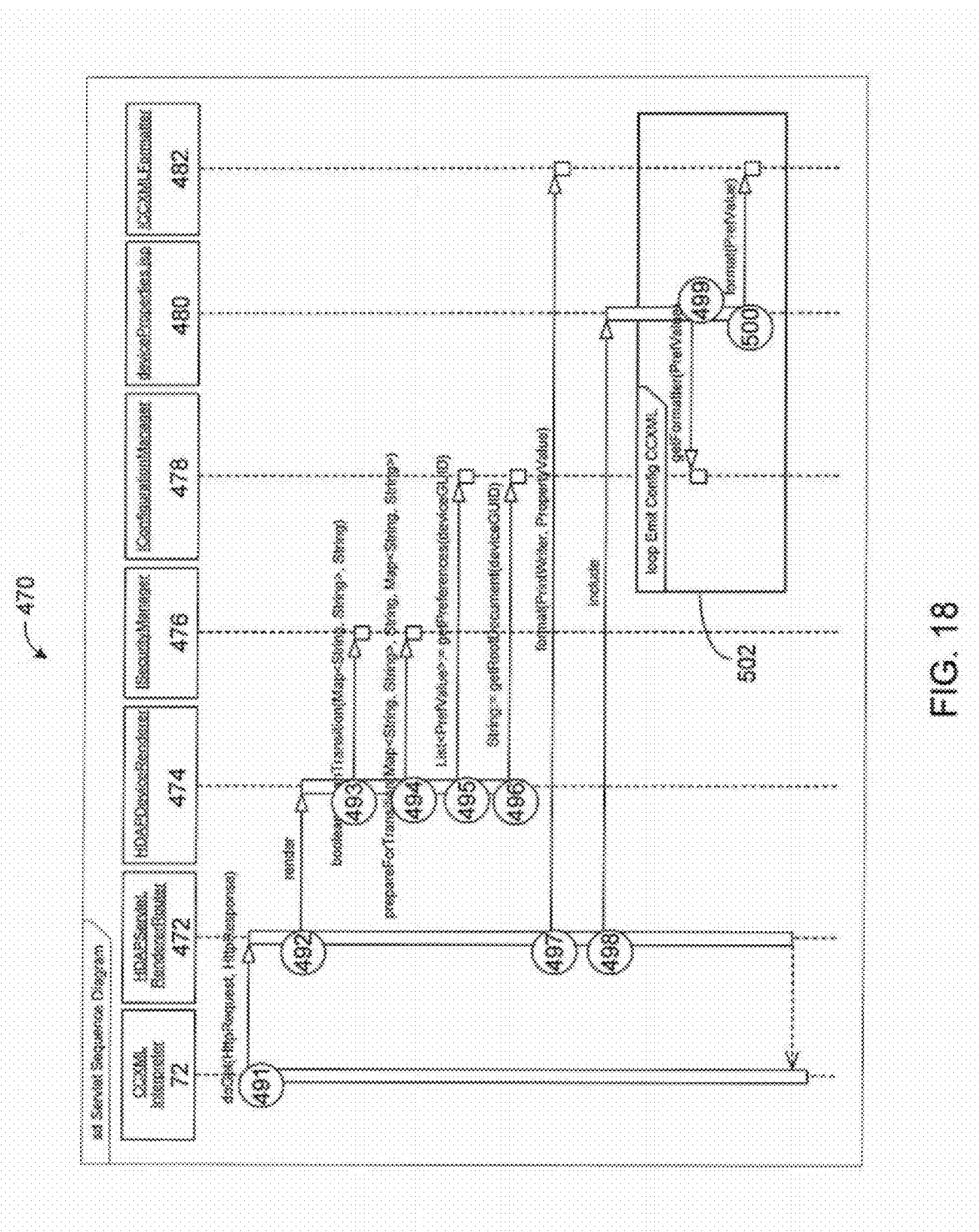
FIG. 18 is an exemplary sequence diagram illustrating the processing that occurs at the application server when the CCXML interpreter requests the properties document of a telephony device.

FIG. 18 is an exemplary sequence diagram 470 illustrating the processing that occurs at the application server when the CCXML interpreter requests the properties document of a telephony device 110.

The CCXML interpreter 72 determines, at step 491, that a transition is needed and issues a doGet request for a properties document of a telephony device 110.

At step 492, the CCXML Interpreter 472 performs an HTTP GET request to the HDAPServlet 472. The servlet receives the request, determines that it's a render request and sends it to the RendererRouter 472. The router then sends it to the HDAPDeviceRenderer (renderer) 474, which extends IDocumentRenderer.

The renderer 474 asks the ISecurityManager 476, at step 493, if the transition is allowed. The map of request parameters received as a parameter to the render request is passed to the ISecurityManager 476. One of the request parameters contains the previous session GUID. The current request GUID is also be passed.

a. If the transition is not allowed then the render method creates a RenderOutput object and returns the failed JSP page, which will generate a CCXML document that logs the invalid transition to the log and terminates the call. The sequence is then done.

b. The security manager implementation will find the XHDAP-PARENT-GUID identifier. It will then search the database for a configuration property with the type of device connection whose GUID is the one from the header and the value matches the GUID passed as a parameter to the method.

At step 494, the renderer 474 passes request map, the requested GUID and a blank response Map to the ISecurityManager 476.

a. The Security Manager implementation adds a new entry to the response map named X-HDAP-PARENT-GUID with a value of the GUID about to be transitioned to b. The HDAPServlet appends the map as HTTP headers to the HttpResponse object from the RendererOutput object.

At step 495, the renderer 474 asks the IConfigurationManager 478 for the device object for the indicated GUID.

a. The configuration manager implementation asks the configuration loader implementation to load the device and all the properties for the given GUID b. The loader executes a query against the database and returns a list of the value objects from the database. These objects will be DeviceProperty objects The renderer 474 iterates over the list of properties.

a. It calls getFormatter on the IConfigurationManager for the type of the current DeviceProperty b. On the formatter returned, it calls format, passing the DeviceProperty c. The formatter generates the appropriate CCXML as a String object and returns it d. The renderer 474 puts this generated CCXML into a list At step 496, the renderer 474 puts this list of generated CCXML into the RendererOutput to be retuned.

At step 497, the renderer 474 puts the root CCXML document into the list of properties in the RendererOutput.

The monitoring component is updated that the device is about to begin execution (not shown).

The servlet delegates to the JSP page specified in the renderer's return value (the page was found by setting the parameter in the Spring configuration file).

At step 498, the JSP writes the CCXML header to the HttpResponse's output stream or writer. This header includes the XML prologue, CCXML root element, eventprocessor element, and event handler for error.semantic and fetch.done.

The JSP iterates over the list of configured properties, outputting the CCXML generated by the formatters.

At step 499, the JSP appends CCXML fetch element to the CCXML with an attribute for the device's root CCXML page.

At step 500, the JSP appends CCXML to close the elements opened in the header.

It should be noted that the action between ConfigurationManager and deviceProperties.jsp is significant, where getFormatter(PrefValue) is retrieving the properties back and emits it as a configuration ccxml document (see box 502). thus, the CCXML document goes back from the application server to the CCXML interpreter 72.

3.8.7 HDAP CCXML

HDAP CCXML is the CCXML document that is typically configured as the default CCXML document 504 for the CCXML interpreter 72 supporting the device platform 100. FIG. 19 shows the event handlers that HDAP CCXML must support. The HDAP CCXML document is responsible for receiving standard CCXML events and transforming them into the HDAP events described previously. Thus, the HDAP CCXML is responsible for starting execution of the correct configurable software-implemented telephony device 110. For calls initiated from SIP Handsets registered with the system, the execution is started in the SIP Handset CCXML. For all other devices, the execution is started at the root switch.

It should be noted that since the HDAP CCXML document is configured as the default CCXML document 504 for the CCXML interpreter, all calls begin by executing this document.

3.9 Server Side Processing

Some telephony devices 110 need the ability to interact with databases, file systems, or perform processing that isn't easily accomplished in a computer executable document such as the CCXML document. For actively executing CCXML documents, this is accomplished with event handlers. The CCXML session sends an event to the application server 90, which then routes the call to the registered event handler for the component. The event handler can then perform whatever processing is needed.

If a response needs to be sent to the CCXML session, the event handler can return a ResponseEvent object that will be routed back to the originating CCXML session.

3.9.1 CCXML Related Application Server Processing

This section describes how the application server will deal with CCXML, both handling events from the sessions and generating any dynamically needed resources.

Devices should be built of a single CCXML script. When a script needs additional data at runtime available from the CCXML server it will send an event to the application server 90 from which it was loaded, that is routed to the appropriate handler. This event will have the ability to route an event back to the CCXML session containing the data needed.

Transitions between CCXML pages should only happen when the structure of the CCXML must dramatically change based on actions that happen during runtime.

The CCXML document for a device should be in a static CCXML file if at all possible. If the contents of the CCXML document must change at runtime then the CCXML document will be generated in the application server 90 using a renderer and JSP page for the actual rendering.

The HDAP device platform has one servlet that services requests of both types. Based upon the request, the servlet will determine either the event handler or renderer to execute and pass the request off to that object.

3.9.1.1 HDAPServlet

Figure 20:
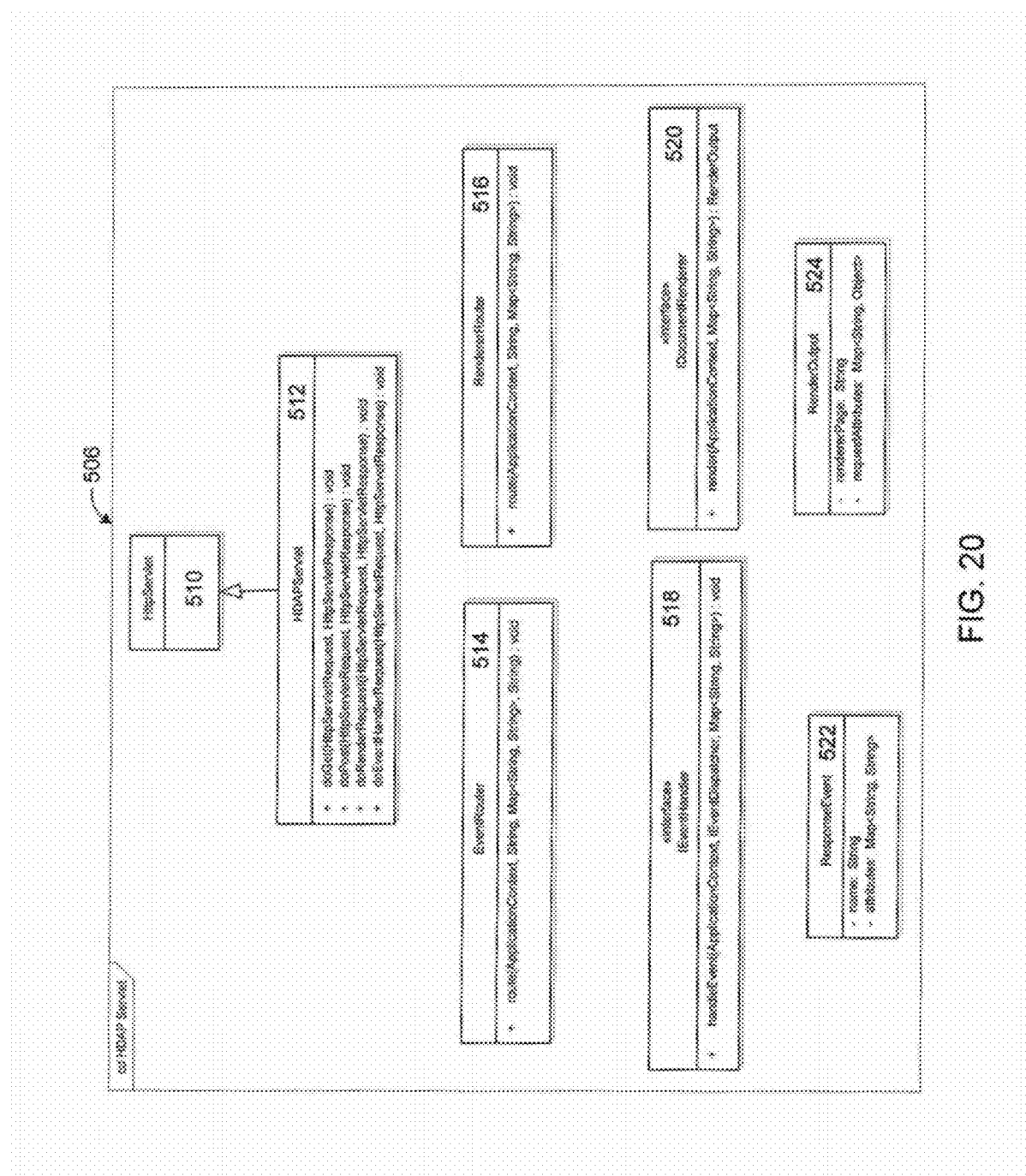
FIG. 20 shows an exemplary HDAPServlet in the application server for servicing requests for the render CCXML or event handling.

FIG. 20 is an exemplary HDAPServlet 512 for servicing requests for the rendering or event handling. The HDAPServlet 512 is the only entry point to the application server 90 for CCXML related requests. For both the doGet and doPost methods this class examines the requested URL. If the path info starts with /ccxml then the doRendererRequest method is called. If the path info starts with /event then the doEventHandlerRequest method is invoked.

The doEventHandlerRequest method finds the EventRouter 514 from Spring 534. At this point it completes the HTTP request with an OK status. It then delegates the request to the EventRouter 514 object.

The doRendererRequest method finds the RendererRouter 516 from Spring 534. It then invokes the render method which returns a RendererOutput object. The method copies the values of the RenderOutput's requestAttributes map to the HttpServletRequest object using the setAttribute method. It then uses the servlet's RequestDispatcher to include the contents of the rendererPage value specified in the RendererOutput 524 object.

3.9.1.2 EventRouter

The EventRouter 514 is responsible for sending requests to the appropriate event handler. The EventRouter 514 has one method, handleEvent, that is responsible for finding the appropriate event handler, configured in Spring 534, and invoking it.

The event handler is found by creating a string with the component name, found from the request context passed in (servlet sends its path info). It then appends the event name from the request, found in the name attribute in the parameter map. It uses this as a key to find the appropriate event handler in the Spring configuration.

The bean returned from Spring 534 should be a transaction proxy to the actual event handler. The proxy will delegate to the actual event handler, which will perform the logic necessary to handle the event.

It is likely that the event handler will want to respond with an event. The event handler can return a ResponseEvent 522. This object will then be used by the EventRouter 514 to invoke the IEventDispatcher (not shown) to send the event to the CCXML session that sent the event.

3.9.1.3 RendererRouter

The RendererRouter 516 is responsible for sending requests to the appropriate renderer. The RendererRouter 516 has one method, render, that is responsible for finding the appropriate renderer, configured in Spring, and invoking it.

The renderer is found by examining the request context passed in (the servlet sends its path info). It uses this to find the appropriate bean from Spring 534. The bean returned from Spring should be a transaction proxy to the actual renderer. The proxy will delegate to the actual renderer, which will perform the logic necessary to load the data needed to renderer the page. The renderer will return an instance of RendererOutput. This object holds a map of objects that are needed to renderer the request and the name of the resource for the view engine (in the default case the servlet engine) to invoke to render the actual request. This value will be set through the Spring configuration and isn't hard coded into Java. The RendererRouter 516 is responsible for sending requests to the appropriate renderer. The RendererRouter 516 has one method, render, that is responsible for finding the appropriate renderer, configured in Spring 534, and invoking it.

The renderer is found by examining the request context passed in (the servlet sends its path info). It uses this to find the appropriate bean from Spring 534. The bean returned from Spring 534 should be a Transaction Proxy to the actual renderer. The proxy will delegate to the actual renderer, which will perform the logic necessary to load the data needed to renderer the page. The renderer will return an instance of RendererOutput. This object holds a map of objects that are needed to renderer the request and the name of the resource for the view engine (in the default case the servlet engine) to invoke to render the actual request. This value will be set through the Spring configuration and isn't hard coded into Java.

3.9.2 Event Request

Figure 21:
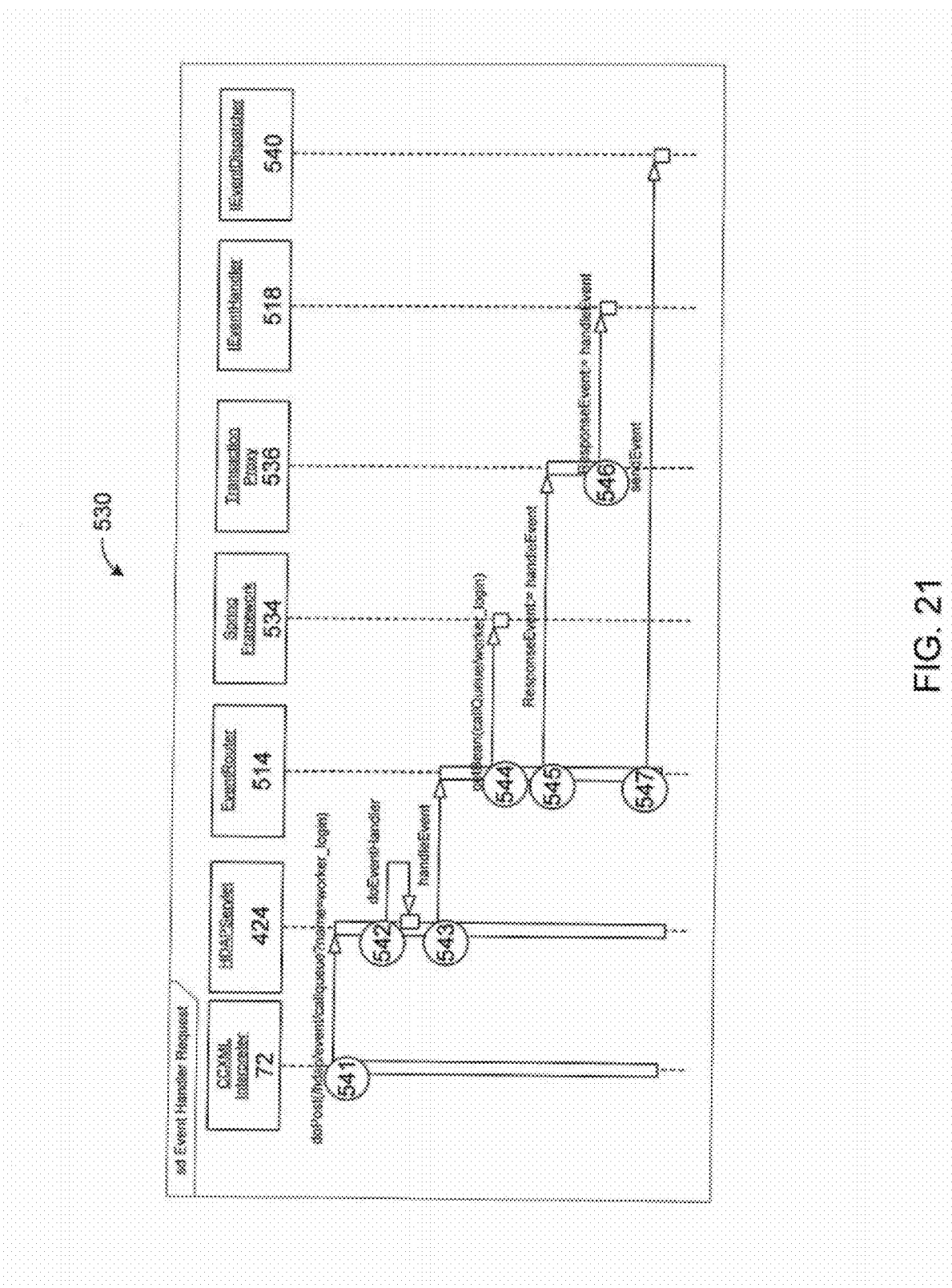
FIG. 21 is a sequence diagram that illustrate an application server handling an event handling request.

FIG. 21 is a sequence diagram that illustrate an application server handling an event request.

A CCXML script invokes a send element in the script. The target type is basichttp and the target destination is /hdap/device/component. The data is the event name and any parameters for the event are passed in the namelist. For this exemplary sequence a component of callqueue and an event name of worker_login are used. At step 541, the CCXML interpreter 72 sends an HTTP POST request to the server that it loaded the page from as determined by the base URL of the CCXML document.

At step 542, the HDAPServlet 424 receives the request because it is registered to intercept all requests to /hdap/event. It examines the requested URL and determines that it is a request for the eventing function and invokes its doEventHandler method. At step 543, The doEventHandler method invokes the handleEvent method on the EventRouter 514 that it loaded at the servlet's startup time.

After finding a valid event router, the doEventHandler method sets the response's status code to OK and then ends the response. It passes the path info for the servlet request as the request context (trimming any leading slashes) and converts the request parameters into a map of strings.

At step 544, the EventRouter 514 determines the component for the request by using the request context passed it. It then determines the event name from the request map passed in. It combines these two by placing a dot between them to form one string. In FIG. 21 this would be callqueue.worker_login.

At step 544, the EventRouter 514 loads the bean with the name that was determined.

Spring 534 returns the bean registered at the name, which should be a transaction proxy 536 that delegates to the actual event handler.

The EventRouter 514 calls the handleEvent on the proxy that it received which then delegates to the actual event handler at step 545. Then the event handler performs its work needed to process the event at step 546. If a response event is necessary, the event handler returns a ResponseEvent 522 object.

At step 547, the EventRouter 514 eventually receives the ReposeEvent 522. It then takes the fields in this object and passes them to the IRequestDispatcher, which sends an event to the CCXML session.

3.10 Configuration Listening

Some devices need to perform actions when its configuration changes and not wait until the next call invocation. One example would be the music on hold device—when the audio files are updated, and possibly removed, the music on hold device must be notified of the change since the device's conference might be long running, servicing multiple calls.

Another example would be the SIP handset device that needs to update the provisioning system anytime its properties are changed.

A device can optionally declare, in its DeviceType, a configuration listener object. This configuration listener will be notified whenever the configuration graph changes. It is important to note that the listener is associated with the device type and not the individual devices.

Configuration listeners allow devices to register for notifications when the configuration of any device changes.

3.10.1 System Init
1. ConfigurationManager is instantiated from Spring
2. Spring sets the Configuration Loader on the Configuration Manager object.
3. The Configuration Manager loads all the device types in the database
4. For each device type, it checks if they have a configuration listener defined
5. If a configuration listener is defined, the Configuration Manager instantiates the listener
6. The ConfigurationManager then registers it as a listener for its declared types 3.10.2 Device Change
1. The ConfigurationManager successfully updates the database to change a device's configuration
2. The ConfigurationManager finds all the listeners who are listening for changes of the device type that was just modified
3. For each listener, the Configuration Manager:
   a. If the device type for the listener matches the device type that fired the event then the listener is considered authorized (if the event was able to be fired then the account must have one such device), skip step b.
   b. Load all the device instances of the type of the listener. For each device instance:
      i. If the owner of the device loaded in step B can edit the device that triggered this process then the listener is considered authorized
   c. If the listener is authorized, invoke the listener's on ConfigurationChange method Steps 3, 3a, and 3b are included to prevent possibly malicious devices from being able to receive update data that contains potentially sensitive information from the entire system. The general approach here is if a user has installed a malicious device in their configuration graph then that device can see all your information and potentially grab the information. However, if the user hasn't installed the device in their graph, then they are not at risk, unless their provider (or provider's provider, etc) has installed the device.

4.0 TELEPHONY SUPPORT FOR MULTIPLE PROVIDERS

The device platform 100 is designed to support multiple providers servicing multitudes of customers each, all out of a single cloud-based system. The key design features that are implemented in order to support multiple providers are:
a) support for accounts 344 to be different account types 342
b) support for an account hierarchy where each account has a parent account (except the operator of the system who is at the top of the hierarchy)
c) ability to relate a telephony device 110 to a specific service of a specific account
d) ability of a telephony device 110 to be easily customized and transformed into another device so that functionality of a PBX device 204, for example, could be different for one provider's customers versus another e) ability to roll up billing for all customers of a provider up to the provider and bill the provider for all his customers f) ability of permissions framework to hide the devices from users and accounts that are not allowed to modify or use them, thus allowing secure co-hosting of multiple providers devices in the same system.

5.0 CACHING

5.1 Solution Overview

The cache is built so that it can hold different types of data. In its first implementation usages it will hold the DID Route Cache, used for finding the set of devices to process a call as well as a DID's status, and the SIP ID Cache, used to find the SIP Handset for a given SIP ID.

The contents of the cache (DID Route or SIP ID) are stored in a database table in addition to the cache. This information is pushed into a third party component (memcache) by executing a stored procedure to get the updated data and passing it back to the invoking Java code that then updates memcache. Each server consults with memcache when it needs the cached data.

More specifically, a database trigger runs whenever the data changes. This populates a dirty table with the details of the change. A Java thread (running on one or more servers in the JBoss/HDAP process) wakes up and finds all the dirty entries. It removes the dirty entries, calculate new routes for them, and then update both the cache table and memcache.

5.2 Design Overview

Memcache is installed onto several servers that hold the cached data. On process startup, all of the cache data is put into the cache by invoking a stored procedure in the database that retrieves the data and a command line application that performs a bulk load of the memcache server.

A generic CacheManager object has been created that manages loading cache data from a memcache client connected to the memcache server. This manager adds a different prefix to the key requests based on parameters set via Java Spring injection The memcache client then contacts the server and retrieves the requested value. The various places in the code that need to access the cache data (SwitchEventRouteHandler and DevicePropertiesRenderer) then receive (via Spring) an instance of CacheManager configured for their cache.

Triggers are installed on the appropriate database tables and insert an entry into a dirty table when a cache entry might have become invalid. Periodically, HDAP (device platform 100) executes a stored procedure that, based on data in the dirty table, removes the old cached data and inserts new cache data as necessary. After updating the cache table the stored procedure returns the new routes and the Java code updates the memcache server.

There is more than one memcache server, each with its own entire contents of the cache. Each HDAP server has one primary and one or more secondary memcache servers. The stored procedure update procedure needs to update each server.

5.3 Deployment Overview

Figure 22:
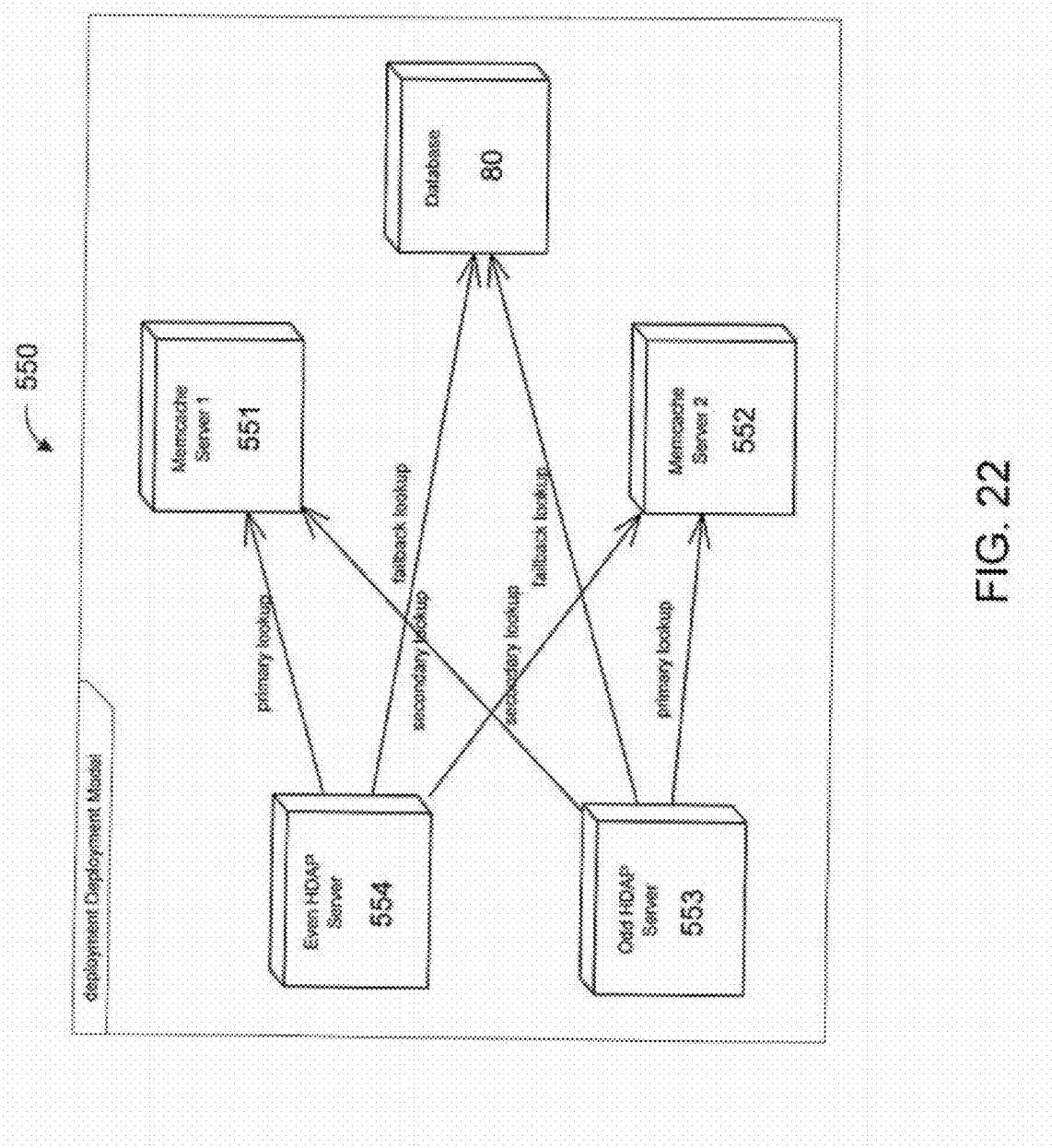
FIG. 22 is an illustration of the cache redundancy scheme.

FIG. 22 illustrates that there are two cache servers 551, 552 deployed in production for a caching subsystem 550. Half of the HDAP servers 553, 554 will contact one server as its primary and if that fails they will contact the secondary cache server. If both servers are down or disabled through configuration, then the database 80 will be consulted.

5.4 Sequences

5.4.1 Populate Dirty Table

Figure 23:
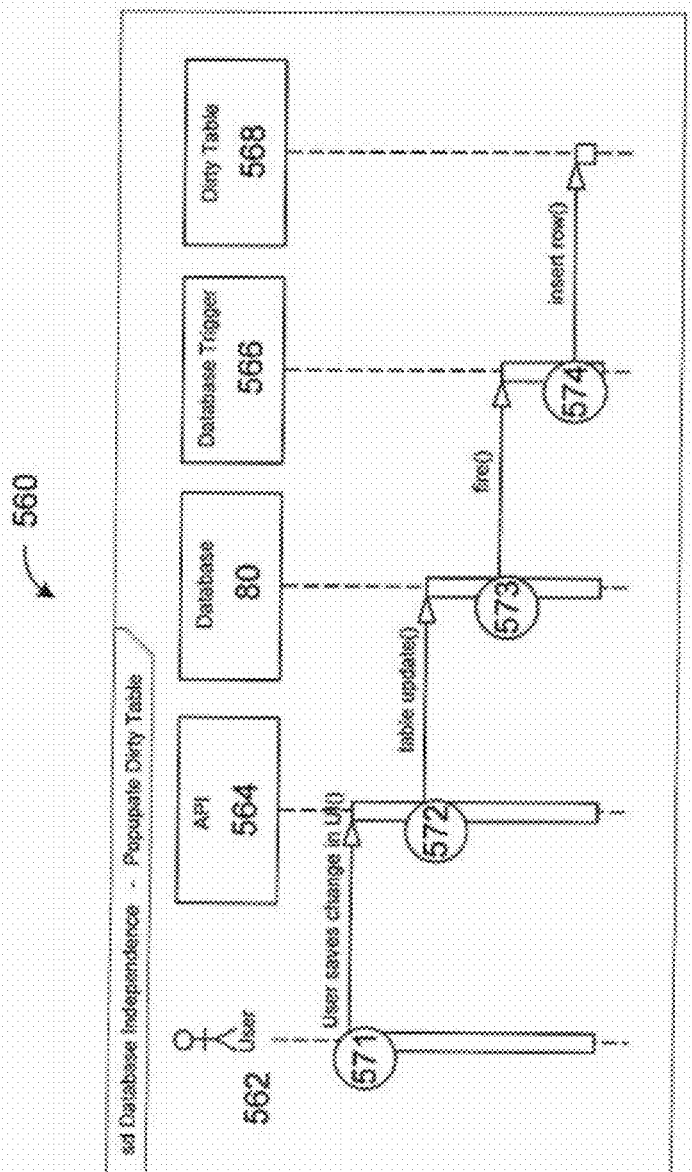
FIG. 23 is a sequence diagram that illustrates the populate dirty scheme to detect changes to underlying data that need to be propagated to the cache.

FIG. 23 is a sequence that describes how dirty cache values are detected.

At step 571, a user makes a change in the UI, causing device.device_properties to be changed by the API in step 572. At step 573, the Trigger fires. If the change is to a property whose property type is not device Connection or Phone DID, return and the sequence completes. At step 574, the trigger puts an entry in the Dirty Routes table for the device GUID that was changed, the property value (target device) of the original value and if the change was for a Connection Insert/Update/Delete or Phone DID Insert/Update/Delete.

5.4.2 Clear Dirty Cache Entries

Figure 24:
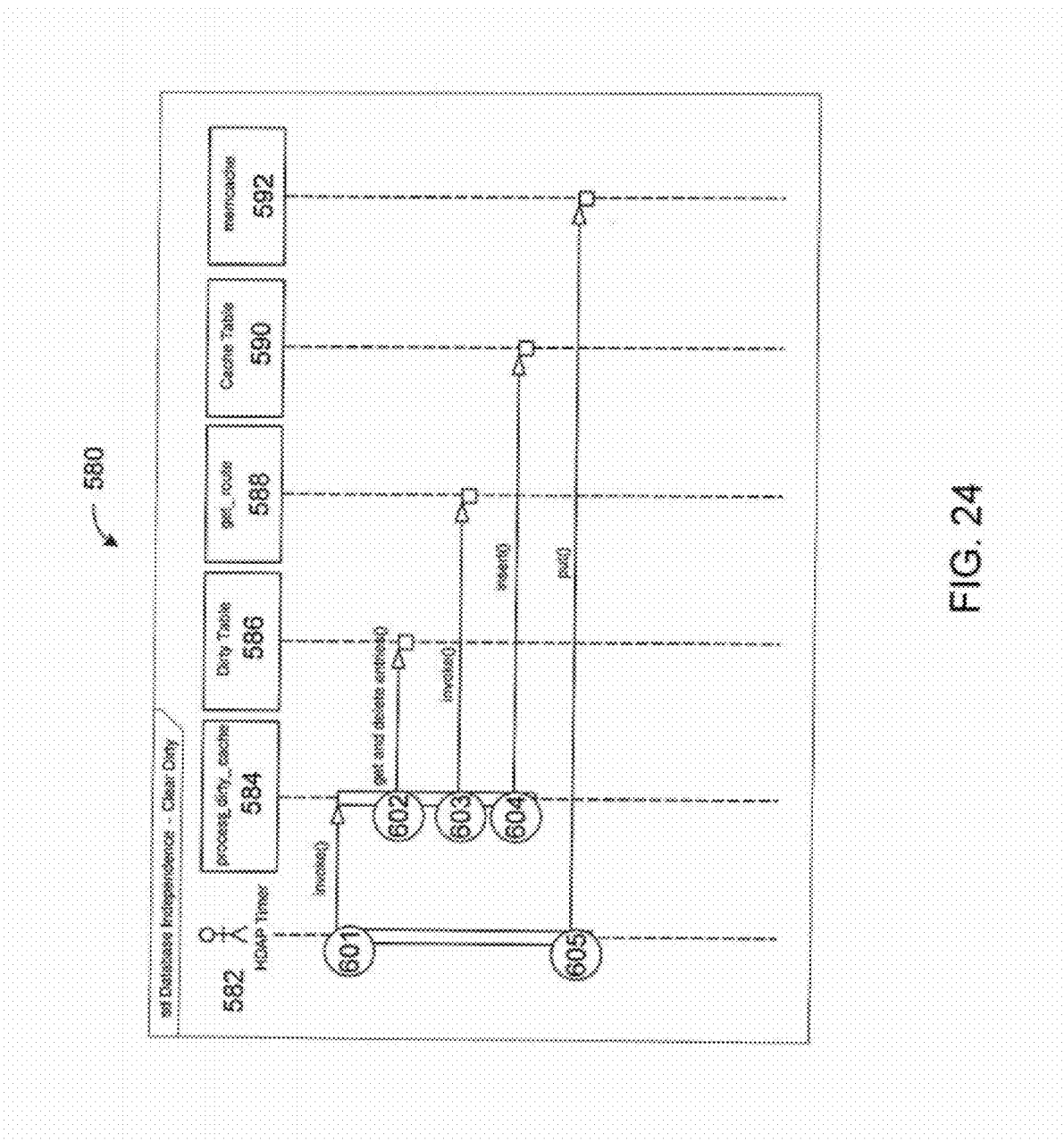
FIG. 24 is a database-centric illustration of the clear dirty scheme that takes pending changes from the dirty table and populates the cache.
Figure 25:
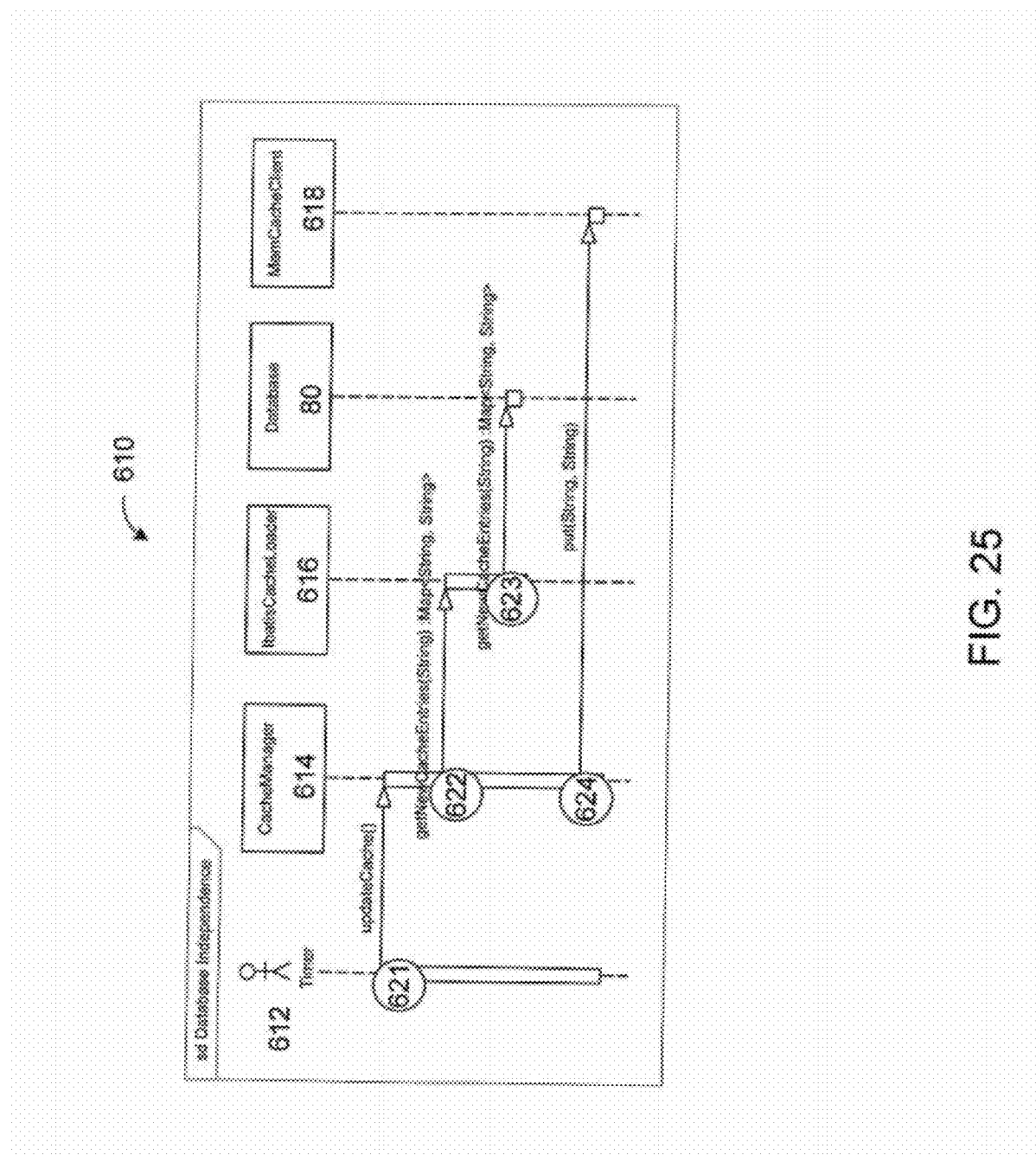
FIG. 25 is an application-centric illustration of the clear dirty scheme that takes pending changes from the dirty table and populates the cache.

FIG. 24 & FIG. 25 together describe the sequence of processing of the dirty cache table that causes the related cache entries to be cleared and populated in the cache.

At step 621, Java timer fires and invokes the CacheManager 614's updateCache method. At step 622, CacheManager 614 invokes the IbatisCacheManager 616's getNewCache entry method, passing the iBatis statement set at startup from Spring. At step 623, IbatisCacheManager 616 invokes the stored procedure identified by the statement passed in. At step 602, the Stored procedure checks the Dirty Routes table. For changes because of a Phone DID change, the route for the Phone DID is removed from the cache table. For changes because of a device GUID change, at step 603 invoke get_route to find all routes that include both devices and remove them from the cache table. At step 603, For all DIDs found in the above process, invoke the get_route stored procedure and put the results into the cache table. At step 604, in the case get_route doesn't return a route, check the DID's status and insert that into the cache table. Stored procedure returns all the new cache data to the invoking Java code. At step 605, Java puts the result gathered into ALL configured memcache servers.

NOTE: This process will be duplicated on one or more, but not all HDAP servers to allow for servers to be restarted or fail NOTE: If the put into a memcache server fails, the DID is placed back into the dirty table at step 604 so its processed later

5.4.3 Cache Utilization, Memcache Available Scenario

Figure 26:
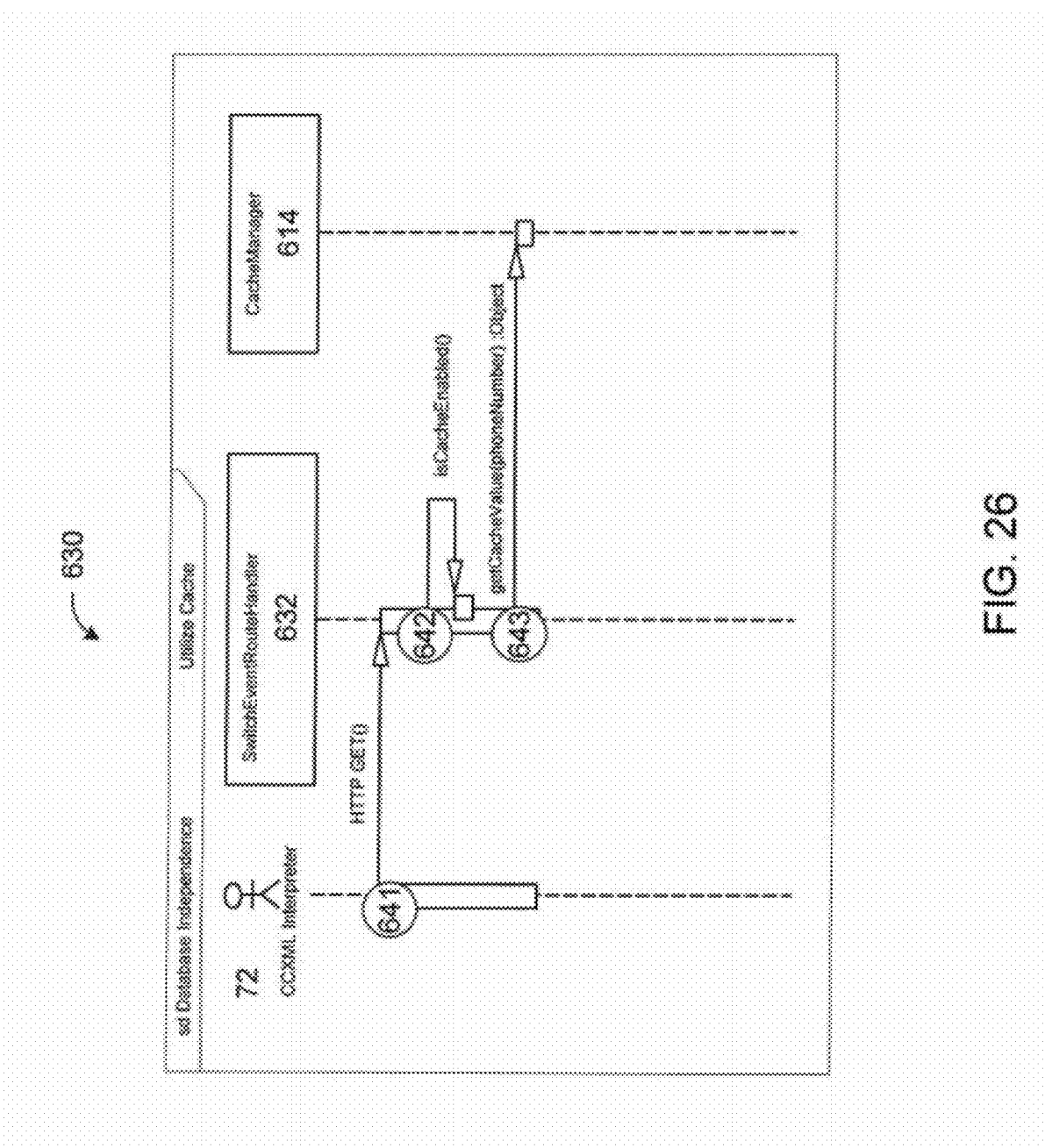
FIG. 26 is a summarized illustration of how the phone number cache (also called DID cache) is utilized.

FIG. 26 is a sequence that describes how the DID route cache is used.

At step 641, SwitchEventRouteHandler 632 receives a request for a route. At step 642, Read configuration and determine if caching is enabled. Scenario assumes caching is enabled. At step 643, SwitchEventRouteHandler 632 invokes the getCacheValue method in the CacheManager 614 passing the fully qualified DID. CacheManager requests the CacheValue from the memcache based on the cache key it was passed, prepending the CacheManager's key prefix. CacheManager invokes the asynchronous asyncGet method on memcache client, passing the CacheManager transcoder. The CacheManager then calls the Future's get method passing in the configured timeout (timeout is in milliseconds, default is 100 ms). Memcache determines the value communicating with the server and returns this value to the CacheManager. CacheManager, using the transcoder, converts the String value to a Java object. CacheManager receives the value back from memcache and returns it back to the caller. SwitchEventRouteHandler continues functioning as it does today, determining the next device and result codes.

It should be noted that if caching had been disabled, the code would have executed as it does today, invoking get_route and (if necessary) get_phone_number_with_status_beta.

Additionally, it should be noted that if an error had been thrown by the Memcache client or if the read had timed out in the period configured, then the CacheManager would have thrown a CacheException.

5.4.4 Cache Utilization, Memcache Unavailable Scenario

Figure 27:
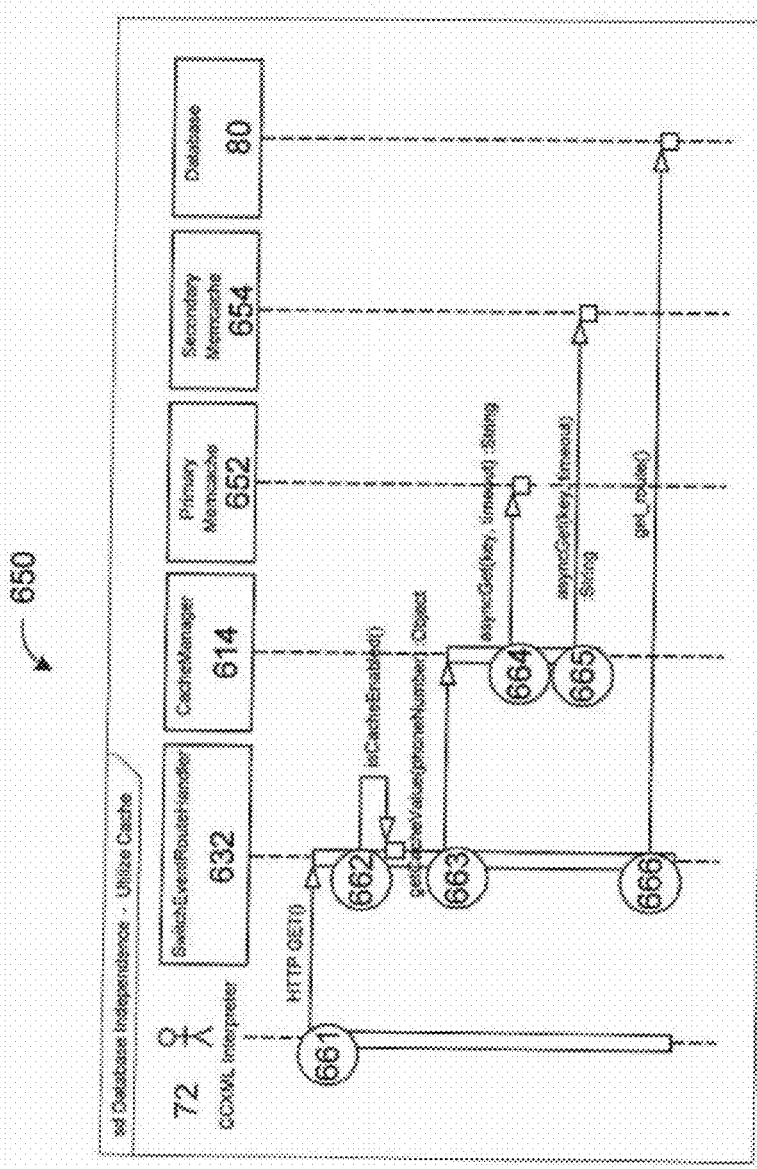
FIG. 27 is a detailed illustration of how the phone number cache (also called DID cache) is utilized

FIG. 27 illustrates the sequence where cache is not available.

At step 661, SwitchEventRouteHandler 632 receives a request for a route. At step 662, read configuration and determine if caching is enabled. Scenario assumes caching is enabled. At step 663, SwitchEventRouteHandler 632 invokes the getCacheValue method in the CacheManager 614 passing the fully qualified DID. At step 664, CacheManager 614 tries to get the value from the primary memcache 652 server. The server fails or the read times out. At step 665, CacheManager tries to get the value from the secondary memcache server. The server fails or the read times out. CacheManager 614 throws a CacheException. At step 666, SwitchEventRouteHandler 632 invokes the get_route method in the database 80 to calculate the route again.

5.5 Classes

Figure 28:
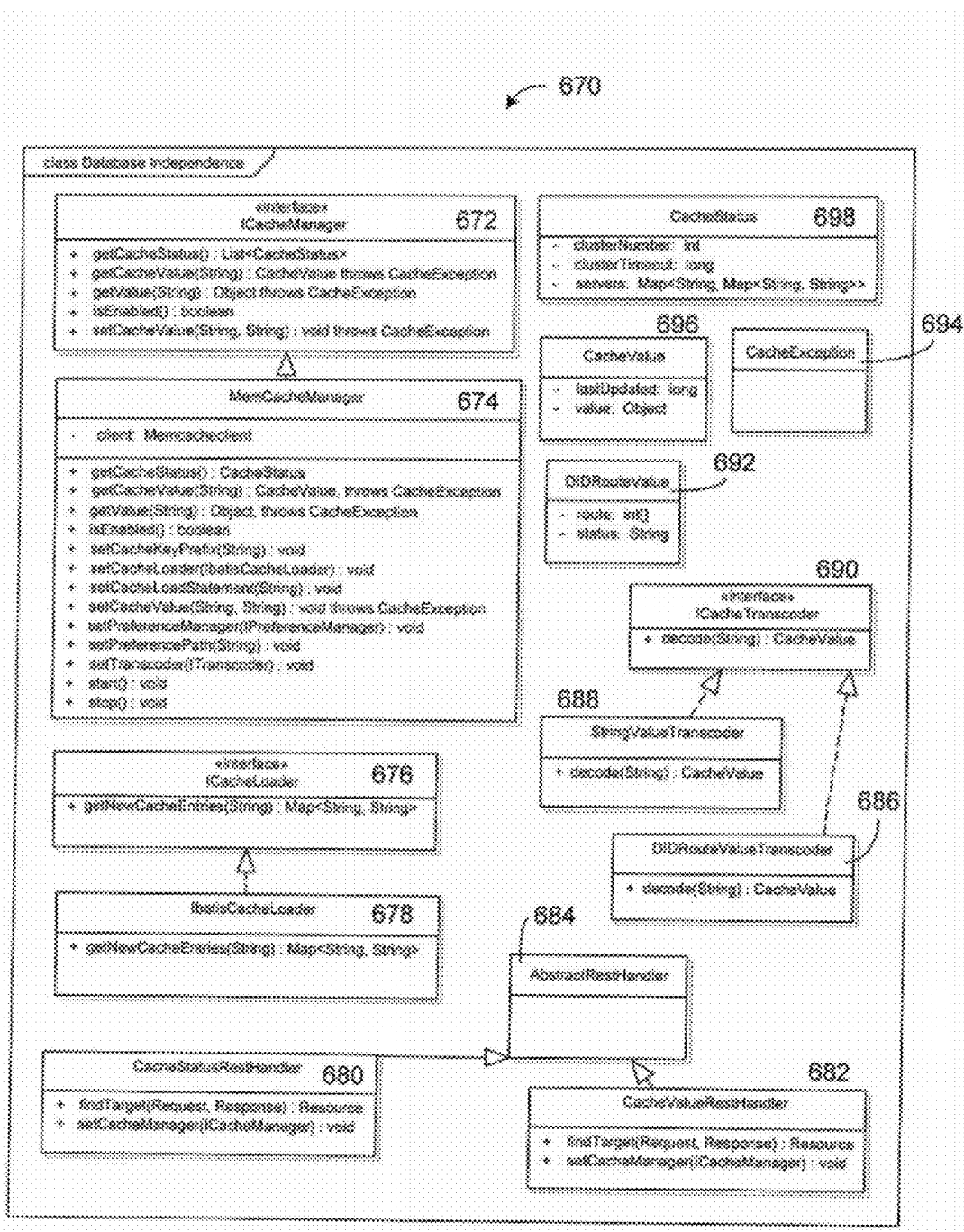
FIG. 28 is a class diagram of the classes that populate and retrieve values from the cache.

FIG. 28 is the class diagram 670 for the caching subsystem 550.

5.5.1 ICacheManager

The ICacheManager 672 interface is the public interaction with the cache.

The getCacheValue method gets the CacheValue associated to a value. The returned value is the live CacheValue object and should not be modified. The getCacheValue throws an exception if none of the cache servers are enabled or if there is an error during the cache retrieval.

The getValue method gets the CacheValue associated to a value. The returned value is the live CacheValue object and should not be modified. This method throws an exception if none of the cache servers are enabled or if there is an error during the cache retrieval.

The getCacheStatus method returns the current status of the enabled cache servers. The result of this call is global (i.e. all CacheManagers using the same server list have the same value)

The is Enabled method returns the current status of the enabled cache servers. The result of this call is global (i.e. all CacheManagers using the same server list have the same value)

The setCacheValue method puts a cache value into the cache. It accepts the value in the raw format stored in the cache. This method throws an exception if one of the cache servers is disabled or if there is an error during the cache storage.

5.5.2 ICacheValueTranscoder

The ICacheValueTranscoder 690 is used by the CacheManager to convert the string values held in the cache into actual values.

The decode method converts a string value retrieved from Memcache and converts it into a CacheValue object holding a domain specific cache value. The format of the string in the cache will vary based on the cache type and are covered in the individual transcoders.

The decode method has type string and is used for cache data being decoded.

It should be noted that since the cache is populated from a database stored procedure, a corresponding stored procedure needs to be created to encode the value.

5.5.3 MemCacheManager

This MemCacheManager 674 class implements the caching infrastructure. The methods implemented by this class that conform to the contract from the interface or are setters used by Spring and aren't repeated.

The start method is called by Spring to complete initialization of this class. Create the memcache client based on configured servers and adds a preference listener to detect config file changes. The listener will stop and start the MemCacheManager when a change is detected. If the server is configured to update the cache, it will add a task to the GlobalTimer to invoke the updateCache at the appropriate time. If the creation of the memcache client fails, it will add a task to the GlobalTimer to reattempt its creation after the duration specified in the preferences file.

The stop method is called by Spring when the application is being shutdown. This method stops the memcache client. This removes the preference listener.

The is Enabled method returns the current cache enabled property. A cache is considered enabled if it has any sources that are enabled.

5.5.4 StringValueTranscoder

The StringValueTranscoder 688 class is used for single cache values like SIP ID. The in cache encoded value is long|string (the long is the last updated time).

5.5.5 DIDRouteValueTranscoder

The DID ValueTranscoder 686 is used to convert a cached string value into a DID route value. The cache stored value is long|int,int . . . |string for last updated time|device guid, device guid, . . . |status.

5.5.6 DIDRouteValue

The DIDRouteValue 692 class is the value object used in the cache for the DID Route cache. These objects are created by iBatis based on the sql mapping file and are used in the SwitchEventRouteHandler as the result of the getCacheValue.

5.6 Database Tables 5.6.1 Cache.Dirty_routes

The Cache.Dirty_routes table holds all the routes that are no longer valid and need to be updated.

5.6.2 Cache.Dirty_Sip_Ids

The Cache.Dirty_Sip_Ids table holds all the SIP ID to device GUID that are no longer valid and need to be updated.

5.6.3 Cache.Cache_routes

The Cache.Cache_routes table holds the currently known route for a given DID.

Cache.Cache_routes indexes on:
1. dt_last_updated
2. phone_number
3. source_device_guid, dest_device_guid
   Indexes will be in tsi_cache 5.6.4 Cache.Cache_Sip_Ids The Cache.Cache_Sip_Ids table holds the current mapping of SIP ID to device GUID mapping.

Cache.Cache_Sip_Ids indexes on:
1. dt_last_updated
   Indexes will be in tsi_cache 5.7 Configuration File This section covers the configuration file for caching.

The top level node of the Caching configuration will be CacheManager. The CacheManager will be a parent to one node per CacheManager instance. Within each CacheManager section will be a list of sources that specify the memcache server to utilize. For each source node, a list of servers and an enabled/disabled flag can be set. Also within the CacheManager section will be the settings for updating the cache. A cacheUpdateFrequency is the number of milliseconds to wait between cache updates. A zero or negative value indicates the cache shouldn't be updated from this server. The cacheUpdateSQLStatement is the SQL statement used to retrieve the cached value.

An example setting is shown below:
Cache Verification
If might become necessary on occasion to determine the status of the cache from one script. One example would be a manually run script, similar to numcalls.

This script executes a wget against each server's routeCache/X or sipIdCache/X URL to retrieve the current cache value and date of the last cache entry update. This script also uses psql to execute a database query to get the value currently in the database cache and a second query to get the current actual value. The results are then be presented in a table.

Cache Cleaning
This section describes the different ways that the cache can be cleaned up in case issues are encountered in production.
1. Complete reset. In the case that the cache needs to be completely rebuilt, delete all the entries from the cached route table, and then run the script that selects all rows from customer.phone_numbers and inserts the result into the dirty_routes table (this needs to be developed for initial deployment as well)
2. Route reset. In the case that a particular route needs to be recalculated, there are two ways to cause it to be reset:
   a. In the UI remove and re-add the phone number to the device
   b. Directly insert the phone number into the dirty route table
   c. Using the API Tester, directly set the cache value 5.8 Monitors
The monitoring system has been updated for these additional monitors:
1. A new process monitor is added, like the JBoss process monitor, that checks for the existence of the memcache process and restart it if its down. Emails are sent for the restart.
2. A Nagios monitor is developed that gets the cache status. The size of the cache is tracked and if the size of the cache is >75% of the configured max then the alert goes into warning. >85% is critical.
3. A Nagios monitor has been developed that verifies the cache is working. This works by fetching the cache value URL for a known valid cache entry.

6.0 THIRD PARTY MARKETPLACE

The design of the device platform 100 enables a third party device marketplace. All of the benefits described in section 4.0 that enable multiple providers to provide services through one cloud-based system, also enable those providers to develop their devices. The modular design of a telephony device 110 allows for easy extension, customization and integration. The data model supports the ability to add new device types, device kits and services without any changes to the device platform 100. The design of the device concept wherein each device knows nothing of the larger application that it is a part of means that devices can easily be retooled and reconfigured into new applications with minimal additional coding.

These attributes of the architecture of the device platform 100 enable third parties to create and sell their devices and services thereof on the device platform 100.

Although the disclosed embodiments and aspects of a VoIP system constructed in accordance with the various inventions are preferably and advantageously implemented with discrete computer-executable device properties documents in association with discrete, reusable, and universal computer-executable device logic documents, it will be understood and appreciated that alternative embodiments within the scope of the invention can be constructed with other forms of reusable code. For example, computer-executable documents in CCXML are not required, but believed preferable. By further example, the configuration information could be provided in a database (high speed cache or other storage) and used to access a reusable, universal device logic document or other form of reusable, universal code. Alternatively, the configuration information could be provided and integrated with reusable device logic to provide a self-contained device properties and device logic document or other form of program module. Other arrangements will occur those skilled in the art.

Further details and descriptions of the disclosed embodiments and aspects of the claimed inventions are found in the accompanying Appendix A, which is incorporated herein by reference and made a part hereof.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A voice over Internet protocol (VoIP) system in which media signals are processed in communication sessions between an originating system and a destination system, by use of at least one software-implemented configurable telephony device comprising at least logic defining a behavior and configuration parameters specific to the telephony device and its behavior, comprising:

a device platform data store associating (a) information corresponding to an account owner, and (b) information identifying at least one instance, on behalf of the account owner, of a telephony device provided in the VoIP system, each instance being identified by a distinct device identifier;

a computer program component corresponding to the software-implemented telephony device identified by the device identifier, the component comprising (a) reusable device logic defining the behavior of the telephony device to provide a configurable telephony function and (b) configuration information comprising specific device properties for an instance of the telephony device, that when utilized with the device logic defines a specific configured instance of the telephony device in the VoIP system that provides a specific telephony function;

a processor responsive to an incoming request from the originating system for conducting a communication session for the purpose of processing signals between the originating system and the destination system, by (a) accessing the device platform data store to determine the device identifier of a telephony device that is to be activated on behalf of the account owner for the communication session, and (b) executing the device logic of the computer program component in accordance with the configuration information to provide the specific telephony function of the telephony device for the communication session on behalf of the account owner; and a document store for storing a computer-executable device logic document comprising the definition of a behavior of a telephony device that provides a specific telephony function, the device logic document comprising code for effecting predetermined device functions required for implementing the specific telephony function;

a document store for storing a computer-executable device properties document containing configuration information comprising specific properties for an instance of a telephony device, that when utilized with a device logic document defines a specific instance of the telephony device in the VoIP system, the device properties document being stored in association with a globally unique device identifier (device GUID) for the telephony device as the device identifier; and wherein the processor is operative to effect instances of the telephony device on behalf of an account owner by carrying out the steps of:
  (1) receiving an incoming request from an originating system represented by a message including at least an identifier of a destination system, the incoming request for initiating a communication session for the purpose of processing signals between the originating system and the destination system;
  (2) in response to the incoming message, accessing the device platform data store to determine the GUID of a telephony device that is to be activated on behalf of the account owner for the communication session;
  (3) based on the GUID, retrieving the corresponding device properties document for the identified telephony device from the document store;
  (4) utilizing the configuration information in the retrieved device properties document to determine specific operational properties of the telephony device;
  (5) determining from the device properties document a corresponding device logic document for the telephony device;
  (6) retrieving the corresponding device logic document from the document store; and
  (7) executing the predetermined device functions of the retrieved device logic document in accordance with the configuration information from the retrieved device properties document to provide the specific telephony function of the telephony device for the communication session.

2. The VoIP system of claim 1, wherein the processor is further operative for:
  based upon (a) the properties of the device as specified in the device properties document, in conjunction with (b) logic of the device as specified in the device logic document, determining to invoke a subsequent child telephony device for the communication session and provide a further telephony function for the child telephony device; and
  executing the above steps recursively to invoke a plurality of subsequent child telephony devices to thereby provide the telephony functions of said plurality of telephony devices.

3. The VoIP system of claim 2, wherein the processor is further operative for receiving input from an end user, and carrying out the steps based on end user input in conjunction with the properties of the device and the logic of the device.

4. The VoIP system of claim 3, wherein the end user input is provided via one or more of the following: dual tone multifrequency (DTMF) signals, a keypad, voice signals recognized by a voice recognition telephony device.

5. The VoIP system of claim 1, wherein, in addition to the logic defining a behavior and configuration parameters specific to the device and its behavior, the telephony device comprises a resource external to the device.

6. The VoIP system of claim 5, wherein the resource comprises one or more of the following: a telephony function provided by another telephony device, voice announcement signals, an answering machine announcement specific to a particular end user, music on hold signals, VoiceXML functions, other data content signals stored in a resource storage device.

7. The VoIP system of claim 1, wherein the device properties document and the device logic document are processed by a document interpreter, and wherein the document interpreter is provided as a computing function integrated with other computing functions for the VoIP system, such other functions including one or more of the following: a VoiceXML interpreter, a SIP handling stack, media signal processor.

8. The VoIP system of claim 1, wherein the device platform data store further stores information identifying predetermined services provided in the VoIP system on behalf of account owner, the predetermined services comprising one of more device kits provided by a system operator on behalf of the account owner.

9. The VoIP system of claim 8, wherein the processor is further operative for, in connection with providing predetermined services on behalf of an account owner:
  providing device kit information in the system comprising the definition of a device kit comprising a collection of a plurality of software-implemented telephony devices;
  storing the device kit information in association with a device kit type identifier (device kit type ID) corresponding to a particular kit of telephony devices;
  providing configuration information comprising specific properties for an instance of a particular device kit, that when utilized with a device kit type information defines a specific instance of a device kit in the VoIP system; and
  storing the configuration information in association with a device kit identifier (device kit ID) for the device kit.

10. The VoIP system of claim 9, wherein the kit comprises one of a plurality of different kit types.

11. The VoIP system of claim 1, wherein the originating system is selected from the group comprising: a SIP handset, an external switch connected to the PSTN network, and an Internet router providing an incoming VoIP call.

12. The VoIP system of claim 1, wherein the destination system is selected from the group comprising: a SIP handset, an external switch connected to the PSTN network, and an Internet router for transmitting out a VoIP call.

13. The VoIP system of claim 1, wherein the device logic document and the device properties documents are CCXML documents.

14. The VoIP system of claim 13, wherein the device logic document and the device properties document are processed by a CCXML interpreter, and wherein the CCXML interpreter is also operative to process other resources required for implementing the specific instance of the telephony device.

15. The VoIP system of claim 14, wherein the CCXML interpreter assigns a session identifier (sessionid) to each of one or more resources required for implementing the specific instance of the telephony device.

16. The VoIP system of claim 1, wherein the computer program component comprises code for effecting predetermined device functions including but not limited to one or more of the following: event processing code, scripting code, session maintenance code, database access, database logic in stored procedures, triggers for functions, variable definitions, URI's to other information, code for executing VoiceXML documents, logical expressions.

17. The VoIP system of claim 1, wherein the specific telephony functions include but are not limited to the following: providing a telephone handset, a PBX, a music on hold function, call transfer, signal filtering, call groups, fax routing, call forwarding, call conferencing, a follow-me function, a recording function, a voice message function, a message playback function, a call queue function, an automatic attendant function, an announcement function, a switching function, a timer function, a phone menu function, a name dialer function, a billing function, a custom third-party provider telephony function.

18. The VoIP system of claim 1, wherein each account owner has a plurality of customers, each of which has one or more telephony devices.

19. The VoIP system of claim 1, wherein the incoming request from an originating system comprises a SIP message, and
wherein the SIP message includes a SIP message identifier of a destination system comprising a DID number for a call external to the originating system and a DID number or an extension number for a call within a system associated with the originating system.

20. The VoIP system of claim 19, wherein the SIP message identifier of the originating system is one or more of the following: SIP ID of the originating system, DID number, caller ID, MAC address of a physical handset.

21. The VoIP system of claim 1, wherein the telephony device further comprises a resource required for implementing a specific instance of the telephone device, wherein the resource comprises one or more of the following: references to another telephony device, one or more VoiceXML documents, a URI to particular audio content, a URI to multimedia content, external code in an application server to perform functions of the telephony device other than those provided in the device logic or the device properties, database logic relating to the telephony device's function.

22. The VoIP system of claim 1, wherein the device platform data store further stores information identifying at least one instance of a telephony device as constituting a root telephony device that is to be initially activated on behalf of an account owner.

23. The VoIP system of claim 22, wherein the root telephony device is a root switch that is activated on behalf of the account owner in response to an incoming call from an external source, and wherein the root switch is operative for routing the incoming call to a subsequent telephony device associated with the account owner.

24. The VoIP system of claim 22, wherein the processor is further operative for determining a routing for the communication session to an ordered sequence of telephony devices, and successively instantiating further telephony devices in accordance with the ordered sequence.

25. The VoIP system of claim 24, wherein a subsequent telephony device immediately following the root switch is a PBX telephony device or a provider-level root switch.

26. The VoIP system of claim 22, wherein the root telephony device is a SIP handset that is activated on behalf of the account owner in response to activation of a physical handset by an end user associated with the account owner.

27. The VoIP system of claim 1, wherein the incoming request represents a call originating from a physical SIP handset that is associated with the account owner and is to be routed to an external destination, and wherein one telephony device comprises operational code for software-implementable functions of the physical handset, and wherein another telephony device comprises operational code for software-implementable functions for a switch that is connected to the PSTN network as an outbound call.

28. The VoIP system of claim 1, wherein the incoming request represents a call originating from a first physical SIP handset that is associated with the account owner and is to be routed to a second physical SIP handset that is associated with the account owner.

29. The system of claim 1, wherein the incoming request represents a call originating from an external source intended for destination equipment within the VoIP system as an inbound call.

30. The VoIP system of claim 1, wherein the incoming request represents a call originating from a handset of an end user of an account owner within the VoIP system intended for a destination within a PBX associated with the account owner (intra-PBX).

31. The VoIP system of claim 1, wherein the incoming request represents a call originating from a handset of an end user of an account owner within the VoIP system intended for a destination within a PBX associated with another account owner (inter-PBX).

32. The VoIP system of claim 1, wherein the device logic document for the telephony function corresponds to a parent telephony device that invokes a child telephony device, and wherein the processor is further operative for:
determining that the telephony function provided by the telephony device calls for the invocation of a related child telephony device, as reflected by the presence of a GUID of a child telephony device;
retrieving the corresponding device properties document for the identified child telephony device that is to be activated on behalf of the account owner;
utilizing the configuration information in the retrieved device properties document to determine specific operational properties of the child telephony device;
determining from the device properties document a corresponding device logic document for the child telephony device;
retrieving the corresponding device logic document for the child telephony device; and
executing the predetermined device functions of the retrieved device logic document in accordance with the configuration information from the retrieved device properties document to provide the specific telephony function for the child telephony device.

33. The VoIP system of claim 32, wherein the GUID of the child telephony device is provided in the device properties document of the parent telephony device.

34. The VoIP system of claim 32, wherein the GUID of the child telephony device is provided from routing information obtained by the parent telephony device, the routing information comprising a subsequent telephony device in sequence of related telephony devices.

35. The VoIP system of claim 32, wherein the invocation of a child telephony device is recursive.

36. The VoIP system of claim 1, wherein a single device logic document is utilized in connection with all instances of a corresponding telephony device type for all account owners, and is referenced by all corresponding device properties documents for that type, whereby there is distinct device logic document for each telephony device type.

37. The VoIP system of claim 1, wherein the processor is further operative for:
providing a network-accessible user interface for allowing a user authorized by an operator of the VoIP system to access and change configuration information of one or more telephony devices, by accessing and changing the information of the device properties documents, such that configuration information changes take effect in the VoIP system in real-time.

38. The VoIP system of claim 1, wherein the processor is further operative for:
providing a network-accessible application programming interface for allowing a user or developer authorized by an operator of the VoIP system to access and change configuration information of one or more telephony devices, by accessing and changing the information of the device properties documents, such that configuration information changes take effect in the VoIP system in real-time.

39. The VoIP system of claim 1, wherein the processor is further operative for:
providing a network-accessible graphical user interface (GUI) for allowing a user or developer authorized by an operator of the VoIP system to access and change configuration information of one or more telephony devices, by accessing and changing the information of the device properties documents, such that configuration information changes take effect in the VoIP system in real-time, and
wherein certain configuration information is represented as a graphical tree, and
wherein the changes are effected by dragging representations of devices in the GUI on specific locations of the tree, and drawing and moving lines between devices to establish device connections,
thereby making the task of configuring aspects of the VoIP system user-friendly and available to a non-technical common user.

40. The VoIP system of claim 1, wherein the device platform data store stores information corresponding to a plurality of telephony service providers, wherein each one of the plurality of telephony service providers has a plurality of account owners.

41. The VoIP system of claim 40, wherein an account owner is any one of the following: a service provider, a direct customer of the VoIP system operator, a customer of a service provider, a branded reseller of services, a private label reseller of services, a PBX operator.

42. The VoIP system of claim 41, wherein a single device logic document is utilized in connection with all instances of a corresponding telephony device type for all account owners of the plurality of telephony service providers, and is referenced by all corresponding device properties documents for all customers of such account owners.

43. The VoIP system of claim 1, further comprising a telephony device database storing information corresponding to one or more telephony devices provided in the VoIP system by a third party device developer; and
wherein the processor is further operative for providing access to the VoIP system by the third party developer to create new telephony devices, and/or customize, extend, and/or integrate existing telephony devices with additional functionality, to thereby provide a third party device marketplace.

44. The VoIP system of claim 1, further comprising a telephony device database storing information associating:
(a) information identifying one or more telephony devices provided in the VoIP system by a third party device developer; and
(b) telephony device usage information identifying the usage of the one or more telephony devices provided by the third party device developer by account owners; and
wherein the processor is further operative for:
tracking the usage of one or more of the telephony devices provided by the third party device developer by a particular account owner;
storing telephony device usage information in the telephony device usage database corresponding to usage of one or more of the telephony devices provided by the third party device developer by the particular account owner; and
providing a financial credit to the third party device developer in accordance with the telephony device usage information,
whereby an account owner that utilizes a telephony device provided by a third party device developer can be charged a fee for the utilization according to a usage schedule.

45. The VoIP system of claim 1, further comprising:
a high speed cache for storing of device properties documents, SIP identifiers (SIP ID), and SIP handset device GUIDs; and wherein the processor is further operative for:
in response to the incoming request from the originating system represented by the SIP ID in the SIP message, accessing the high speed cache to extract a corresponding SIP handset device GUID; and
accessing the high speed cache using the extracted SIP handset device GUID to retrieve the corresponding device properties document for an initiating SIP handset.

46. The VoIP system of claim 1, further comprising a high speed cache for storing (a) device properties documents, (b) target phone numbers associated with an account owner, (c) the GUID of a telephony device associated with each phone number of the account owner, including a root telephony device that is first invoked in response to an incoming call, and (d) the route, in the form of an ordered sequence of device GUIDs of the list of telephony devices that have to be invoked to reach the telephony device associated with the phone number of the incoming call; and
wherein the processor is further operative for:
in response to an incoming request from the originating system represented by an incoming call directed to a target phone number associated with the account owner, extracting the route to a telephony device GUID associated with the account owner that responds to the incoming call; and
accessing the high speed cache using the root telephony device GUID to retrieve the corresponding device properties document for a subsequent telephony device as specified by a retrieved route retrieved from the high speed cache.

47. The VoIP system of claim 46, further comprising primary and secondary redundant parallel caches for the high speed cache; and
an external database as a tertiary redundant cache; and
wherein the processor is further operative for:
pointing one group of servers to a particular primary cache and a particular secondary cache, whereas pointing the remaining servers to the secondary cache of the first group as the primary, and to the primary cache of the first group as the secondary, thus reducing the risk of unavailability of the primary cache for any server;

in response to the incoming request from the originating system, accessing the primary redundant cache;

in response of failure of the primary redundant cache to respond within a predetermined first time period, accessing the secondary redundant cache;

in response of failure of the secondary redundant cache to respond within a predetermined second time period, accessing the tertiary redundant cache; and in response of failure of the tertiary redundant cache to return the requested cached data within a predetermined third time period, invoking appropriate function calls within the database to recalculate and return the necessary data from the raw underlying database data.

48. The VoIP system of claim 1, wherein a plurality of telephony devices are associated into a predetermined kit, and wherein the device platform data store stores information also associating one or more kits of devices provided on behalf of the account owner.

49. The VoIP system of claim 1, wherein storage for device logic documents, storage for the device properties documents, the device platform data store, and processing functions for effecting telephony devices are implemented by different processes on different computer servers in a cloud computing environment, whereby customers, resellers and private labelers of the VoIP system do not need to manage the functioning, scalability, reliability, performance and capacity planning of the infrastructure underlying the VoIP system, as these aspects are implicitly outsourced to the operator of the cloud-based VoIP system.

50. The VoIP system of claim 1, wherein the specific telephony functions include the provision of functionality for one or more SIP handsets, for use in connection with the function of a PBX provided on behalf of an account owner having multiple customers, each customer having multiple associated SIP handsets.

51. The VoIP system of claim 1, wherein the device logic document is stored in association with a device type identifier (device type ID) corresponding to a particular telephony device type;

wherein the device properties document contains configuration information comprising specific properties for an instance of a telephony device type, that when utilized with a device logic document defines a specific instance of the telephony device type in the VoIP system; and wherein the device platform data store further associates, with the account owner, device type information identified by a unique device type ID, corresponding to the identification of one or more types of different telephony devices provided in the VoIP system.

52. The VoIP system of claim 51, wherein there is a device logic document stored corresponding to each device type ID provided in the VoIP system on behalf of the account owner; and wherein there is a device properties document stored corresponding to each device GUID, provided for each instance of the one or more types of different telephony devices provided in the VoIP system on behalf of the account owner.

53. The VoIP system of claim 51, wherein the step of determining from the device properties document a corresponding device logic document for the telephony device comprises:

determining from the device properties document a corresponding device logic document for the device type represented by the device type ID;

determining the corresponding device logic document by a universal resource locator (URL) contained in the device properties document; and retrieving the corresponding device logic document by the URL of the device logic document.

54. The VoIP system of claim 1, where the processor is further operative for: providing the ability to the operator of the system to create users of different levels with different levels of permissions on devices whereby some of these users can in turn create other users; wherein users may be given the permission to modify a device, or use a device or both or neither; wherein some properties of the device may never be modified by any except the developer of the device whereas others may be modified by those who have been explicitly given the privilege to do so; wherein these rules allow for an account owner to manage their account users and telephony access levels by themselves; and wherein these permissions work to allow device developers fine-grained control over how their devices are used and modified.

55. A voice over Internet protocol (VoIP) system in which media signals are processed in communication sessions between an originating system and a destination system using a session control protocol and a communication content protocol, by use of at least one software-implemented configurable telephony device comprising at least logic defining a behavior and configuration parameters specific to the telephony device and its behavior, comprising:

an application server including a data store for storing computer-executable documents;

an interpreter for executing computer-executable documents;

a data store associated with the application server for storing a computer-executable device logic document comprising the definition of a behavior of a telephony device that provides a specific telephony function, the device logic document comprising code for effecting predetermined device functions required for implementing the specific telephony function, the device logic document stored in association with a device type identifier (device type ID) corresponding to a particular telephony device type;

a data store associated with the application server for storing a computer-executable device properties document containing configuration information comprising specific properties for an instance of a telephony device type, that when utilized with a device logic document defines a specific instance of the telephony device type in the VoIP system, the device properties document stored in association with a globally unique device identifier (device GUID) for the telephony device;

a device platform data store associating:
(a) information corresponding to an account owner,
(b) device type information identified by a unique device type ID, corresponding to the identification of one or more types of different telephony devices provided in the VoIP system, and
(c) at least one instance, on behalf of the account owner, of one or more of the types of different telephony devices provided in the VoIP system, each instance being identified by a distinct device GUID;

there being a device logic document stored in the application server corresponding to each device type ID provided in the VoIP system on behalf of the account owner; and there being a device properties document stored in the application server corresponding to each device GUID, provided for each instance of the one or more types of different telephony devices provided in the VoIP system on behalf of the account owner; and a processor operative to effect instances of a telephony device on behalf of an account owner by carrying out the steps of:
(1) receiving an incoming request from the originating system represented by a SIP message, the SIP message including (a) an identifier of the destination system, and (b) an identifier of the originating system, the incoming request for initiating a communication session for the purpose of processing signals between the originating system and the destination system;
(2) assigning a connection session identifier (connectionid) for the communication session;
(3) in response to the incoming SIP message, accessing the device platform data store based on an identifier in the SIP message to identify a telephony device that is to be activated on behalf of the account owner for the communication session;
(4) providing the GUID of the device properties document for the identified telephony device to the application server;
(5) at the application server and in response to receipt of the GUID of the device properties document for the identified telephony device, retrieving the corresponding device properties document for the identified telephony device;
(6) providing the retrieved device properties document to the document interpreter;
(7) at the document interpreter, utilizing the configuration information in the retrieved device properties document to determine session variables corresponding to specific operational properties of the telephony device, thereby preparing an initial session for execution on behalf of the device instance;
(8) also at the document interpreter, determining from the device properties document a corresponding device logic document for the device type represented by the device type ID and requesting the application server to retrieve the corresponding device logic document by its universal resource locator (URL);
(9) at the application server and in response to the URL request for the device logic document, retrieving the corresponding device logic document;
(10) providing the retrieved device logic document to the document interpreter; and
(11) at the document interpreter, executing the predetermined device functions of the retrieved device logic document in accordance with the configuration information from the retrieved device properties document to provide the specific telephony function of the telephony device for the communication session.

56. The VoIP system of claim 55, wherein the processor is further operative for:
at the document interpreter, based upon (a) the properties of the device as specified in the device properties document, in conjunction with (b) logic of the device as specified in the device logic document, and further in conjunction with (c) input from an end user, determining to invoke a subsequent child telephony device for the communication session and provide a further telephony function for the child telephony device; and
executing the above steps recursively to invoke a plurality of subsequent child telephony devices to thereby provide the telephony functions of said plurality of telephony devices.

57. The VoIP system of claim 56, wherein the end user input is provided via one or more of the following: dual tone multifrequency (DTMF) signals, a keypad, voice signals recognized by a voice recognition telephony device.

58. The VoIP system of claim 55, wherein, in addition to the logic defining a behavior and configuration parameters specific to the device and its behavior, the telephony device comprises a resource external to the device.

59. The VoIP system of claim 58, wherein the resource comprises one of more of the following: a telephony function provided by another telephony device, voice announcement signals, an answering machine announcement specific to a particular end user, music on hold signals, VoiceXML functions, other data content signals stored in a resource storage device.

60. The VoIP system of claim 55, wherein the document interpreter is provided as a computing function integrated with other computing functions for the VoIP system, such other functions including one or more of the following: a VoiceXML interpreter, a SIP handling stack, media signal processor.

61. The VoIP system of claim 55, wherein the device platform data store further stores information identifying predetermined services provided in the VoIP system on behalf of an account owner, the predetermined services comprising one of more device kits provided by a system operator on behalf of the account owner.

62. The VoIP system of claim 61, wherein the processor is further operative for, in connection with providing predetermined services on behalf of an account owner:
providing device kit information in the system comprising the definition of a device kit comprising a collection of a plurality of software-implemented telephony devices;
storing the device kit information in association with a device kit type identifier (device kit type ID) corresponding to a particular kit of telephony devices;
providing configuration information comprising specific properties for an instance of a particular device kit, that when utilized with a device kit type information defines a specific instance of a device kit in the VoIP system; and
storing the configuration information in association with a device kit identifier (device kit ID) for the device kit.

63. The VoIP system of claim 62, wherein the kit comprises one of a plurality of different kit types.

64. The VoIP system of claim 55, wherein the originating system is selected from the group comprising: a SIP handset, an external switch connected to the PSTN network, and an Internet router providing an incoming VoIP call.

65. The VoIP system of claim 55, wherein the destination system is selected from the group comprising: a SIP handset, an external switch connected to the PSTN network, and an Internet router for transmitting out a VoIP call.

66. The VoIP system of claim 55, wherein session control protocol and the communication content protocol are different protocols.

67. The VoIP system of claim 55, wherein the device logic document and the device properties documents are CCXML documents.

68. The VoIP system of claim 67, wherein the device logic document and the device properties document are processed by a CCXML interpreter, and wherein the CCXML interpreter is also operative to process other resources required for implementing the specific instance of the telephony device.

69. The VoIP system of claim 68, wherein the CCXML interpreter assigns a session identifier (sessionid) to each of one or more resources required for implementing the specific instance of the telephony device.

70. The VoIP system of claim 55, wherein the code for effecting predetermined device functions includes but is not limited to one or more of the following: event processing code, scripting code, session maintenance code, database access, database logic in stored procedures, triggers for functions, variable definitions, URI's to other information, code for executing VoiceXML documents, logical expressions.

71. The VoIP system of claim 55, wherein the specific telephony functions include but are not limited to the following: providing a telephone handset, a PBX, a music on hold function, call transfer, signal filtering, call groups, fax routing, call forwarding, call conferencing, a follow-me function, a recording function, a voice message function, a message playback function, a call queue function, an automatic attendant function, an announcement function, a switching function, a timer function, a billing function, a custom third-party provider telephony function

72. The VoIP system of claim 55, wherein each account owner has a plurality of customers, each of which has one or more telephony devices.

73. The VoIP system of claim 55, wherein the SIP message identifier of a destination system comprises a DID number for a call external to the originating system and a DID number or an extension number for a call within a system associated with the originating system.

74. The VoIP system of claim 55, wherein the SIP message identifier of the originating system is one or more of the following: SIP ID of the originating system, DID number, caller ID, MAC address of a physical handset.

75. The VoIP system of claim 55, wherein the telephony device further comprises a resource required for implementing a specific instance of the telephone device, wherein the resource comprises one or more of the following: another telephony device, a VoiceXML document, a URI to particular audio content, a URI to multimedia content, external code in an application server to perform functions of the telephony device other than those provided in the device logic document or the device properties document, database logic relating to the telephony device's function.

76. The VoIP system of claim 55, wherein the device data store further stores information identifying at least one instance of a telephony device as constituting a root telephony device that is to be initially activated on behalf of an account owner.

77. The VoIP system of claim 76, wherein the root telephony device is a root switch that is activated on behalf of the account owner in response to an incoming call from an external source, and wherein the root switch is operative for routing the incoming call to a subsequent telephony device associated with the account owner.

78. The VoIP system of claim 77, wherein the processor is further operative for determining a routing for the communication session to an ordered sequence of telephony devices, and successively instantiating further telephony devices in accordance with the ordered sequence.

79. The VoIP system of claim 78, wherein a subsequent telephony device immediately following the root switch is a PBX telephony device or a provider-level root switch.

80. The VoIP system of claim 76, wherein the root telephony device is a SIP handset that is activated on behalf of the account owner in response to activation of a physical handset by an end user associated with the account owner.

81. The VoIP system of claim 55, wherein the incoming request represents a call originating from a physical SIP handset that is associated with the account owner and is to be routed to an external destination, and wherein one telephony device comprises operational code for software-implementable functions of the physical handset, and wherein another telephony device comprises operational code for software-implementable functions for a switch that is connected to the PSTN network.

82. The VoIP system of claim 55, wherein the incoming request represents a call originating from a first physical SIP handset that is associated with the account owner and is to be routed to a second physical SIP handset that is associated with the account owner.

83. The VoIP system of claim 55, wherein the incoming request represents a call originating from an external source intended for a destination equipment within the VoIP system.

84. The VoIP system of claim 55, wherein the incoming request represents a call originating from a handset of an end user of an account owner within the VoIP system intended for a destination within a PBX associated with the account owner (intra-PBX).

85. The VoIP system of claim 55, wherein the incoming request represents a call originating from a handset of an end user of an account owner within the VoIP system intended for a destination within a PBX associated with another account owner (inter-PBX).

86. The VoIP system of claim 55, wherein the device logic document for the telephony function corresponds to a parent telephony device that invokes a child telephony device, and wherein the processor is further operative for:

determining that the telephony function provided by the telephony device calls for the invocation of a related child telephony device, as reflected by the presence of a GUID of a child telephony device;

providing a URI corresponding to the child telephony device to the application server;

at the application server and in response to receipt of the URI for the child telephony device, retrieving the corresponding device properties document for the identified child telephony device that is to be activated on behalf of the account owner;

providing the retrieved device properties document or the child telephony device to the document interpreter;

at the document interpreter, utilizing the configuration information in the retrieved device properties document to determine session variables corresponding to specific operational properties of the child telephony device, thereby preparing an initial session for execution on behalf of the device instance for the child telephony device;

also at the document interpreter, determining from the device properties document a corresponding device logic document for the device type represented by the device type ID for the child telephony device and requesting the application server to retrieve the corresponding device logic document by its universal resource locator (URL);

at the application server and in response to the URL request for the device logic document, retrieving the corresponding device logic document for the child telephony device;

providing the retrieved device logic document to the document interpreter; and at the document interpreter, executing the predetermined device functions of the retrieved device logic document in accordance with the configuration information from the retrieved device properties document to provide the specific telephony function for the child telephony device.

87. The VoIP system of claim 86, wherein the GUID of the child telephony device is provided in the device properties document of the parent telephony device.

88. The VoIP system of claim 86, wherein the GUID of the child telephony device is provided from routing information obtained by the parent telephony device, the routing information comprising a subsequent telephony device in sequence of related telephony devices.

89. The VoIP system of claim 86, wherein the invocation of a child telephony device is recursive.

90. The VoIP system of claim 55, wherein a single device logic document is stored in the application server and is utilized in connection with all instances of the corresponding telephony device type for all account owners, and is referenced by all corresponding device properties documents for that type,
whereby there is distinct device logic document for each telephony device type.

91. The VoIP system of claim 55, wherein the processor is further operative for:
providing a network-accessible user interface for allowing a user authorized by an operator of the VoIP system to access and change configuration information of one or more telephony devices, by accessing and changing the information of the device properties documents.

92. The VoIP system of claim 55, wherein the device platform data store stores information corresponding to a plurality of telephony service providers, wherein each one of the plurality of telephony service providers has a plurality of account owners.

93. The VoIP system of claim 92, wherein an account owner is any one of the following: a service provider, a direct customer of the VoIP system operator, a customer of a service provider, a branded reseller of services, a private label reseller of services, a PBX operator.

94. The VoIP system of claim 93, wherein a single device logic document is stored in the application server and is utilized in connection with all instances of the corresponding telephony device type for all account owners of the plurality of telephony service providers, and is referenced by all corresponding device properties documents for all customers of such account owners.

95. The VoIP system of claim 55, further comprising a telephony device database for storing information corresponding to one or more telephony devices provided in the VoIP system by a third party device developer; and wherein the processor is further operative for providing access to the VoIP system by the third party developer to create new telephony devices, and/or customize, extend, and/or integrate existing telephony devices with additional functionality, to thereby provide a third party device marketplace.

96. The VoIP system of claim 55, further comprising a telephony device database storing information associating:
(a) information identifying one or more telephony devices provided in the VoIP system by a third party device developer;
(b) telephony device usage information identifying the usage of the one or more telephony devices provided by the third party device developer by account owners; and
wherein the processor is further operative for:
tracking the usage of one or more of the telephony devices provided by the third party device developer by a particular account owner;
storing telephony device usage information in the telephony device usage database corresponding to usage of one or more of the telephony devices provided by the third party device developer by the particular account owner; and
providing a financial credit to the third party device developer in accordance with the telephony device usage information,
whereby an account owner that utilizes a telephony device provided by a third party device developer can be charged a fee for the utilization according to a usage schedule.

97. The VoIP system of claim 55, further comprising a high speed cache for storing of device properties documents, SIP identifiers (SIP ID), and SIP handset device GUIDs, and wherein the processor is further operative for:
in response to the incoming request from the originating system represented by the SIP ID in the SIP message, accessing the high speed cache to extract a corresponding SIP handset device GUID; and
accessing the high speed cache using the extracted SIP handset device GUID to retrieve the corresponding device properties document for an initiating SIP handset.

98. The VoIP system of claim 55, further comprising a high speed cache for storing (a) device properties documents, (b) target phone numbers associated with an account owner, (c) the GUID of a telephony device associated with each phone number of the account owner, including a root telephony device that is first invoked in response to an incoming call, and (d) the route, in the form of an ordered sequence of device GUIDs of the list of telephony devices that have to be invoked to reach the telephony device associated with the phone number of the incoming call; and
wherein the processor is further operative for:
in response to an incoming request from the originating system represented by an incoming call directed to a target phone number associated with the account owner, extracting the route to a telephony device GUID associated with the account owner that responds to the incoming call; and
accessing the high speed cache using the root telephony device GUID to retrieve the corresponding device properties document for a subsequent telephony device as specified by a retrieved route retrieved from the high speed cache.

99. The VoIP system of claim 98, further comprising:
first and second redundant parallel caches for the high speed cache;
an external database as a third redundant cache; and
wherein the processor is further operative for:
in response to the incoming request from the originating system, accessing the first redundant cache
in response of failure of the first redundant cache to respond within a predetermined first time period, accessing the second redundant cache;
in response of failure of the second redundant cache to respond within a predetermined second time period, accessing the third redundant cache;
in response of failure of the third redundant cache to return the requested cached data within a predetermined third time period, invoking appropriate function calls within the database to recalculate and return the necessary data from the raw underlying database data.

100. The VoIP system of claim 55, wherein a plurality of telephony devices are associated into a predetermined kit, and wherein the device platform data store stores information also associating one or more kits of devices provided on behalf of the account owner.

101. The VoIP system of claim 55, wherein storage for device logic documents, storage for the device properties documents, the application server, the device platform data store, and the document interpreter are implemented by different processes on different computer servers in a cloud computing environment.

102. The VoIP system of claim 55, wherein the specific telephony functions include the provision of functionality for one or more SIP handsets, for use in connection with the function of a PBX provided on behalf of an account owner having multiple customers, each customer having multiple associated SIP handsets.

103. A method for providing a telephony function via a configurable software-implemented telephony device for use in a voice over Internet protocol (VoIP) system in which media signals are processed in communication sessions between an originating system and a destination system, the software-implemented telephony device comprising at least logic defining a behavior and configuration parameters specific to the device and its behavior, comprising the steps of:

providing a device platform data store associating (a) information corresponding to an account owner, and (b) information identifying at least one instance, on behalf of the account owner, of a telephony device provided in the VoIP system, each instance being identified by a distinct device identifier;

providing a computer program component corresponding to the software-implemented telephony device identified by the device identifier, the component comprising (a) reusable device logic defining the behavior of the telephony device to provide a configurable telephony function and (b) configuration information comprising specific device properties for an instance of the telephony device, that when utilized with the device logic defines a specific configured instance of the telephony device in the VoIP system that provides a specific telephony function;

in response to an incoming request from the originating system for conducting a communication session for the purpose of processing signals between the originating system and the destination system, accessing the device platform data store to determine the device identifier of a telephony device that is to be activated on behalf of the account owner for the communication session;

executing the device logic of the computer program component in accordance with the configuration information to provide the specific telephony function of the telephony device for the communication session on behalf of the account owner; and wherein the step of providing a computer program component corresponding to the software-implemented telephony device comprises the steps of:

providing a computer-executable device logic document comprising the definition of a behavior of a telephony device that provides a specific telephony function, the device logic document comprising code for effecting predetermined device functions required for implementing the specific telephony function;

storing the device logic document in a document store;

providing a computer-executable device properties document containing configuration information comprising specific properties for an instance of a telephony device, that when utilized with a device logic document defines a specific instance of the telephony device in the VoIP system;

storing the device properties document in a document store in association with a globally unique device identifier (device GUID) for the telephony device, as the device identifier;

based on the GUID, retrieving the corresponding device properties document for the identified telephony device from the document store;

utilizing the configuration information in the retrieved device properties document to determine specific operational properties of the telephony device;

determining from the device properties document a corresponding device logic document for the telephony device;

retrieving the corresponding device logic document from the document store; and executing the predetermined device functions of the retrieved device logic document in accordance with the configuration information from the retrieved device properties document to provide the specific telephony function of the telephony device for the communication session.

104. The method of claim 103, further comprising the steps of:

based upon (a) the properties of the device as specified in the device properties document, in conjunction with (b) logic of the device as specified in the device logic document, determining to invoke a subsequent child telephony device for the communication session and provide the further telephony function of the child telephony device; and executing the above steps recursively to invoke a plurality of subsequent child telephony devices to thereby provide the telephony functions of said plurality of telephony devices.

105. The method of claim 104, further comprising the step of receiving input from an end user, and carrying out the steps based on end user input in conjunction with the properties of the device and the logic of the device.

106. The method of claim 105, wherein the end user input is provided via one or more of the following: dual tone multifrequency (DTMF) signals, a keypad, voice signals recognized by a voice recognition telephony device.

107. The method of claim 103, wherein, in addition to the logic defining a behavior and configuration parameters specific to the device and its behavior, the telephony device comprises a resource external to the device.

108. The method of claim 107, wherein the resource comprises one or more of the following: a telephony function provided by another telephony device, voice announcement signals, an answering machine announcement specific to a particular end user, music on hold signals, VoiceXML functions, other data content signals stored in a resource storage device.

109. The method of claim 103, wherein the device properties document and the device logic document are processed by a document interpreter, and wherein the document interpreter is provided as a computing function integrated with other computing functions for the VoIP system, such other functions including one or more of the following: a VoiceXML interpreter, a SIP handling stack, media signal processor.

110. The method of claim 103, wherein the device platform data store further stores information identifying predetermined services provided in the VoIP system on behalf of an account owner, the predetermined services comprising one of more device kits provided by a system operator on behalf of the account owner.

111. The method of claim 110, further comprising the steps of, in connection with providing predetermined services on behalf of an account owner:
providing device kit information in the system comprising the definition of a device kit comprising a collection of a plurality of software-implemented telephony devices;
storing the device kit information in association with a device kit type identifier (device kit type ID) corresponding to a particular kit of telephony devices;
providing configuration information comprising specific properties for an instance of a particular device kit, that when utilized with a device kit type information defines a specific instance of a device kit in the VoIP system; and
storing the configuration information in association with a device kit identifier (device kit ID) for the device kit.

112. The method of claim 111, wherein the kit comprises one of a plurality of different kit types.

113. The method of claim 103, wherein the originating system is selected from the group comprising: a SIP handset, an external switch connected to the PSTN network, and an Internet router providing an incoming VoIP call.

114. The method of claim 103, wherein the destination system is selected from the group comprising: a SIP handset, an external switch connected to the PSTN network, and an Internet router for transmitting out a VoIP call.

115. The method of claim 103, wherein the device logic document and the device properties documents are CCXML documents.

116. The method of claim 115, wherein the device logic document and the device properties document are processed by a CCXML interpreter, and wherein the CCXML interpreter is also operative to process other resources required for implementing the specific instance of the telephony device.

117. The method of claim 116, wherein the CCXML interpreter assigns a session identifier (sessionid) to each of one or more resources required for implementing the specific instance of the telephony device.

118. The method of claim 103, wherein the computer program component includes but is not limited to code implementing one or more of the following: event processing code, scripting code, session maintenance code, database access, database logic in stored procedures, triggers for functions, variable definitions, URI's to other information, code for executing VoiceXML documents, logical expressions.

119. The method of claim 103, wherein the specific telephony functions include but are not limited to the following: providing a telephone handset, a PBX, a music on hold function, call transfer, signal filtering, call groups, fax routing, call forwarding, call conferencing, a follow-me function, a recording function, a voice message function, a message playback function, a call queue function, an automatic attendant function, an announcement function, a switching function, a timer function, a phone menu function, a name dialer function, a billing function, a custom third-party provider telephony function.

120. The method of claim 103, wherein each account owner has a plurality of customers, each of which has one or more telephony devices.

121. The method of claim 103, wherein the incoming request from an originating system comprises a SIP message, and
wherein the SIP message includes a SIP message identifier of a destination system comprising a DID number for a call to a destination external to the originating system and a DID number or an extension number for a call to a destination within a system associated with the originating system.

122. The method of claim 121, wherein the SIP message identifier of the originating system is one or more of the following: SIP ID of the originating system, DID number, caller ID, MAC address of a physical handset.

123. The method of claim 103, wherein the telephony device further comprises a resource required for implementing a specific instance of the telephone device, wherein the resource comprises one or more of the following: references to another telephony device, one or more VoiceXML documents, a URI to particular audio content, a URI to multimedia content, external code in an application server to perform functions of the telephony device other than those provided in the device logic or the device properties, database logic relating to the telephony device's function.

124. The method of claim 103, wherein the device platform data store further stores information identifying at least one instance of a telephony device as constituting a root telephony device that is to be initially activated on behalf of an account owner.

125. The method of claim 124, wherein the root telephony device is a root switch that is activated on behalf of the account owner in response to an incoming call from an external source, and wherein the root switch is operative for routing the incoming call to a subsequent telephony device associated with the account owner.

126. The method of claim 125, further comprising steps for determining a routing for the communication session to an ordered sequence of telephony devices, and successively instantiating further telephony devices in accordance with the ordered sequence.

127. The method of claim 126, wherein a subsequent telephony device immediately following the root switch is a PBX telephony device or a provider-level root switch.

128. The method of claim 124, wherein the root telephony device is a SIP handset that is activated on behalf of the account owner in response to activation of a physical handset by an end user associated with the account owner.

129. The method of claim 103, wherein the incoming request represents a call originating from a physical SIP handset that is associated with the account owner and is to be routed to an external destination, and wherein one telephony device comprises operational code for software-implementable functions of the physical handset, and wherein another telephony device comprises operational code for software-implementable functions for a switch that is connected to the PSTN network as an outbound call.

130. The method of claim 103, wherein the incoming request represents a call originating from a first physical SIP handset that is associated with the account owner and is to be routed to a second physical SIP handset or other telephony device that is associated with the account owner.

131. The method of claim 103, wherein the incoming request represents a call originating from an external source intended for a destination equipment within the VoIP system as an inbound call.

132. The method of claim 103, wherein the incoming request represents a call originating from a handset of an end user of an account owner within the VoIP system intended for a destination within a PBX associated with the account owner (intra-PBX).

133. The method of claim 103, wherein the incoming request represents a call originating from a handset of an end user of an account owner within the VoIP system intended for a destination within a PBX associated with another account owner (inter-PBX).

134. The method of claim 103, wherein the device logic document for the telephony function corresponds to a parent telephony device that invokes a child telephony device, and further comprising the steps of:
- determining that the telephony function provided by the telephony device calls for the invocation of a related child telephony device, as reflected by the presence of a device identifier of a child telephony device;
- retrieving the corresponding device properties document for the identified child telephony device that is to be activated on behalf of the account owner;
- utilizing the configuration information in the retrieved device properties document to determine specific operational properties of the child telephony device;
- determining from the device properties document a corresponding device logic document for the child telephony device;
- retrieving the corresponding device logic document for the child telephony device; and
- executing the predetermined device functions of the retrieved device logic document in accordance with the configuration information from the retrieved device properties document to provide the specific telephony function for the child telephony device.

135. The method of claim 134, wherein the device identifier of the child telephony device is provided in the device properties document of the parent telephony device.

136. The method of claim 134, wherein the device identifier of the child telephony device is provided from routing information obtained by the parent telephony device, the routing information comprising a subsequent telephony device in sequence of related telephony devices.

137. The method of claim 134, wherein the invocation of a child telephony device is recursive.

138. The method of claim 103, wherein a single device logic document is utilized in connection with all instances of a corresponding telephony device type for all account owners, and is referenced by all corresponding device properties documents for that type,
- whereby there is distinct device logic document for each telephony device type.

139. The method of claim 103, further comprising the step of:
- providing a network-accessible user interface for allowing a user authorized by an operator of the VoIP system to access and change configuration information of one or more telephony devices, by accessing and changing the information of the device properties documents, such that configuration information changes take effect in the VoIP system in real-time.

140. The method of claim 103, further comprising the step of:
- providing a network-accessible application programming interface for allowing a user or developer authorized by an operator of the VoIP system to access and change configuration information of one or more telephony devices, by accessing and changing the information of the device properties documents, such that configuration information changes take effect in the VoIP system in real-time.

141. The method of claim 103, further comprising the step of:
- providing a network-accessible graphical user interface (GUI) for allowing a user or developer authorized by an operator of the VoIP system to access and change configuration information of one or more telephony devices, by accessing and changing the information of the device properties documents, such that configuration information changes take effect in the VoIP system in real-time, and
- wherein certain configuration information is represented as a graphical tree, and
- wherein the changes are effected by dragging representations of devices in the GUI on specific locations of the tree, and drawing and moving lines between devices to establish device connections,
- thereby making the task of configuring aspects of the VoIP system user-friendly and available to a non-technical common user.

142. The method of claim 103, wherein the device platform data store stores information corresponding to a plurality of telephony service providers, wherein each one of the plurality of telephony service providers has a plurality of account owners.

143. The method of claim 142, wherein an account owner is any one of the following: a service provider, a direct customer of the VoIP system operator, a customer of a service provider, a branded reseller of services, a private label reseller of services, a PBX operator.

144. The method of claim 143, wherein a single device logic document is utilized in connection with all instances of a corresponding telephony device type for all account owners of the plurality of telephony service providers, and is referenced by all corresponding device properties documents for all customers of such account owners.

145. The method of claim 103, further comprising the steps of:
- providing a telephony device database storing information corresponding to one or more telephony devices provided in the VoIP system by a third party device developer; and
- providing access to the VoIP system by the third party developer to create new telephony devices, and/or customize, extend, and/or integrate existing telephony devices with additional functionality,
- to thereby provide a third party device marketplace.

146. The method of claim 103, further comprising the steps of:
- providing a telephony device database storing information associating:
  - (a) information identifying one or more telephony devices provided in the VoIP system by a third party device developer;
  - (b) telephony device usage information identifying the usage of the one or more telephony devices provided by the third party device developer by account owners;
- tracking the usage of one or more of the telephony devices provided by the third party device developer by a particular account owner;
- storing telephony device usage information in the telephony device usage database corresponding to usage of one or more of the telephony devices provided by the third party device developer by the particular account owner; and
- providing a financial credit to the third party device developer in accordance with the telephony device usage information, whereby an account owner that utilizes a telephony device provided by a third party device developer can be charged a fee for the utilization according to a usage schedule.

147. The method of claim 103, further comprising the steps of:
provide a high speed cache for storing of device properties documents, SIP identifiers (SIP ID), and SIP handset device GUIDs;
in response to the incoming request from the originating system represented by the SIP ID in the SIP message, accessing the high speed cache to extract a corresponding SIP handset device GUID; and
accessing the high speed cache using the extracted SIP handset device GUID to retrieve the corresponding device properties document for an initiating SIP handset.

148. The method of claim 147, further comprising the steps of:
providing primary and secondary redundant parallel caches for the high speed cache;
further caching the data in an external database as a tertiary redundant cache; pointing one group of servers to a particular primary cache and a particular secondary cache, whereas pointing the remaining servers to the secondary cache of the first group as the primary, and to the primary cache of the first group as the secondary, thus reducing the risk of unavailability of the primary cache for any server;
in response to the incoming request from the originating system, accessing the primary redundant cache;
in response of failure of the primary redundant cache to respond within a predetermined first time period, accessing the secondary redundant cache;
in response of failure of the secondary redundant cache to respond within a predetermined second time period, accessing the tertiary redundant cache;
in response of failure of the tertiary redundant cache to return the requested cached data within a predetermined third time period, invoking appropriate function calls within the database to recalculate and return the necessary data from the raw underlying database data.

149. The method of claim 103, further comprising the steps of:
providing a high speed cache for storing (a) device properties documents, (b) target phone numbers associated with an account owner, (c) the GUID of a telephony device associated with each phone number of the account owner, and (d) the route, in the form of an ordered sequence of device GUIDs of the list of telephony devices that have to be invoked to reach the telephony device associated with the destination phone number of the incoming call;
in response to an incoming request from the originating system represented by an incoming call directed to a target phone number associated with the account owner, extracting the route to a telephony device GUID associated with the account owner that responds to the destination phone number of incoming call; and
accessing the high speed cache using the root telephony device GUID to retrieve the corresponding device properties document for a subsequent telephony device as specified by a retrieved route retrieved from the high speed cache.

150. The method of claim 103, wherein a plurality of telephony devices are associated into a predetermined kit, and wherein the device platform data store stores information also associating one or more kits of devices provided on behalf of the account owner,
whereby such kits allow easier creation and management of a group of devices that are often used together.

151. The method of claim 103, wherein storage for device logic documents, storage for the device properties documents, the device platform data store, and processing functions for effecting telephony devices are implemented by different processes on different computer servers in a cloud computing environment,
whereby customers, resellers and private labelers of the VoIP system do not need to manage the functioning, scalability, reliability, performance and capacity planning of the infrastructure underlying the VoIP system, as these aspects are implicitly outsourced to the operator of the cloud-based VoIP system.

152. The method of claim 103, wherein the specific telephony functions include the provision of functionality for one or more SIP handsets, for use in connection with the function of a PBX provided on behalf of an account owner having multiple customers, each customer having multiple associated SIP handsets.

153. The method of claim 103, wherein the device logic document is stored on an application server in association with a device type identifier (device type ID) corresponding to a particular telephony device type;
wherein the device properties document contains configuration information comprising specific properties for an instance of a telephony device type, that when utilized with a device logic document defines a specific instance of the telephony device type in the VoIP system; and
wherein the device platform data store further associates, with the account owner, device type information identified by a unique device type ID, corresponding to the identification of one or more types of different telephony devices provided in the VoIP system.

154. The method of claim 153, wherein there is a device logic document stored corresponding to each device type ID provided in the VoIP system on behalf of the account owner; and wherein there is a device properties document stored corresponding to each device GUID, provided for each instance of the one or more types of different telephony devices provided in the VoIP system on behalf of the account owner.

155. The method of claim 153, wherein the step of determining from the device properties document a corresponding device logic document for the telephony device comprises:
determining from the device properties document a corresponding device logic document for the device type represented by the device type ID;
determining the corresponding device logic document by a universal resource locator (URL) contained in the device properties document; and
retrieving the corresponding device logic document by the URL of the device logic document.

156. A method for providing a telephony function via a configurable software-implemented telephony device for use in a voice over Internet protocol (VoIP) system in which media signals are processed in communication sessions between an originating system and a destination system using a session control protocol and a communication content protocol, the software-implemented telephony device comprising at least logic defining a behavior and configuration parameters specific to the device and its behavior, comprising the steps of:

providing a computer-executable device logic document comprising the definition of a behavior of a telephony device that provides a specific telephony function, the device logic document comprising code for effecting predetermined device functions required for implementing the specific telephony function;

storing the device logic document on an application server in association with a device type identifier (device type ID) corresponding to a particular telephony device type;

providing a computer-executable device properties document containing configuration information comprising specific properties for an instance of a telephony device type, that when utilized with a device logic document defines a specific instance of the telephony device type in the VoIP system;

storing the device properties document on an application server in association with a globally unique device identifier (device GUID) for the telephony device;

providing a device platform data store associating:
  (a) information corresponding to an account owner,
  (b) device type information identified by a unique device type ID, corresponding to the identification of one or more types of different telephony devices provided in the VoIP system, and
  (c) at least one instance, on behalf of the account owner, of one or more of the types of different telephony devices provided in the VoIP system, each instance being identified by a distinct device GUID;
    there being a device logic document stored in the application server corresponding to each device type ID provided in the VoIP system on behalf of the account owner; and
    there being a device properties document stored in the application server corresponding to each device GUID, provided for each instance of the one or more types of different telephony devices provided in the VoIP system on behalf of the account owner;

receiving an incoming request from the originating system represented by a SIP message, the SIP message including (a) an identifier of the destination system, and (b) an identifier of the originating system, the incoming request for initiating a communication session for the purpose of processing signals between the originating system and the destination system;

assigning a connection session identifier (connectionid) for the communication session;

in response to the incoming SIP message, accessing the device platform data store based on an identifier in the SIP message to identify a telephony device that is to be activated on behalf of the account owner for the communication session;

providing the GUID of the device properties document for the identified telephony device to the application server;

at the application server and in response to receipt of the GUID of the device properties document for the identified telephony device, retrieving the corresponding device properties document for the identified telephony device;

providing the retrieved device properties document to a document interpreter;

at the document interpreter, utilizing the configuration information in the retrieved device properties document to determine session variables corresponding to specific operational properties of the telephony device, thereby preparing an initial session for execution on behalf of the device instance;

also at the document interpreter, determining from the device properties document a corresponding device logic document for the device type represented by the device type ID and requesting the application server to retrieve the corresponding device logic document by its universal resource locator (URL);

at the application server and in response to the URL request for the device logic document, retrieving the corresponding device logic document;

providing the retrieved device logic document to the document interpreter;

at the document interpreter, executing the predetermined device functions of the retrieved device logic document in accordance with the configuration information from the retrieved device properties document to provide the specific telephony function for the communication session.

157. The method of claim 156, further comprising the steps of:
at the document interpreter, based upon (a) the properties of the device as specified in the device properties document, in conjunction with (b) logic of the device as specified in the device logic document, and further in conjunction with (c) input from an end user, determining to invoke a subsequent child telephony device for the communication session and provide a further telephony function for the child telephony device; and
executing the above steps recursively to invoke a plurality of subsequent child telephony devices to thereby provide the telephony functions of said plurality of telephony devices.

158. The method of claim 157, wherein the end user input is provided via one or more of the following: dual tone multifrequency (DTMF) signals, a keypad, voice signals recognized by a voice recognition telephony device.

159. The method of claim 156, wherein, in addition to the logic defining a behavior and configuration parameters specific to the device and its behavior, the telephony device comprises a resource external to the device.

160. The method of claim 159, wherein the resource comprises one of more of the following: a telephony function provided by another telephony device, voice announcement signals, an answering machine announcement specific to a particular end user, music on hold signals, VoiceXML functions, other data content signals stored in a resource storage device.

161. The method of claim 156, wherein the document interpreter is provided as a computing function integrated with other computing functions for the VoIP system, such other functions including one or more of the following: a VoiceXML interpreter, a SIP handling stack, media signal processor.

162. The method of claim 156, wherein the device platform data store further stores information identifying predetermined services provided in the VoIP system on behalf of an account owner, the predetermined services comprising one of more device kits provided by a system operator on behalf of the account owner.

163. The method of claim 162, further comprising the steps of, in connection with providing predetermined services on behalf of an account owner:
providing device kit information in the system comprising the definition of a device kit comprising a collection of a plurality of software-implemented telephony devices;
storing the device kit information in association with a device kit type identifier (device kit type ID) corresponding to a particular kit of telephony devices;

providing configuration information comprising specific properties for an instance of a particular device kit, that when utilized with a device kit type information defines a specific instance of a device kit in the VoIP system;

storing the configuration information in association with a device kit identifier (device kit ID) for the device kit.

164. The method of claim 163, wherein the kit comprises one of a plurality of different kit types.

165. The method of claim 156, wherein the originating system is selected from the group comprising: a SIP handset, an external switch connected to the PSTN network, and an Internet router providing an incoming VoIP call.

166. The method of claim 156, wherein the destination system is selected from the group comprising: a SIP handset, an external switch connected to the PSTN network, and an Internet router for transmitting out a VoIP call.

167. The method of claim 156, wherein session control protocol and the communication content protocol are different protocols.

168. The method of claim 156, wherein the device logic document and the device properties documents are CCXML documents.

169. The method of claim 168, wherein the device logic document and the device properties document are processed by a CCXML interpreter, and wherein the CCXML interpreter is also operative to process other resources required for implementing the specific instance of the telephony device.

170. The method of claim 169, further comprising the step wherein the CCXML interpreter assigns a session identifier (sessionid) to each of one or more resources required for implementing the specific instance of the telephony device.

171. The method of claim 156, wherein the code for effecting predetermined device functions includes but is not limited to one or more of the following: event processing code, scripting code, session maintenance code, database access, database logic in stored procedures, triggers for functions, variable definitions, URI's to other information, code for executing VoiceXML documents, logical expressions.

172. The method of claim 156, wherein the specific telephony functions include but are not limited to the following: providing a telephone handset, a PBX, a music on hold function, call transfer, signal filtering, call groups, fax routing, call forwarding, call conferencing, a follow-me function, a recording function, a voice message function, a message playback function, a call queue function, an automatic attendant function, an announcement function, a switching function, a timer function, a billing function, a custom third-party provider telephony function.

173. The method of claim 156, wherein each account owner has a plurality of customers, each of which has one or more telephony devices.

174. The method of claim 156, wherein the SIP message identifier of a destination system comprises a DID number for a call external to the originating system and a DID number or an extension number for a call within a system associated with the originating system.

175. The method of claim 156, wherein the SIP message identifier of the originating system is one or more of the following: SIP ID of the originating system, DID number, caller ID, MAC address of a physical handset.

176. The method of claim 156, wherein the telephony device further comprises a resource required for implementing a specific instance of the telephone device, wherein the resource comprises one or more of the following: another telephony device, a VoiceXML document, a URI to particular audio content, a URI to multimedia content, external code in an application server to perform functions of the telephony device other than those provided in the device logic document or the device properties document, database logic relating to the telephony device's function.

177. The method of claim 156, wherein the device platform data store further stores information identifying at least one instance of a telephony device as constituting a root telephony device that is to be initially activated on behalf of an account owner.

178. The method of claim 177, wherein the root telephony device is a root switch that is activated on behalf of the account owner in response to an incoming call from an external source, and wherein the root switch is operative for routing the incoming call to a subsequent telephony device associated with the account owner.

179. The method of claim 178, further comprising steps for determining a routing for the communication session to an ordered sequence of telephony devices, and successively instantiating further telephony devices in accordance with the ordered sequence.

180. The method of claim 179, wherein a subsequent telephony device immediately following the root switch is a PBX telephony device or a provider-level root switch.

181. The method of claim 177, wherein the root telephony device is a SIP handset that is activated on behalf of the account owner in response to activation of a physical handset by an end user associated with the account owner.

182. The method of claim 156, wherein the incoming request represents a call originating from a physical SIP handset that is associated with the account owner and is to be routed to an external destination, and wherein one telephony device comprises operational code for software-implementable functions of the physical handset, and wherein another telephony device comprises operational code for software-implementable functions for a switch that is connected to the PSTN network.

183. The method of claim 156, wherein the incoming request represents a call originating from a first physical SIP handset that is associated with the account owner and is to be routed to a second physical SIP handset that is associated with the account owner.

184. The method of claim 156, wherein the incoming request represents a call originating from an external source intended for a destination equipment within the VoIP system.

185. The method of claim 156, wherein the incoming request represents a call originating from a handset of an end user of an account owner within the VoIP system intended for a destination within a PBX associated with the account owner (intra-PBX).

186. The method of claim 156, wherein the incoming request represents a call originating from a handset of an end user of an account owner within the VoIP system intended for a destination within a PBX associated with another account owner (inter-PBX).

187. The method of claim 156, wherein the device logic document for the telephony function corresponds to a parent telephony device that invokes a child telephony device, and further comprising the steps of:

determining that the telephony function provided by the telephony device calls for the invocation of a related child telephony device, as reflected by the presence of a GUID of a child telephony device;

providing a URI corresponding to the child telephony device to the application server;

at the application server and in response to receipt of the URI for the child telephony device, retrieving the corresponding device properties document for the identified child telephony device that is to be activated on behalf of the account owner;

providing the retrieved device properties document or the child telephony device to the document interpreter;

at the document interpreter, utilizing the configuration information in the retrieved device properties document to determine session variables corresponding to specific operational properties of the child telephony device, thereby preparing an initial session for execution on behalf of the device instance for the child telephony device;

also at the document interpreter, determining from the device properties document a corresponding device logic document for the device type represented by the device type ID for the child telephony device and requesting the application server to retrieve the corresponding device logic document by its universal resource locator (URL);

at the application server and in response to the URL request for the device logic document, retrieving the corresponding device logic document for the child telephony device;

providing the retrieved device logic document to the document interpreter;

at the document interpreter, executing the predetermined device functions of the retrieved device logic document in accordance with the configuration information from the retrieved device properties document to provide the specific telephony function for the child telephony device.

188. The method of claim 187, wherein the GUID of the child telephony device is provided in the device properties document of the parent telephony device.

189. The method of claim 187, wherein the GUID of the child telephony device is provided from routing information obtained by the parent telephony device, the routing information comprising a subsequent telephony device in sequence of related telephony devices.

190. The method of claim 187, wherein the invocation of a child telephony device is recursive.

191. The method of claim 156, wherein a single device logic document is stored in the application server and is utilized in connection with all instances of the corresponding telephony device type for all account owners, and is referenced by all corresponding device properties documents for that type, whereby there is distinct device logic document for each telephony device type.

192. The method of claim 156, further comprising the step of: providing a network-accessible user interface for allowing a user authorized by an operator of the VoIP system to access and change configuration information of one or more telephony devices, by accessing and changing the information of the device properties documents.

193. The method of claim 156, wherein the device platform data store stores information corresponding to a plurality of telephony service providers, wherein each one of the plurality of telephony service providers has a plurality of account owners.

194. The method of claim 193, wherein an account owner is any one of the following: a service provider, a direct customer of the VoIP system operator, a customer of a service provider, a branded reseller of services, a private label reseller of services, a PBX operator.

195. The method of claim 194, wherein a single device logic document is stored in the application server and is utilized in connection with all instances of the corresponding telephony device type for all account owners of the plurality of telephony service providers, and is referenced by all corresponding device properties documents for all customers of such account owners.

196. The method of claim 156, further comprising the steps of:

providing a telephony device database storing information corresponding to one or more telephony devices provided in the VoIP system by a third party device developer; and providing access to the VoIP system by the third party developer to create new telephony devices, and/or customize, extend, and/or integrate existing telephony devices with additional functionality, to thereby provide a third party device marketplace.

197. The method of claim 156, further comprising the steps of:

providing a telephony device database storing information associating:
  (a) information identifying one or more telephony devices provided in the VoIP system by a third party device developer;
  (b) telephony device usage information identifying the usage of the one or more telephony devices provided by the third party device developer by account owners;

tracking the usage of one or more of the telephony devices provided by the third party device developer by a particular account owner;

storing telephony device usage information in the telephony device usage database corresponding to usage of one or more of the telephony devices provided by the third party device developer by the particular account owner; and providing a financial credit to the third party device developer in accordance with the telephony device usage information, whereby an account owner that utilizes a telephony device provided by a third party device developer can be charged a fee for the utilization according to a usage schedule.

198. The method of claim 156, further comprising the steps of:

providing a high speed cache for storing of device properties documents, SIP identifiers (SIP ID), and SIP handset device GUIDs;

in response to the incoming request from the originating system represented by the SIP ID in the SIP message, accessing the high speed cache to extract a corresponding SIP handset device GUID; and accessing the high speed cache using the extracted SIP handset device GUID to retrieve the corresponding device properties document for an initiating SIP handset.

199. The method of claim 156, further comprising the steps of:

providing a high speed cache for storing (a) device properties documents, (b) target phone numbers associated with an account owner, (c) the GUID of a telephony device associated with each phone number of the account owner, including a root telephony device that is first invoked in response to an incoming call, and (d) the route, in the form of an ordered sequence of device GUIDs of the list of telephony devices that have to be invoked to reach the telephony device associated with the phone number of the incoming call;

in response to an incoming request from the originating system represented by an incoming call directed to a target phone number associated with the account owner, extracting the route to a telephony device GUID associated with the account owner that responds to the incoming call; and accessing the high speed cache using the root telephony device GUID to retrieve the corresponding device properties document for a subsequent telephony device as specified by a retrieved route retrieved from the high speed cache.

200. The method of claim 156, further comprising the steps of:

providing first and second redundant parallel caches for the high speed cache;

further caching the data in an external database as a third redundant cache; in response to the incoming request from the originating system, accessing the first redundant cache;

in response of failure of the first redundant cache to respond within a predetermined first time period, accessing the second redundant cache;

in response of failure of the second redundant cache to respond within a predetermined second time period, accessing the third redundant cache;

in response of failure of the third redundant cache to return the requested cached data within a predetermined third time period, invoking appropriate function calls within the database to recalculate and return the necessary data from the raw underlying database data.

201. The method of claim 156, wherein a plurality of telephony devices are associated into a predetermined kit, wherein the device platform data store stores information also associating one or more kits of devices provided on behalf of the account owner.

202. The method of claim 156, wherein storage for device logic documents, storage for the device properties documents, the application server, the device platform data store, and the document interpreter are implemented by different processes on different computer servers in a cloud computing environment.

203. The method of claim 156, wherein the specific telephony functions include the provision of functionality for one or more SIP handsets, for use in connection with the function of a PBX provided on behalf of an account owner having multiple customers, each customer having multiple associated SIP handsets.

* * * * *